(12) United States Patent
Ubillos et al.

(10) Patent No.: US 9,041,727 B2
(45) Date of Patent: May 26, 2015

(54) USER INTERFACE TOOLS FOR SELECTIVELY APPLYING EFFECTS TO IMAGE

(71) Applicant: Apple Inc., Cupertino, CA (US)

(72) Inventors: Randy Ubillos, Los Altos, CA (US); Timothy D. Cherna, San Francisco, CA (US); Ralph T. Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 195 days.

(21) Appl. No.: 13/629,374

(22) Filed: Sep. 27, 2012

(65) Prior Publication Data

US 2013/0235071 A1 Sep. 12, 2013

Related U.S. Application Data

(60) Provisional application No. 61/607,550, filed on Mar. 6, 2012, provisional application No. 61/607,569, filed on Mar. 6, 2012, provisional application No. 61/607,574, filed on Mar. 6, 2012.

(51) Int. Cl.
*G06F 3/0484* (2013.01)
*H04N 1/387* (2006.01)

(52) U.S. Cl.
CPC .......... *G06F 3/0484* (2013.01); *G06F 3/04845* (2013.01); *H04N 1/3877* (2013.01)

(58) Field of Classification Search
CPC . G06F 3/0488; G06F 3/04883; G06F 9/4443; G06T 11/60; G06T 7/0081
See application file for complete search history.

(56) References Cited

U.S. PATENT DOCUMENTS

| 7,034,881 | B1 | 4/2006 | Hyodo et al. |
| 7,479,949 | B2 | 1/2009 | Jobs et al. |
| 7,489,305 | B2 | 2/2009 | Salisbury et al. |
| 7,954,067 | B2 | 5/2011 | Breglio |
| 2006/0053374 | A1 | 3/2006 | Wilensky |
| 2008/0225058 | A1 | 9/2008 | Hertzfeld et al. |

(Continued)

FOREIGN PATENT DOCUMENTS

| KR | 2009/0116435 | 11/2009 |
| KR | 2011/0042635 | 4/2011 |

(Continued)

OTHER PUBLICATIONS

Messieh, Nancy ("Snapseed for iPad: Photo editing at the swipe of a finger." The Next Web. Jun. 8, 2011. http://thenextweb.com/apps/2011/06/08/snapseed-for-ipad-photo-editing-at-the-swipe-of-a-finger/ Accessed Oct. 8, 2014.).*

(Continued)

*Primary Examiner* — Antonio A Caschera
(74) *Attorney, Agent, or Firm* — Adeli LLP

(57) ABSTRACT

Some embodiments provide an image editing application that edits an image. The image editing application assigns a mask value to each pixel of the image that includes several pixels. The mask value for a pixel is for using when processing the pixel. The image editing application displays the image in a display area. The image editing application receives several user inputs on a set of pixels of the image. The image editing application incrementally applies an image processing operation to the set of pixels by changing the mask values for the set of pixels each time the set of pixels receives a user input.

22 Claims, 50 Drawing Sheets

(56) References Cited

U.S. PATENT DOCUMENTS

| | | | |
|---|---|---|---|
| 2009/0204913 | A1 | 8/2009 | Kawano et al. |
| 2009/0256947 | A1 | 10/2009 | Ciurea et al. |
| 2010/0020221 | A1 | 1/2010 | Tupman et al. |
| 2011/0012848 | A1 | 1/2011 | Li et al. |
| 2011/0102457 | A1* | 5/2011 | Bhatt et al. .................. 345/619 |
| 2011/0181618 | A1 | 7/2011 | DiVerdi et al. |
| 2011/0219329 | A1 | 9/2011 | Breglio |
| 2011/0252344 | A1 | 10/2011 | van Os |

FOREIGN PATENT DOCUMENTS

| | | |
|---|---|---|
| KR | 2011/0076849 | 7/2011 |
| KR | 2012/0010525 | 2/2012 |
| WO | PCT/US2012/072195 | 12/2012 |
| WO | WO 2013/133893 | 9/2013 |

OTHER PUBLICATIONS

"Photoshop Touch for Android: Part 2 The Tools" gamefromscratch.com, Jan. 20, 2012 (per The Way Back Machine) accessed via the web @ http://www.gamefromscratch.com/page/Photoshop-Touch-for-Android-Part-2-The-Tools.aspx. Accessed Jan. 1, 2015.*

Author Unknown, "How to Manage and Work with Digital Images, Using FastStone Image Viewer Version 4.5," FastStone Soft, Jun. 10, 2011, pp. 1-95.

Dodgson, Neil A., et al., "Contrast Brushes: Interactive Image Enhancement by Direct Manipulation," Computational Aesthetics in Graphics, Visualization, and Imaging, Month Unknown, 2009, 8 pages, The Eurographics Association.

Kurtenbach, Gordon, et al., "The Design of a GUI Paradigm based on Tablets, Two-hands, and Transparency," CHI 1997, Mar. 22-27, 1997, pp. 35-42, ACM, Atlanta, Georgia, USA.

O'Neil, Steve, "Using Adobe Photoshop," Chapter 7—Image Adjustments, Month Unknown, 2006, pp. 1-12.

International Search Report and Written Opinion for PCT/US2012/072195, Mar. 1, 2013 (mailing date), Apple Inc.

Author Unknown, "Corel PaintShop Pro X4 User Guide," Month Unknown, 2011, 194 pages.

Long, Ben, "Snapseed Raises the Bar for iPad Image Editors," MacWorld, Jun. 10, 2011, 5 pages.

Author Unknown, "Using Adobe Photoshop C54," Jan. 10, 2010, 707 pages, Adobe Systems Incorporated, San Jose, California, USA.

* cited by examiner

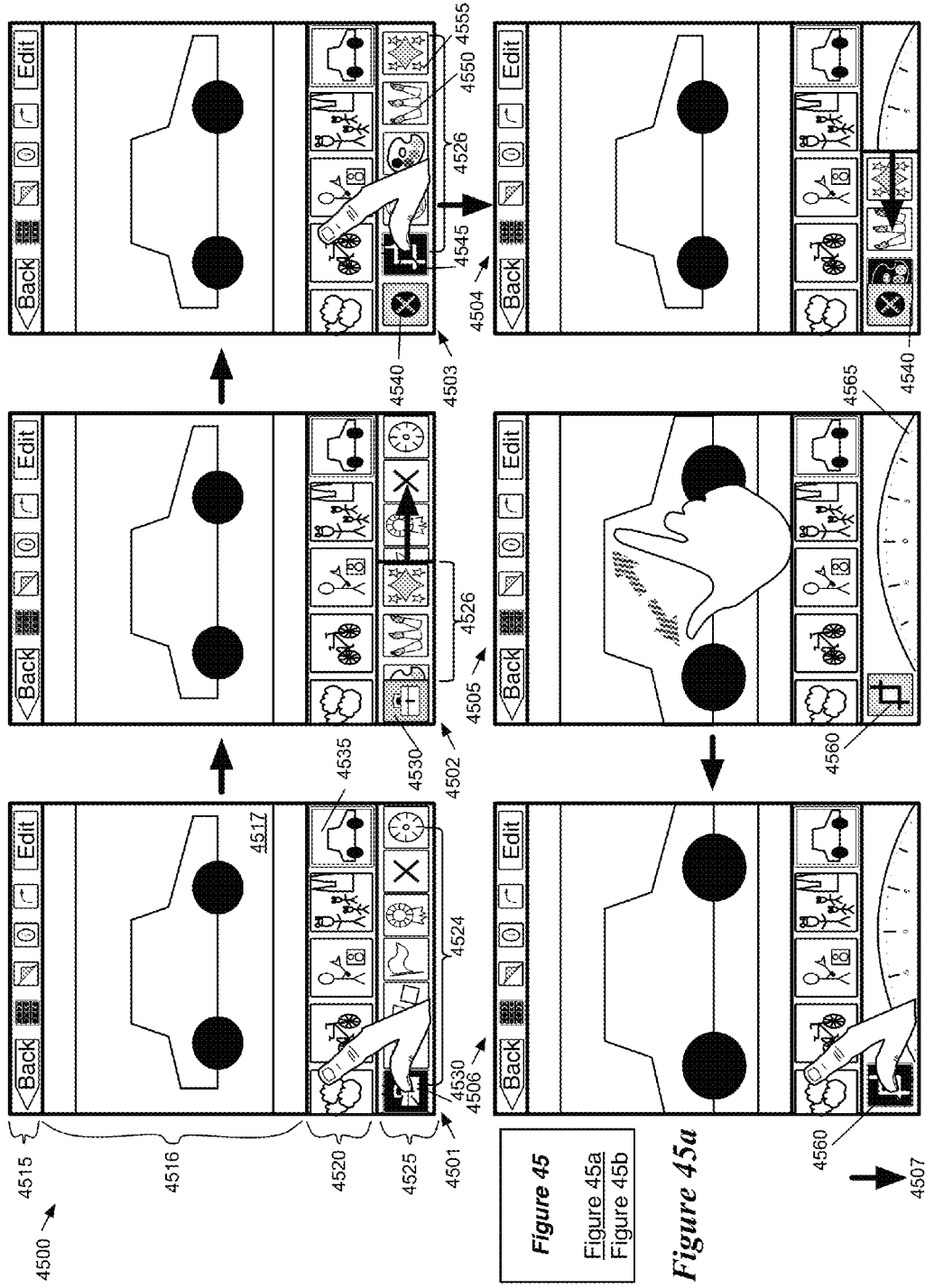

USER INTERFACE TOOLS FOR SELECTIVELY APPLYING EFFECTS TO IMAGE

CLAIM OF BENEFIT TO PRIOR APPLICATIONS

This application claims benefit to U.S. Provisional Patent Application 61/607,550, filed Mar. 6, 2012; U.S. Provisional Patent Application 61/607,569, filed Mar. 6, 2012; and U.S. Provisional Patent Application 61/607,574, entitled "Media Editing Application with Robust Tools," filed Mar. 6, 2012. U.S. Provisional Patent Applications 61/607,550, 61/607,569, and 61/607,574 are incorporated herein by reference.

BACKGROUND

Digital graphic design and image editing applications (hereafter collectively referred to as image editing applications) provide graphical designers, media artists, and other users with the necessary tools to view and edit an image. Examples of such applications are Picasa, which is provided by Google, Photoshop, which is provided by Adobe, Express Media, which is provided by Microsoft, etc. These applications give users the ability to edit images in a variety of manners.

With the proliferation of mobile devices such as tablet computers and smartphones, the utility of these applications has expanded to these devices. However, many image editing applications are adapted for stationary devices like desktops and servers and do not provide with the users with some of the convenient features that could be enjoyed at the mobile devices.

BRIEF SUMMARY

Some embodiments provide an image editing application with a cropping and straightening tool to edit an image. The cropping and straightening tool provides a user with a rotatable user interface (UI) item. The user can rotate this rotatable UI item to a particular direction (clockwise or counterclockwise) and the tool rotates a displayed image to the particular direction accordingly. In this manner, the user can straighten the displayed image by rotating the rotatable UI item.

As the rotatable UI item is rotated, the image editing application in some embodiments plays sound to provide an audible indication that indicates the rotatable UI item is being rotated. The sound that the image editing application in some embodiments plays back is sound that a mechanical dial makes when the mechanical dial is rotated.

The rotatable UI item in some embodiments also includes a set of markings on the rotatable UI item. The markings are for indicating the amount of rotation that the rotatable UI item has been rotated. In some embodiment, a marking pointed by a stationary knob indicates the amount of rotation by which the rotatable UI item has been rotated.

In some embodiments, the image editing application zooms and/or crops the image as the image is getting rotated with respect to the edges of the display area in order to display as much portion of the image as possible while avoid displaying an area outside the image in the display area. In some cases, the image editing application does not zoom as the display image is rotated when the display area has been zoomed already. In these cases, the area outside the image will be displayed in the displayed area.

The cropping and straightening tool allows the user to rotate the rotatable UI item in several different ways. The user can rotate the user interface item by touching and dragging the rotatable UI item. The tool in some embodiments also allows the user to rotate the rotatable UI item by moving the device on which the image editing application is executing. In these embodiments, the device includes a component that is capable of detecting and measuring the movement of the device. The image editing application receives an orientation value from the component and records the value before the device is moved. The image editing application keeps receiving the orientation values from the component while the device is being moved. The image editing application computes the amount by which to rotate the rotatable UI item based on the difference between the recorded orientation value and the latest orientation value.

The user can also rotate the rotatable UI item by performing a rotational multi-touch gesture on the displayed image. When the user makes a rotational multi-touch gesture that is over a threshold amount of rotation, the cropping and straightening tool rotates the rotatable UI item and the displayed image based on the rotational multi-touch gesture.

In some embodiments, the cropping and straightening tool additionally provides a set of UI items in addition to the rotatable UI item. In some embodiments, the set of UI items are for using a horizon line to rotate the rotatable UI item and straighten the displayed image. In these embodiments, the cropping and straightening tool detects the horizon line of the image and displays the horizon line in the image. The tool rotates the rotatable UI item and straightens the image by leveling the horizon line and the image in response to receiving a selection of one UI item in the set of UI items. The tool removes the horizon line and the set of UI items without rotating the rotatable UI item or straightening the image in response to receiving a selection of another UI item in the set of UI items.

The cropping and straightening tool allows the user to crop the image in several different ways. The user can drag an edge or a corner of the image to crop the image. When the user drags an edge or corner of the image towards the center of the image, the cropping and straightening tool crops out the portion of the image that is outside the edge or the corner of the image. In some such embodiments, the cropping and straightening tool maintains the aspect ratio of the image before being cropped while the edge or the corner of the image is being dragged. In some embodiments, the user can zoom in the image and the cropping and straightening tool crops out the portion of the image that falls out of the display area as a result of zooming in the image.

Some embodiments provide an image editing application with an effect tool for applying effects to a selected area of a displayed image. The effect tool in some embodiments allows the user to select an area of the image to which to apply effects by rubbing the image with a finger or an equivalent input apparatus. For some effects, the effect tool applies an effect to a selected area of the image regardless of the number of times the area of the image was rubbed. Such effects include a blemish removal effect and a red eye removal effect. For some other effects, the effect tool incrementally applies an effect to a selected area based on the number of times that the user has rubbed the area of the image. Such effects include saturation, de-saturation, lightening, darkening, sharpening, softening, etc.

In some embodiments, the effect tool assigns a mask value to each pixel of the image. The effect tool uses the mask value to process the pixel of the image. For the effects that the effect tool incrementally applies to the selected area of the image, the effect tool changes the mask value assigned to each pixel in the selected area so as to adjust the amount of effect applied to the area each time the area is touched.

In some embodiments, the effect tool applies a different amount of the effect to the area each time the area is touched. That is, an amount of the effect that the effect tool applies to the area at a first time the area is touched is different than an amount of the effect that the effect tool applies to the area at a second time the area is touched. In some embodiments, the amount of the effect that the effect tool applies to the area is a function of the number of times the area is touched. The function may be linear, non-linear, or a combination of linear and non-linear functions.

In some embodiments, the effect tool selectively applies the effect to a subset of pixels in the selected area of the image. The effect tool identifies a set of criteria based on the image properties of a set of pixels in the area of the image. The effect tool uses the criteria to identify pixels with similar properties. The effect tool applies the effect only to those pixels that satisfy the identified set of criteria. In this manner, the effect tool applies the effect only to the similar group of pixels in the image and leaves other pixels in the area of the image intact.

In some embodiments, the effect tool allows for a constant-sized touch. That is, when the user touches a location of the displayed image, the effect tool applies the effect to the pixels within a distance from the location. This distance is constant with respect to the size of the display area in which the image is displayed. To allow for granular application of the effect, the effect tool allows the user to zoom in the image so that a touch selects a smaller number of pixels (i.e., a smaller area).

Some embodiments provide an image editing application with on-image tools for applying different effects to an image. The image editing application overlay the displayed image with some on-image tools. These overlaid on-image tools are thus visible to the user. Other on-image image tools are not visible to the user.

A tilt-shift tool is a visible on-image tool. The tilt-shift tool in some embodiments includes two visible horizontal lines overlaid on the image. The tilt-shift tool blurs the areas of the image that are above the upper horizontal line and below the lower horizontal line. The tilt-shift tool allows the user to move both horizontal lines together by touching and dragging a space between the two horizontal lines. The tilt-shift tool allows the user to adjust the distance between the two horizontal lines by dragging one or both lines vertically.

A vignette tool is an invisible on-image tool of the image editing application. In some embodiments, the vignette tool darkens the pixels of the image based on the distance by which each pixel of the image is away from the location of an image that is touched. In some such embodiments, the vignette tool uses a sigmoid function to apply a darkening effect. With a sigmoid function, the vignette tool applies little or no darkening effect to the pixels of the image within a first distance from the location and applies most darkening effect to the pixels of the image away from the location by a second distance. The vignette tool gradually applies a darkening effect to pixels between the first and second distances away from the location.

The vignette tool in some embodiments defines an invisible geometric shape around the location of the image that the user has touched and darkens the area of image that is the outside of the geometric shape. The user can resize the geometric shape and the user can touch other locations of the image to apply vignette effect based on the other locations.

A gradient tool is another invisible on-image tool of the image editing application. The gradient tool applies a gradient effect from the top of the displayed image to the location of the image that is touched. The user can define an area to apply a gradient effect by touching other locations of the image.

The gradient tool in some embodiments defines and uses several different types of gradient effects. To define a type of gradient effect, the tool generates a black and white image based on an original image. In some embodiments, the tool emphasizes one color in the black and white image. The tool then generates a mixed image by mixing the black and white image with the original image. In some embodiments, the tool mixes two images by averaging the pixel values of the corresponding pixels in the two images or by multiplying the pixel values of the corresponding pixels in the two images. The tool then generates a blended image by blending the mixed image with the original image.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

FIGS. 45a-45b illustrate an example of selecting and deselecting a cropping and straightening tool through a different GUI of an image editing application of some embodiments.

DETAILED DESCRIPTION

Some embodiments of invention provide novel on-image editing tools for editing an image displayed on a display area of an image editing application. These on-image tools allow the user to apply image processing operations (e.g., saturating, de-saturating, blemish removing, straightening, cropping, etc.) to the image by touching and manipulating the on-image tools.

Some of these on-image tools are visible tools that the image editing application of some embodiments overlays the displayed image. Other on-image tools are invisible tools. These invisible tools allow the user to apply image processing operations by touching the image directly.

Figure 1:
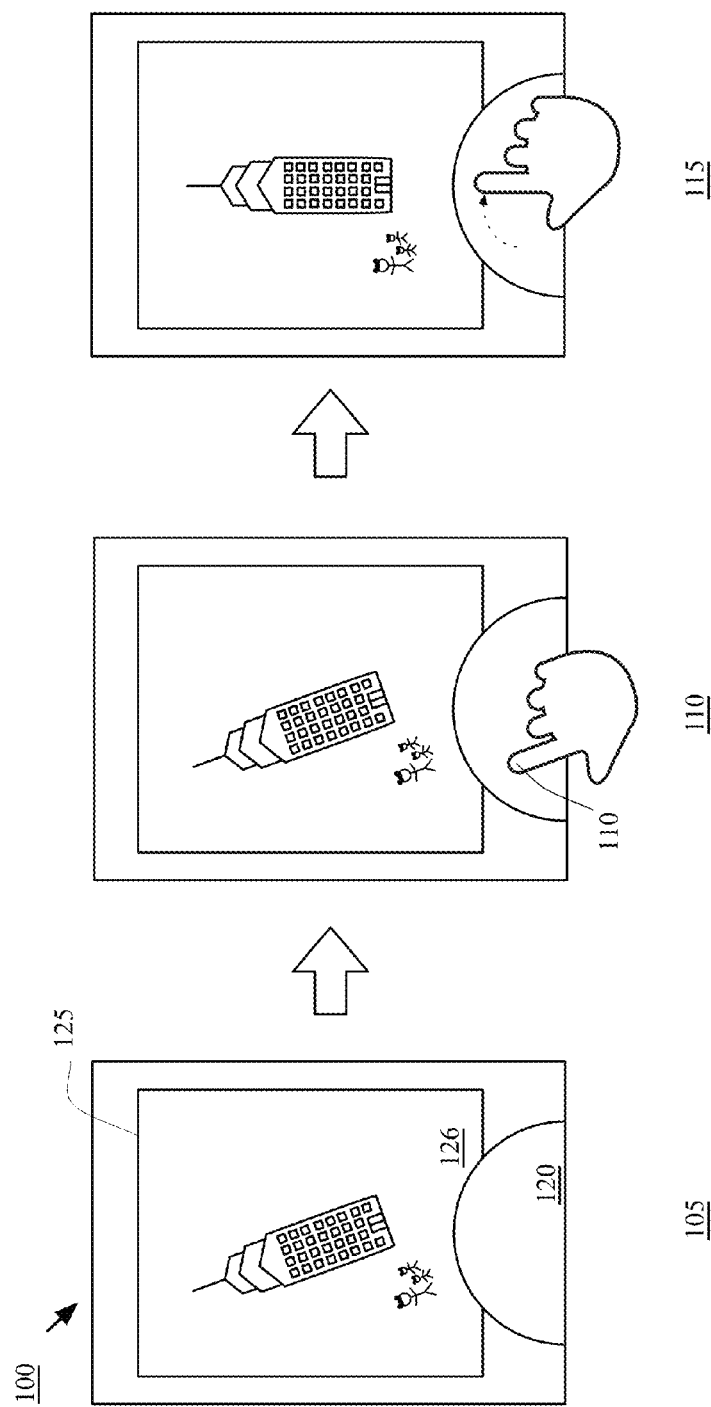
FIG. 1 conceptually illustrates the use of a cropping and straightening tool.

FIG. 1 conceptually illustrates a graphical user interface (GUI) 100 of an image editing application of some embodiments that allows a user to straighten an image by using an on-image tool. Specifically, this figure illustrates in three different stages 105-115 that the user touches a graphical tool in order to rotate an image to straighten an image displayed in an image display area 125. FIG. 1 illustrates that the GUI 100 includes the image display area 125 and a straightening tool 120.

An image editing application (not shown) in some embodiments is a software application for editing images. The image editing application runs on a computing device (e.g., a tablet computer, a smartphone, etc.) with a touch or near touch screen to receive touch inputs in some embodiments. The image editing application allows the user to touch the image by touching the screen that shows the image displayed in the display area of the image editing application.

The image display area 125 displays an image that the user wishes to edit using the image editing application. In some embodiments, the image display area 125 displays an image that has a lower resolution than the resolution of the original image in order to fit the image within the image display area 125 and to quickly process the image.

The straightening tool 120 is a GUI item which the user manipulates to rotate the image displayed in the image display area 125. In some embodiments, the straightening tool 120 is displayed as a geometric shape that is movable (e.g. turnable, rotatable, etc.) by the user. For instance, the straightening tool 120 is a dial (e.g., partial circle) as shown in FIG. 1. The straightening tool 120 allows the user to rotate the image by turning the dial. As the user turns (e.g., by dragging or swiping) the dial into a direction (e.g., left or right, clockwise, counterclockwise), the straightening tool 120 rotates the image displayed in the image display area 125 accordingly in some embodiments.

As shown in FIG. 1, the straightening tool 120 in some embodiments overlaps the image display area 125. In other embodiments, the straightening tool 120 and the display 125 do not overlap. Moreover, instead of or in conjunction with having a geometric shape, the straightening tool 120 in some embodiments has an input text field (not shown) into which the user may enter a numerical value (e.g., degree in angle) by which to rotate the image. Furthermore, the straightening tool 120 in some embodiments also includes a slider control (e.g., a track and a control knob that moves along the track), which the user can touch to straighten the displayed image.

An example operation of the image editing application having the GUI 100 will now be described. At stage 105, the image editing application displays an image 126 in the image display area 125. Next, at stage 110, the user places a finger 111 on the straightening tool 120.

The third stage 115 illustrates the GUI 100 after the user has turned the straightening tool 120 to the right (i.e., clockwise). As the user turns the straightening tool 120, the straightening tool 120 in some embodiments rotates the image displayed in the image display area 125. As shown in the third stage 115, the user has turned the straightening tool just enough to make the displayed image 126 straight (e.g., to make the building and three persons shown in the image level with a horizontal line of the image display area 125 of the GUI 100).

Figure 2:
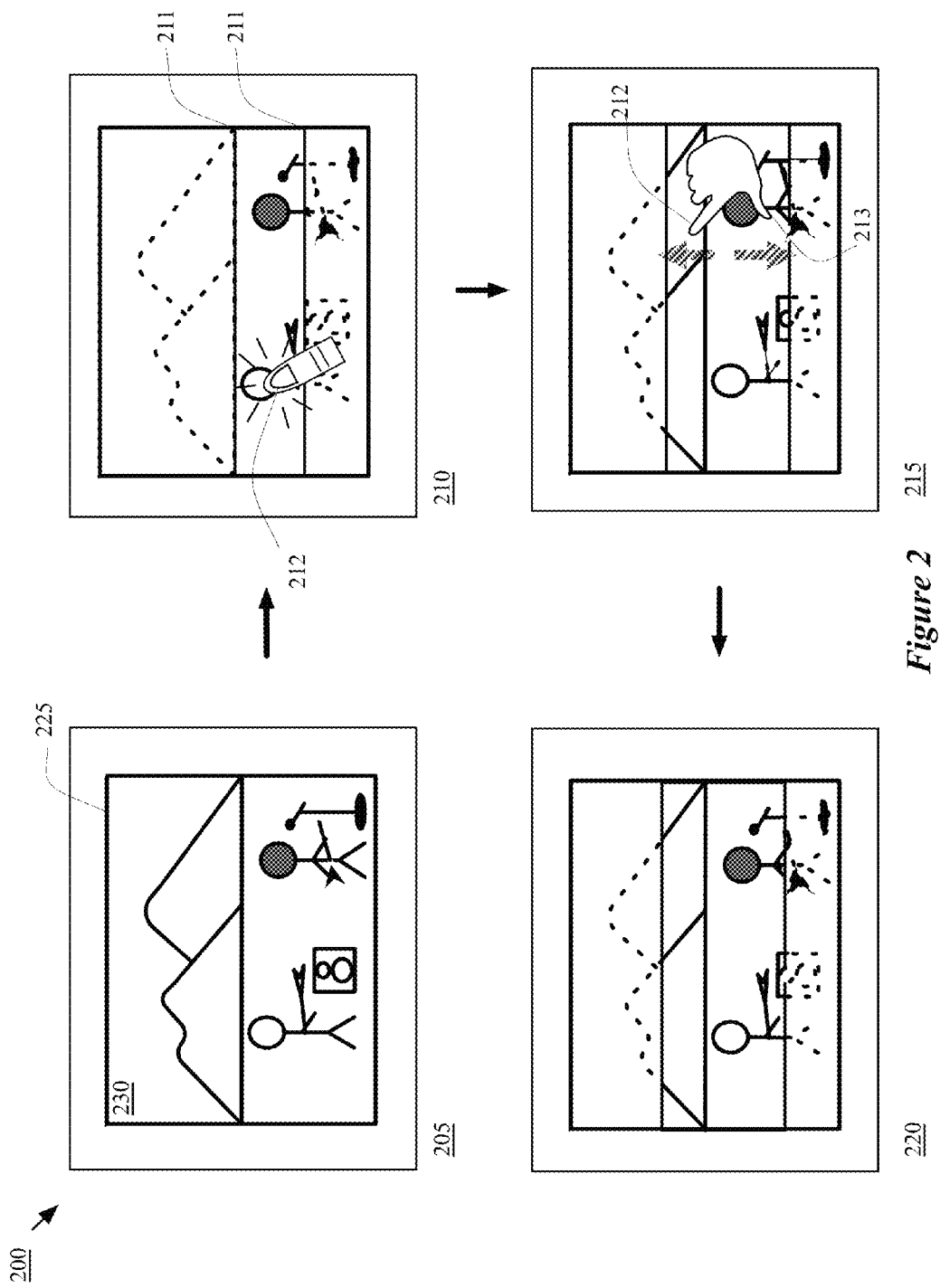
FIG. 2 conceptually illustrates the use of a tilt-shift tool.

FIG. 2 conceptually illustrates a GUI 200 of an image editing application of some embodiments that allows a user to apply a tilt shift effect (i.e., selective focusing effect) to a displayed image by touching the image. Specifically, this figure illustrates in four different stages 205-220 that the user applies a tilt shift effect to an image 225 by touching and manipulating a tilt shift tool 211, which is an overlaid UI control. As shown, FIG. 2 illustrates that the GUI 200 includes an image display area 225.

The image display area 225 displays an image that the user wishes to edit using the image editing application. In some embodiments, the image editing application allows the user to apply a tilt shift effect to the image by touching the displayed image and manipulating the tilt shift tool 211. The image editing application overlays the image displayed in an image display area 225 with the tilt shift tool 211.

In some embodiments, the tilt shift tool 211 includes two parallel lines (top and bottom parallel lines) with which the image editing application overlays on the displayed image 230 in response to receiving a user's touch on the displayed image 230. In some embodiments, the tilt shift tool displays the two parallel lines when the user moves the finger while touching the displayed image. The tilt shift tool 211 places the two parallel lines apart by a predefined distance (e.g., several hundreds of pixels). The tilt shift tool 211 then blurs the portion of the image that is above the top parallel line and the portion of the image that is below the bottom parallel line. As a result, the portion of the image between the two lines appears sharp relative to the sharpness of the rest of the image.

The tilt shift tool 211 in some embodiments allows the user to adjust the distance between the two parallel lines by touching the image. The user can increase the distance by performing a spreading gesture (e.g., spreading two fingers apart while touching the image) on the two parallel lines. The user can decrease the distance by performing a pinch gesture (e.g., gathering two fingers together while touching the image). Also, the user can increase or decrease the distance by moving (e.g., by dragging) one or both of the two parallel lines. The tilt shift tool 211 also allows the user to move the two parallel lines together by touching and dragging the space between the two lines.

An example operation of the image editing application having the GUI 200 will now be described. At stage 205, the image editing application displays the image 230 in the image display area 225. The second stage 210 illustrates the GUI 200 after the user has touched an area of the image slightly below the vertical center of the image. At this stage, the tilt shift tool 211 has placed two parallel lines on the image such that the center of the touched area is equidistant from the two parallel lines. The tilt shift tool 211 also has blurred the portion of the image that is vertically above the top parallel line and the portion of the image that is vertically below the bottom parallel line.

At stage 215, the user has performed a spreading gesture on the image using the finger 212 and another finger 213 to spread the two parallel lines further apart. Both the top and bottom lines have moved. The top line has moved up and the bottom line has moved down. As a result, the portion of the image between the two parallel lines has become bigger and the tilt shift tool does not blur this portion of the image.

The fourth stage 220 illustrates the GUI 200 after the user has lifted the fingers 212 and 213 up from the image 230. The two parallel lines remain visible to indicate that these two lines can be manipulated. When the user exits an edit mode of the image editing application, the two parallel lines disappear from the image 230.

Figure 3:
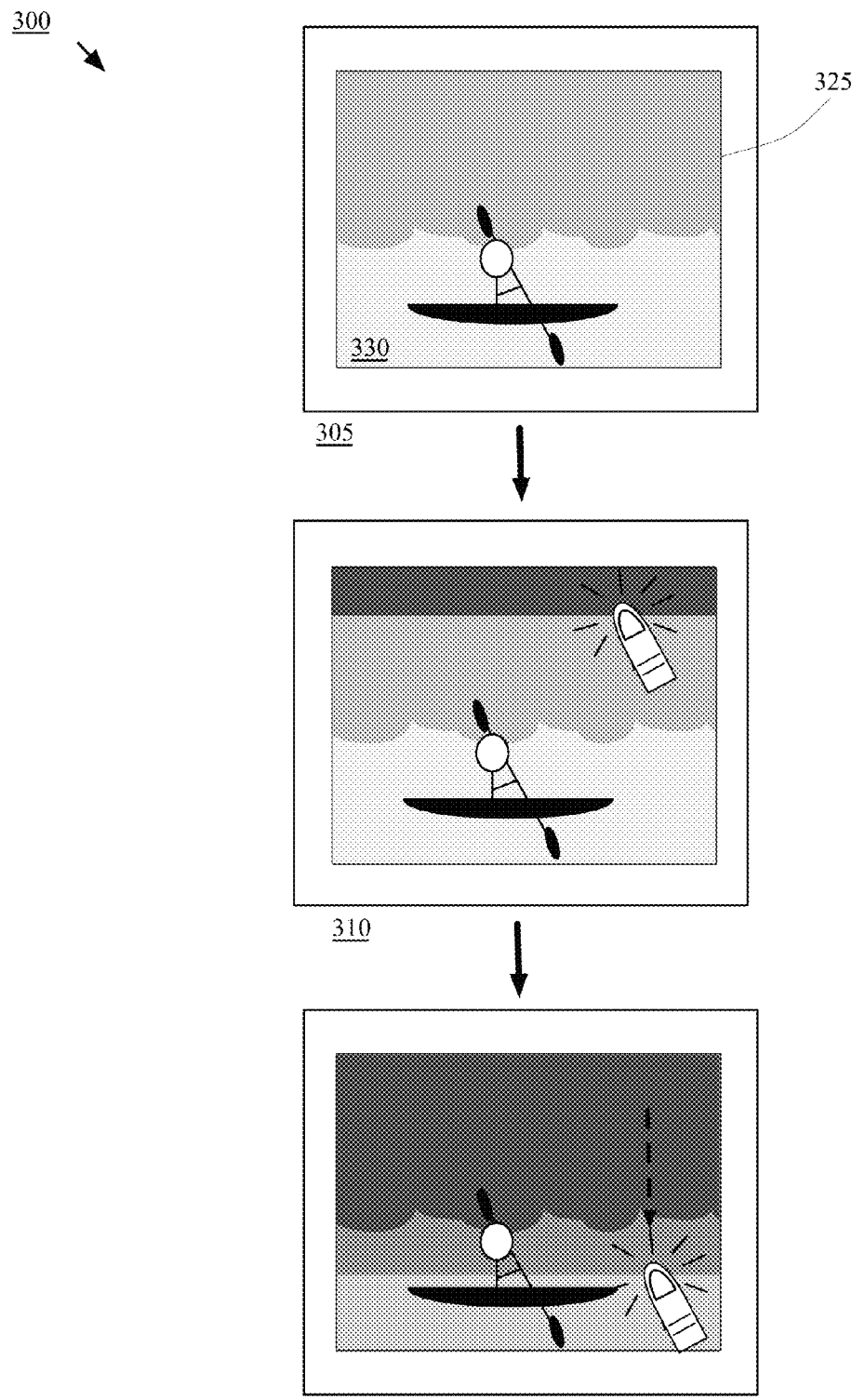
FIG. 3 conceptually illustrates the use of a vignette tool.

FIG. 3 conceptually illustrates a GUI 300 of an image editing application of some embodiments that allows a user to apply image processing operations to an image displayed in an image display area by touching the image. Specifically, this figure illustrates in three different stages 305-315 that the user applies a gradient effect to portions of the image by touching the image. FIG. 3 illustrates that the GUI 300 includes an image display area 325.

The image display area 325 displays an image that the user wishes to edit using the image editing application. In some embodiments, the image editing application allows the user to apply a gradient effect to the displayed image by touching an area of the image or swiping a finger downward to the bottom portion of the display area 325. When the user touches a location of the image, the image editing application applies the gradient effect from the top of the image to the vertical location of the touch in the image. That is, the image editing application varies a degree of an effect (e.g., brightening, darkening, applying a color, etc.) from the top of the image to the location of the touch.

When the user swipes down the image (e.g., drags a finger downwards while touching the image), the image editing application applies the gradient effect from the top of the image to the lowest vertical location that the finger has been. The image editing application also allows the user to swipe upward or touch a location that is vertically upper than the lowest vertical location that the gradient effect is applied in order to reduce the area to which the gradient effect is applied.

In some embodiments, the image editing application does not show a visible horizontal line that the user can manipulate. However, the top portion of the image where the gradient effect has been applied and the bottom portion of the image where the gradient effect is not applied are visually distinguishable because of the effect to the top portion. Thus, there is a visible border (or a visible horizontal strip) that separates the top portion and the bottom portion. This border provides a visual cue to the user and allows the user to manipulate the "invisible" effect tool.

An example operation of the image editing application having the GUI 300 will now be described. At stage 305, the image editing application displays an image 330 in the image display area 345. At stage 310, the user has touched a location near the top of the image 330 with a finger 311 or dragged the finger 311 down to the location while touching the image 330. The image editing application has applied a gradient effect from the top of the image 330 to the location where the finger 311 is. The portion of the image that is above the finger 311 is depicted darker than before to indicate a gradient effect has been applied to this portion.

The third stage 315 illustrates the GUI 300 after the user has touched a location of the image that is closer to the bottom of the image 330 or dragged the finger 311 to this location while touching the image 330. The image editing application has applied the gradient effect from the vertical location where the finger 311 was at the previous stage 310 to the vertical location of the finger 311 at the current stage 315. The portion of the image that is above the finger 311 is depicted darker than before to indicate a gradient effect has been applied to this portion.

Several more detailed embodiments of the on-image editing tools are described in the sections below. Section I describes image cropping and straightening tools of some embodiments. Next, Section II describes several on-image editing tools that allows for applying image processing operations to an image by rubbing the image or by selecting an area of image. Section III describes several visible and invisible on-image tools that allow for applying special effects to the image. Section IV follows with a description of an alternative UI layout for the image editing application. Section V describes software architecture of the image editing application of some embodiments. Next, Section VI describes that the image editing application of some embodiments is also an image viewing, editing, and organization application. Finally, Section VII describes several electronic systems that implement some embodiments described herein.

I. On-Image Straightening and Cropping Tool

A. On-Image Straightening

Figure 4A:
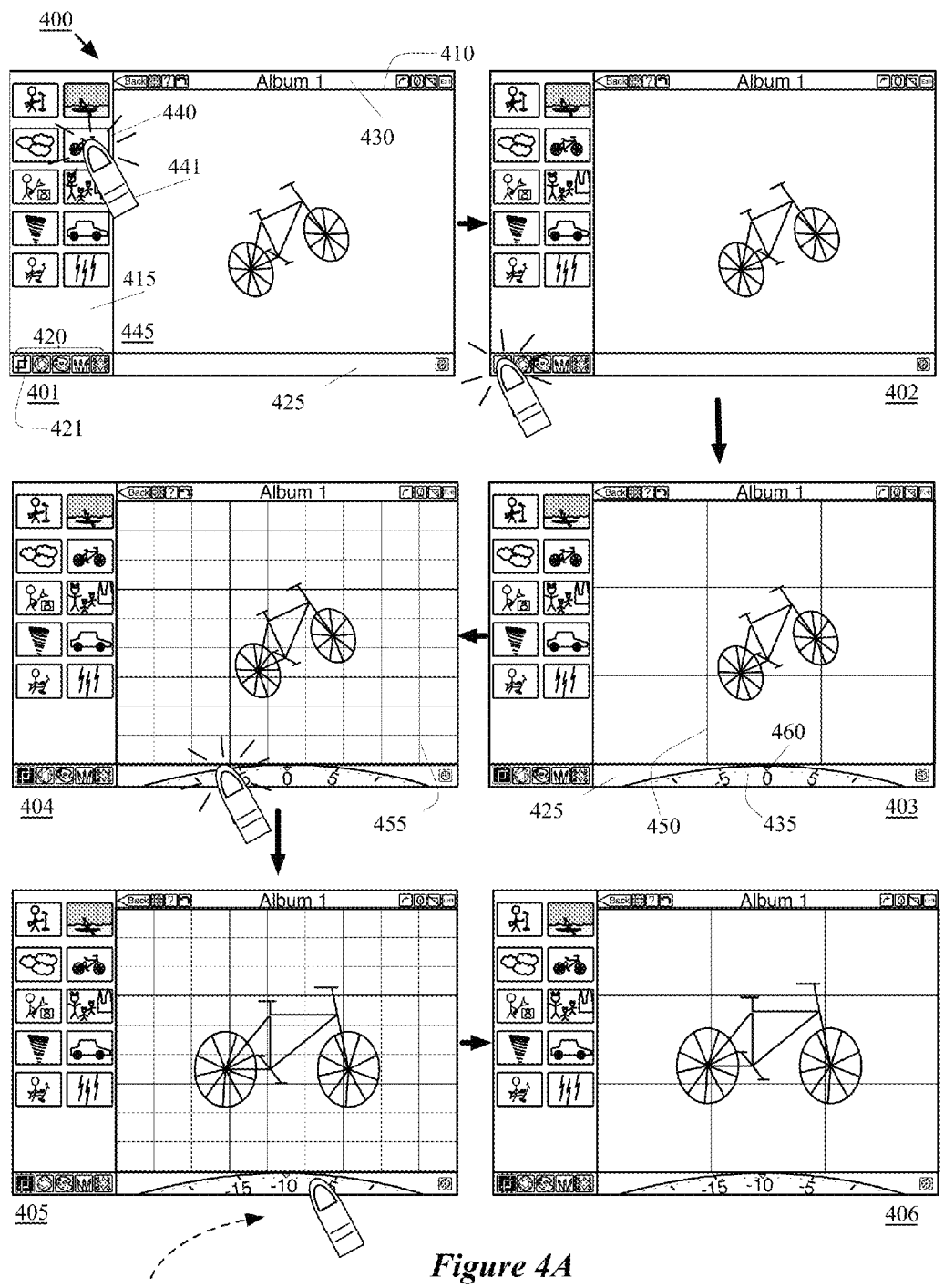
FIG. 4A conceptually illustrates the use of a cropping and straightening tool.

FIG. 4A conceptually illustrates a GUI 400 of an image editing application of some embodiments that allows a user to straighten an image by using an on-image tool. Specifically, this figure illustrates in six different stages 401-406 that the user touches a graphical tool in order to rotate an image to straighten an image. As shown, FIG. 4A illustrates that the GUI 400 includes an image display area 410, a collection display area 415, a tool selection pane 420, a tool display area 425, and a control pane 430.

The image display area 410 displays an image that the user wishes to edit using the image editing application. The collection display area 415 displays a collection of thumbnails of images that are available for editing using the image editing application. When the user selects (e.g., by touching) a thumbnail in the collection display area 415, the image editing application displays the image represented by the selected thumbnail in the image display area 410. The images in some embodiments are digital photographic images taken originally by a digital photographic device (e.g., a digital camera), digitally scanned photographic images, or any images digitally produced.

The tool selection pane 420 in some embodiments displays a set of icons that represent different editing tool sets of the image editing application. When the user selects (e.g., by touching) an icon in the tool selection pane 420, the image editing application displays a corresponding set of tools in the tool display area 425 and/or in the image display area 410. The image editing application in some embodiments provides a visual cue for indicating which set of tools is currently selected. For instance, the image editing application highlights a selected icon. In some embodiments, the left most icon 421 displayed in the tool selection pane 420 represents an on-image cropping and straightening tool. When the user selects the icon 421, the image editing application in some embodiments activates the cropping and straightening tool.

That is, the image editing application treats some of the user inputs (e.g., touch inputs) to the image in the image display area as inputs to the activated tools. The image editing application also displays the straightening tool 430 in the tool display area 425 in response to the selection of the icon 421.

The straightening tool allows the user to straighten the image displayed in the image display area 410. Straightening an image means making the objects and persons in the image not appear tilted to either side of the photo. The straightening tool in some embodiments also zooms in and/or crops the image as the image is getting straightened, in order to maintain the aspect ratio of the original image for the straightened image and to avoid including areas outside the original image in the final crop.

The straightening tool provides a number of different ways to straighten the displayed image. For instance, the straightening tool of some embodiments includes a dial 435. The straightening tool allows the user to straighten the displayed image by turning or rotating the dial 435. In some embodiments, the straightening tool rotates the displayed image in the direction (e.g., clockwise or counterclockwise) in which the dial 435 is turning or rotating. The straightening tool rotates the displayed image by the amount by which the dial 435 turns or rotates.

In some embodiments, the dial 435 has markings and numbers to indicate the amount of turn or rotation of the dial 435. The dial 435 also has a stationary knob 460, which does not move as the dial 435 rotates in order to provide a frame of reference. The number or a marking that is pointed by or aligned to the stationary knob 460 indicates the amount of turn or rotation of the dial 435. The numbers on the dial 435 in some embodiments represent angles in degrees or radians or any other suitable units that can represent angle or amount of rotation. The sign of the numbers (i.e., negative or positive) indicate the direction of rotation. In some embodiments, a negative number indicates that the dial 435 and the displayed image has rotated to clockwise. A positive number indicates that the dial 435 and the displayed image has rotated counterclockwise.

Different embodiments differently define the relationship between the direction of the user's touch, the direction of the rotation of the dial 435, the direction of the rotation of the image, and the sign of the numbers shown in the dial 435. For instance, in some embodiments, the image editing application rotates the displayed image in a direction that is opposite to the direction of the rotation of the dial 435. Also, a positive number on the dial 435 may indicate a clockwise rotation of the displayed image and a negative number on the dial 435 may indicate a counterclockwise rotation of the displayed image.

In some embodiments, the image editing application plays back audio to provide an audible cue to the user when the user is turning the dial 435. The audio that the image editing application plays back is a sound that mechanical dial makes when the mechanical dial is being turned or rotated in some embodiments.

The dial 435 in some embodiments is displayed in the tool display area 425 when the user selects the icon 421 in the tool selection pane 420. In other embodiments, the image editing application displays the dial 435 in the image display area 410 such that the dial 435 partially overlaps the image displayed in the image display area 410. The image editing application may also display the dial in different part of the GUI 400 in different shapes and sizes. For instance, the dial 410 may be displayed as having a full circular shape in a corner of the image display area 410.

When the image editing application activates the cropping and straightening tool in response to the user's selection of the icon 421, the image editing application in some embodiments displays a set of gridlines 450 over the image displayed in the image display area 410. The gridlines 450 indicate that the cropping and straightening tool is activated and also provides a guide when the user crops the displayed image. The gridlines 450 in some embodiments turns the image display area 410 into a 3×3 grid. In some embodiments, the image editing application does not display the set of gridlines 450 until the user touches the displayed image. In some embodiments, the image editing application does not display the set of gridlines 450 until the dial 435 is turned.

In addition to the set of gridlines 450, the image editing application displays another set of gridlines 455 when the user starts turning the dial 435. This addition set of gridlines 455 provides additional visual aid when the user attempts to straighten the displayed image. For instance, the user's can see that the displayed image is straightened when the objects or persons shown in the displayed image are orthogonal to the gridlines. The gridlines 450 and 455 in some embodiments together turns the image display 410 into a 9×9 grid. One of the ordinary skill in the art will recognize that the grid into which the gridlines 450 and 455 turn the display area does not have to have particular dimensions like 3×3 or 9×9 and can have any different dimensions. Moreover, the image editing application in some embodiments draws the gridlines 450 and 455 in different colors. For instance, the gridlines 450 are in white and the gridlines 455 are in yellow.

The control pane 430 displays a set of different icons that represent different operations that the image editing application performs in response to a selection of an icon. The control pane 430 in some embodiments displays the name of the collection of images whose thumbnails are displayed in the collection display area 415. The control pane 430 may also display the name (e.g., filename) of the image displayed in the image display area 425.

An example operation of the image editing application that includes the GUI 400 will now be described. The first stage 401 illustrates the user's selection of a thumbnail 440 by touching the thumbnail 440 with a finger 441. The image editing application displays the image 445, represented by the thumbnail 440, in the image display area 410 in response to the selection of the thumbnail 440.

At stage 402, the user then selects the icon 421 displayed in the tool selection pane 420. In response, the image editing application at stage 403 activates the cropping and straightening tool. The image editing application highlights the icon 421. The image editing application also displays the dial 435 in the tool display area 425 and the gridlines 450 in the image display area 410. The number on the dial 435 pointed by the stationary knob 460 reads "0" to indicate that the dial 435 has not been turned to either direction at all.

At stage 404, the user places the finger 441 on a portion of the dial 435 and starts turning the dial clockwise (i.e., to the right). The image editing application in some embodiments displays the gridlines 455 when the user places the finger 441 or when the user starts turning the dial 435.

The next stage 405 illustrates the GUI 400 after the user has turned the dial 435 clockwise. The cropping and straightening tool has turned the displayed image 445 clockwise by the amount of the dial 435's rotation. In this example, "−10" that is pointed by the stationary knob 460 to indicate that the dial 435 and the displayed image 445 have rotated clockwise by 10 degrees. The stage 405 also illustrates that the straightening tool has zoomed in (hence, the bike in the image appears bigger) and cropped the image 445 in order to avoid displaying in the display area 410 a part that falls outside the image 445 before being rotated. That is, had the straightening tool rotated the image 445 without cropping and zooming in, the part that falls outside the image 445 would have to be displayed in the image display area 410. As shown, the straightening tool in some embodiments rotate the image with respect to the edges of the display area 410 as the dial 435 is rotated. That is, only the objects and persons shown in the image get rotated with respect to the edges of the image display area 410 so that the objects and persons do not appear tilted.

The final stage 406 illustrates the GUI 400 after the user has lifted the finger 441 from the dial 435 and is no longer touching the dial 435. The image editing application also has removed the gridlines 455 because the dial 435 is no longer being touched.

Figure 4B:
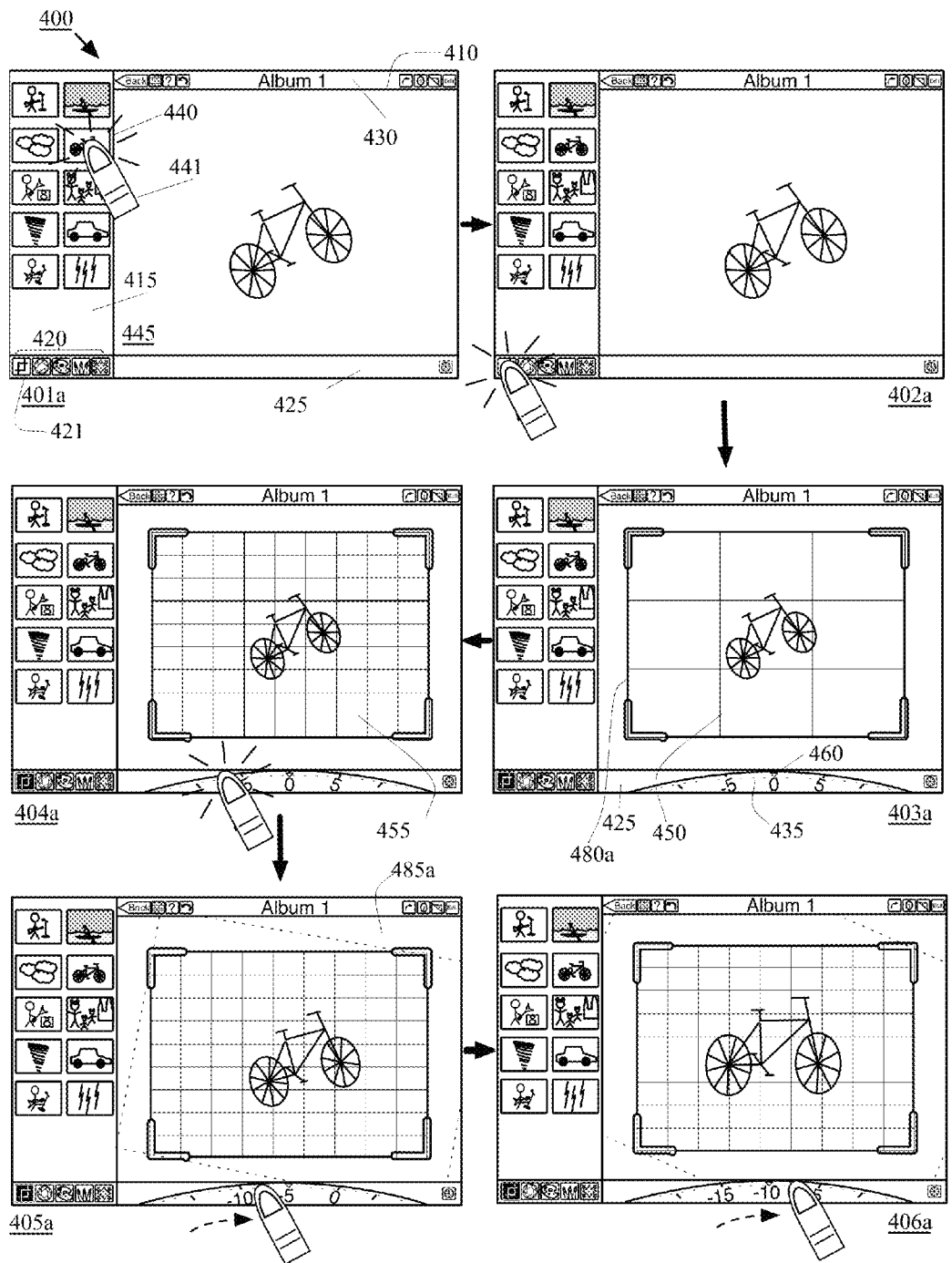
FIG. 4B conceptually illustrates the use of a cropping and straightening tool.

FIG. 4B conceptually illustrates the GUI 400 of an image editing application of some embodiments that allows a user to straighten an image by using an on-image tool. This figure illustrates in six different stages 401a-406a that the user touches a graphical tool in order to rotate an image to straighten an image. Specifically, FIG. 4B illustrates the GUI 400 of some embodiments that has an inner display area 480a.

The image display area 410 of some embodiments includes the inner display area 480a. The image editing application of some embodiments adjusts zooming level for the displayed image such that a maximum portion of the displayed image is displayed in the inner display area 480a while avoiding displaying a border of the image in the inner display area 480a, while the image is being rotated clockwise or counterclockwise. In some embodiments, the border of the image is displayed in an area of the display area 410 that is outside the inner display area 480a while the image is being rotated. This area is referred to as an outer area of the display area 410. Also, the portion of the image that falls within the outer area of the display area 410 appear faded in some embodiments. The inner display area 480a are applicable to the image editing application of the embodiments described below (e.g., by reference to FIGS. 9, 12, and 13)

An example operation of the image editing application that includes the GUI 400 will now be described. The first and second stages 401a and 402a are identical with the stages 401 and 402 described above by reference to FIG. 4A. In response to the selection of the icon 421 at the stage 402a, the image editing application at stage 403a activates the cropping and straightening tool. The image editing application displays the inner display area 480a within the display area 410. In some embodiments, the inner display area 480a is smaller than the display area 410 and the image editing application displays the inner display area 480a at the center of the display area 410.

The image editing application displays the image 445 within the inner display area 480a. The image editing application highlights the icon 421. The image editing application also displays the dial 435 in the tool display area 425 and the gridlines 450 in the inner display area 480a. The number on the dial 435 pointed by the stationary knob 460 reads "0" to indicate that the dial 435 has not been turned to either direction at all.

At stage 404a, the user places the finger 441 on a portion of the dial 425 and starts turning the dial clockwise (i.e., to the right). The image editing application in some embodiments displays the gridlines 455 in the inner display area 480a when the user places the finger 441 or when the user starts turning the dial 435.

The next stage 405a illustrates the GUI 400 after the user has turned the dial 435 clockwise. The cropping and straightening tool has turned the displayed image 445 clockwise by the amount of the dial 435's rotation. In this example, "−5" that is pointed by the stationary knob 460 to indicate that the dial 435 and the displayed image 445 have rotated clockwise by 5 degrees. The stage 405a also illustrates that the straightening tool has zoomed in (hence, the bike in the image appears bigger) the image such that a maximum portion of the image 445 is displayed within the inner display area 480a without displaying a border of the image within the inner display area 480a. As shown, other portions of the image that fall out of the inner display area 480a are displayed in an outer area 485a (i.e., the region of the display area 410 that is outside of the inner display area 480a). Portions of the upper and side borders of the image 455 are also displayed in the outer area 485a of the display area 410.

The final stage 406a illustrates the GUI 400 after the user has further turned the dial 435 clockwise. The cropping and straightening tool has turned the displayed image 445 clockwise by the amount of the dial 435's rotation. In this example, "−10" that is pointed by the stationary knob 460 to indicate that the dial 435 and the displayed image 445 have rotated clockwise by additional 5 degrees since the last stage 405a. The stage 406a also illustrates that the straightening tool has changed the zooming level (hence, the bike in the image appears bigger) the image such that a maximum portion of the image 445 is displayed within the inner display area 480a for this particular amount of the image's rotation without displaying a border of the image within the inner display area 480a. As shown, the bicycle appears bigger than it appeared in the previous stage 405a because the image editing application has further zoomed in the image 455. The gridlines 455 would disappear once the user lifts the finger from the dial in some embodiments.

Figure 5:
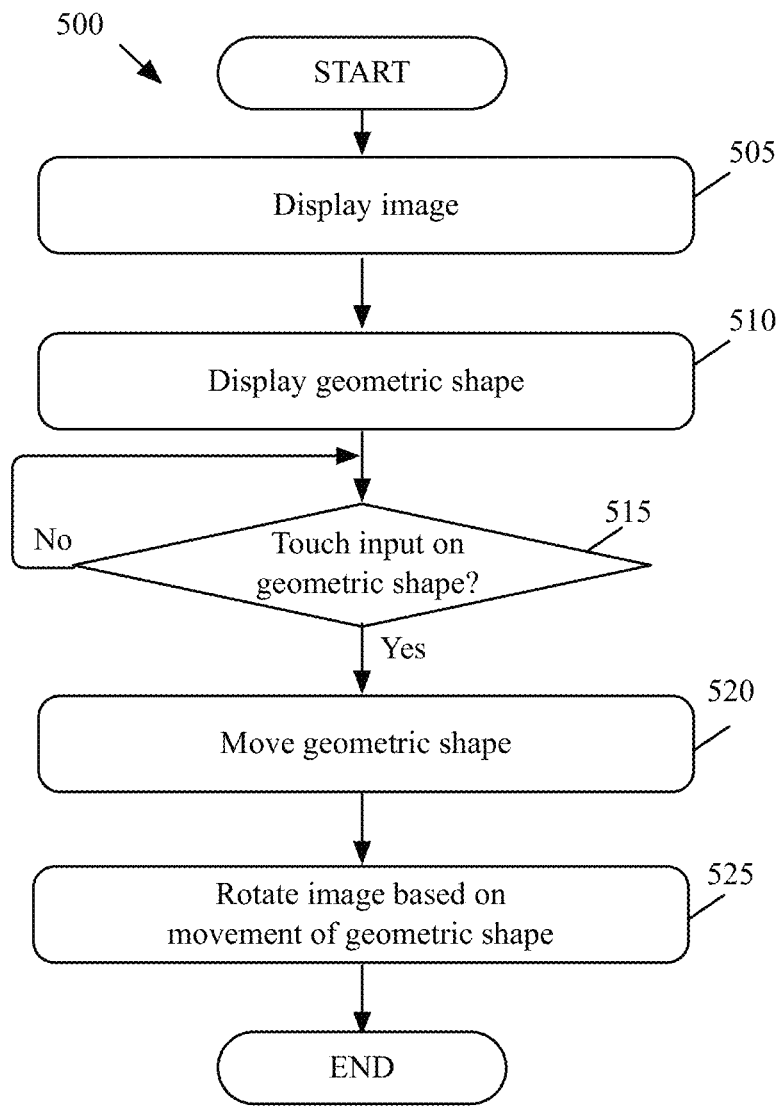
FIG. 5 conceptually illustrates a process that some embodiments perform to allow a user to straighten an image.

FIG. 5 conceptually illustrates a process 500 that some embodiments perform to allow a user to straighten an image by manipulating a graphical user interface item (e.g., the dial 435 described above by reference to FIGS. 4A and 4B) of an image editing application. The process 500 in some embodiments is performed by an image editing application. The process 500 starts when the image editing application runs on a computing device that has a touch or near touch sensitive screen to receive touch inputs from the user. The process 500 begins by displaying (at 505) an image in an image display area (e.g., display area 410 or inner display area 480a described above) of the image editing application.

Next, the process 500 displays (at 510) a geometric shape in an area of the image editing application. In some embodiments, the process 500 displays the geometric shape at least partially in an image display area (e.g., the image display area 410). In other embodiments, the process 500 displays the geometric shape such that the geometric shape and the displayed image do not overlap. Different embodiments use different geometric shapes to display. For instance, the process 500 uses a dial-shape (e.g., a partial circular shape) as the geometric shape to display.

The process 500 then determines (at 515) whether the geometric shape has received any touch inputs. That is, the process determines (at 515) whether the user has touched the geometric shape (by touching the area of the touch or near touch sensitive screen that shows the geometric shape). When the process 500 determines (at 515) that the geometric shape has not received any touch inputs, the process 500 loops to 515 to wait for touch inputs on the geometric shape.

When the process 500 determines (at 515) that the geometric shape has received a touch input, the process proceeds to 520 to move the geometric shape based on the received touch input. For instance, the process 500 rotates the geometric shape to the right (i.e., clockwise) when the user swipes the geometric shape from the left to the right. Likewise, the process 500 rotates the geometric shape to the left when the user swipes the geometric shape from the right to the left.

The process 500 then rotates (at 525) the displayed image based on the movement of the geometric shape. In some embodiments, the process 500 rotates the displayed image by an amount (e.g., degrees in angle) proportional to the amount by which the geometric shape has rotated. The process then ends.

The cropping and straightening tool of some embodiments described so far zooms in the displayed image as the image is getting straightened. In some cases, the cropping and straightening tool does not zoom in as the displayed image is getting straightened.

Figure 6:
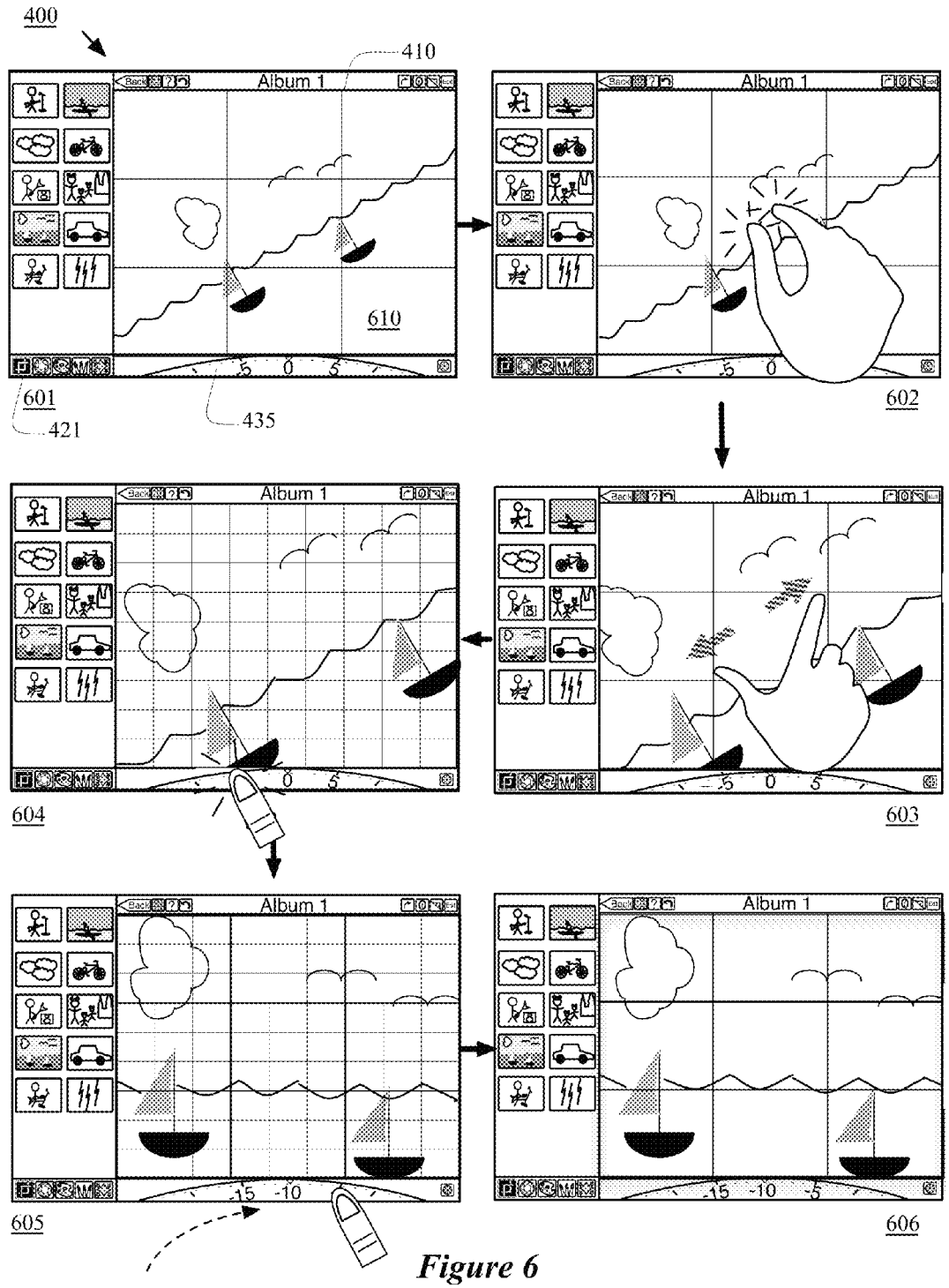
FIG. 6 conceptually illustrates straightening an image without zooming the image.

FIG. 6 illustrates the GUI 400 of the image editing application. Specifically, this figure illustrates in six different stages 601-606 that, when the GUI 400 has zoomed in on displayed image 610, the straightening tool does not zoom in on image 610 prior to straightening the image.

In some embodiments, the image editing application allows the user to crop an image displayed in the display area 410 by zooming in the displayed image by performing a spreading gesture on the image (e.g., touching the image with two fingers gathered and then spreading the fingers while touching the image). When the image editing application zooms in the image, some portions of the image will not be displayed in the image display area 410 because the portions will fall out of the image display area. The image editing application in some embodiments crops out these portions of the image (i.e., trims these portions from the image).

When the image gets straightened after the image editing application has zoomed in the displayed image, the straightening tool of some embodiments does not zoom in additionally when the straightening tool rotates the image to straighten the image. This is because the straightening tool can use the cropped out portions of the image when the straightening tool straightens the image.

An example operation of the image editing application will now be described. At stage 601, an image 610 is displayed in the image display area 410. The icon 421 is highlighted to indicate that the cropping and straightening tool is activated. The number on the dial 435 pointed by the stationary knob 460 is 0 to indicate that the dial 435 has not been rotated. The gridlines 450 are also displayed in the image display area 410.

At stage 602, the user touches the image 610 with two fingers. At stage 603, the user spreads the fingers apart while touching the image 610. The cropping and straightening tool zooms in the image and thereby crops out portions of image that cannot fit into the image display area 410.

At stage 604, the user places a finger on the dial 435 and starts rotating the image 610. The additional gridlines 455 are displayed in the image display area 410. The next stage 605 illustrates the GUI 400 after the user has turned the dial 435 clockwise. The cropping and straightening tool has turned the displayed image 610 clockwise accordingly but has not zoomed in the image 610 any further by using the portions of the image that were cropped out at stage 603. The number indicated by the stationary knob 460 indicates that the dial 435 and the image 610 has rotated clockwise by 10 degrees.

The final stage 606 illustrates the GUI 400 after the user has lifted the finger 441 from the dial 435 and is no longer touching the dial 435. The image editing application also has removed the gridlines 455 because the dial 435 is no longer being touched.

Figure 7:
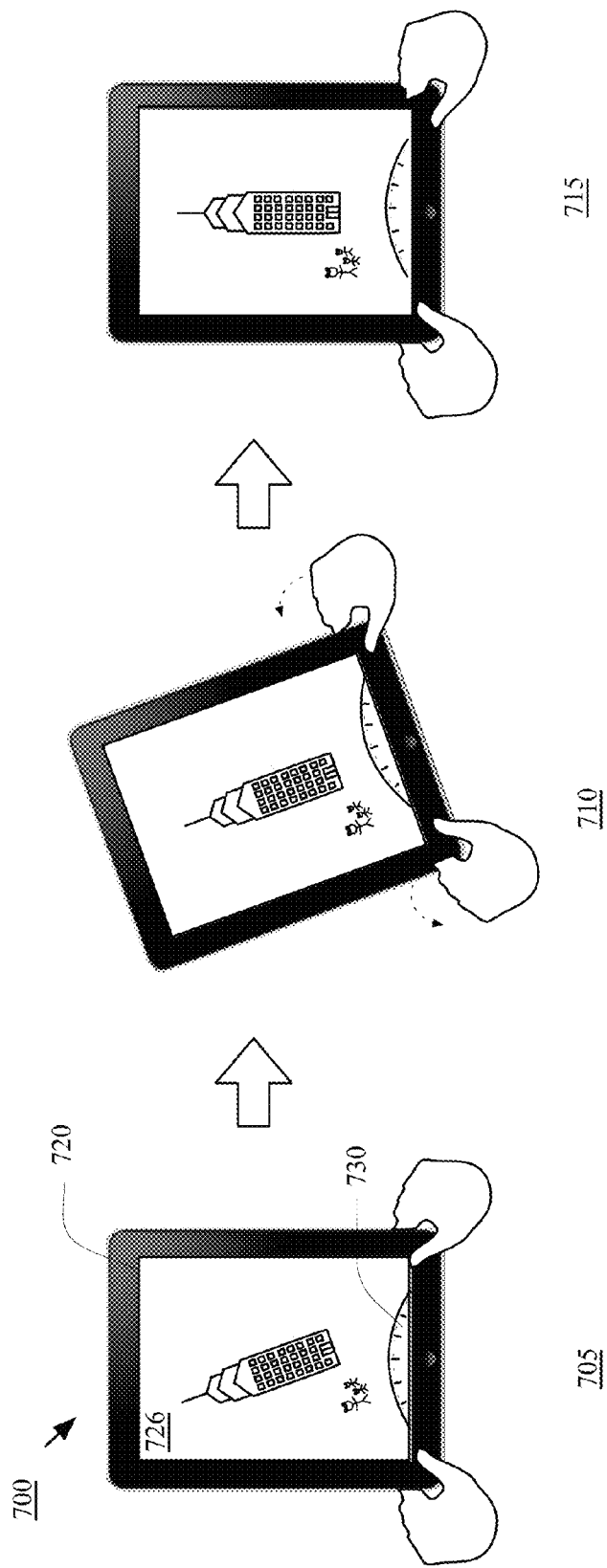
FIG. 7 conceptually illustrates straightening an image by rotating a device on which the image editing application runs.

The cropping and straightening tool of some embodiments described so far allows the user to straighten a displayed image by touching a dial. The cropping and straightening tool provides other means to control the dial. FIG. 7 conceptually illustrates a computing device 700 on which the image editing application of some embodiments runs. Specifically, this figure illustrates in three different stages 705-715 that a user rotates a displayed image by manipulating an overlaid straightening tool by turning or rotating the computing device 700. FIG. 7 illustrates a GUI of the image editing application that includes an image display area 725 and a straightening tool 730.

The computing device 700 has a touch or near touch sensitive screen to receive touch inputs. Some examples of the computing device 700 includes a tablet computer (e.g., Apple iPad®) and a smartphone (e.g., Apple iPhone®). The computing device 700 also has one or more devices (e.g., a gyroscope, an accelerometer, etc.) that detect and measure the movement of the computing device 700. In some embodiments, the image editing application uses these devices to detect and measure the movement of the computing device 700. For instance, the image editing application receives orientation values from a gyroscope (not shown) of the computing device 700. In some embodiments, these orientation values include an x-axis orientation value, a y-axis orientation value, and a z-axis orientation value, with the z-axis being orthogonal to the ground and the x-axis and y-axis being parallel to the ground. Thus, when the computing device 700 is rotated at the same height from the ground level (e.g., when the computing device 700 is rotated atop a table that is level on the ground), only the z-axis orientation value changes.

The GUI 720 is similar to the GUI 100 described above by reference to FIG. 1. Also, the image display area 725 is similar to the image display area 125 and the straightening tool 730 is similar to the straightening tool 120. The straightening tool 730 has markings 731 to indicate the amount of rotation of the image displayed in the image display area 725.

In some embodiments, the image editing application in some embodiments allows the user to manipulate the straightening tool 730 by moving (e.g., turning, rotating, etc.) the computing device 730. The image editing application records the initial orientation value for all three x-, y-, and z-axis or at least the z-axis of the computing device 730 before the computing device 730 is moved by user. When the user turns (e.g., changes the orientation of) the computing device 730, the image editing application in some embodiments keeps the orientation of the straightening tool 130 with respect to the recorded initial orientation values (especially, the z-axis orientation value) of the computing device 730. As a result, the straightening tool 730 turns with respect to the changing orientation of the computing device 730 as the user turns the computing device 700.

The straightening tool 730 rotates the image displayed in the image display area 725 with respect to the changing orientation of the computing device 730 according to the amount of rotation of the straightening tool 730 has made. Accordingly, the image editing application of some embodiments keeps the orientation of the displayed image with respect to the initial orientation of the computing device when the computing device is being moved.

An example operation of the image editing application having the straightening tool 730 will now be described. The first stage 705 illustrates that the user holds the computing device 700 still and the image editing application displays an image 726 in the image display area 720. Here, the computing device 730 is assumed to be placed on a table that is level to the ground in this example. The markings 731 of the straightening tool 730 are at their respective initial positions. The image editing application records (e.g., in memory of the computing device 700) the z-axis orientation of the computing device 700 before the computing device 700 is moved.

At stage 710, the user tilts the computing device 700 to the left as shown until the people and the building shown in the displayed image are straightened with respect to the current orientation of the computing device 700. As the user turns the computing device to the left, the image editing application receives or retrieves from a gyroscope (not shown) of the computing device 700 the amount of rotation that the computing device 700 has made from the initial orientation of the computing device 700. The image editing application turns the straightening tool 730 to the right with respect to the changing orientation of the computing device 730. The marking 731 are rotating to the right to indicate the straightening tool 730 has turned to the right. The straightening tool 730 rotates the image 710 to the right in accordance with the amount by which the straightening tool 730 has rotated.

The image editing application also receives a user input that indicates that the user does not intend to rotate the straightening tool 730 and the displayed image by rotating the computing device 700. Upon receiving such input, the image editing application does not rotate the straightening tool 730 and the displayed image when the user further rotates the computing device 700.

At the third stage 715, the user has turned the straightening tool 730 such that the current orientation of the computing device 730 is the same as the recorded initial orientation of the computing device 730. As shown, the displayed image has been straightened. That is, the people and the building shown in the displayed image are orthogonal to the edge of the image display area 725.

Figure 8:
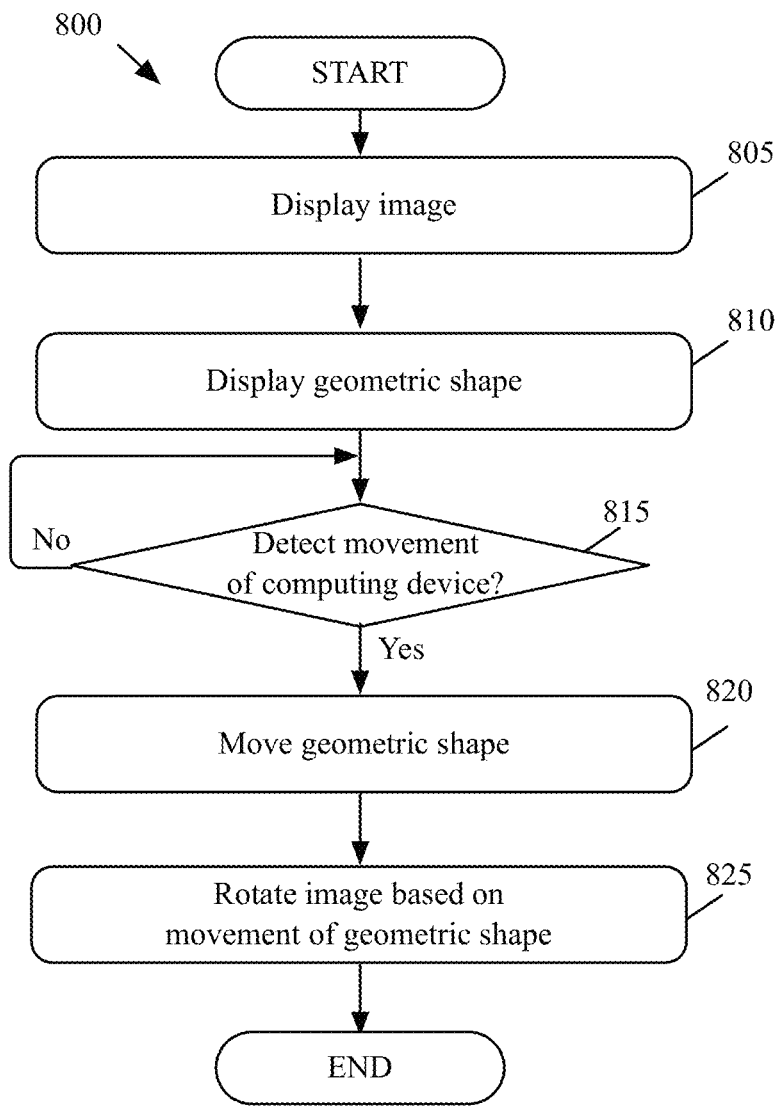
FIG. 8 conceptually illustrates a process that some embodiments perform to allow a user to straighten an image by rotating a device.

FIG. 8 conceptually illustrates a process 800 that some embodiments perform to allow a user to straighten an image by manipulating a graphical user interface item of an image editing application that runs on a computing device. The process 800 in some embodiments is performed by an image editing application. The process 800 starts when the image editing application runs on the computing device that has one or more devices (e.g., a gyroscope, an accelerometer, etc.) that detect and measure the movements of the computing device. The process 800 begins by displaying (at 805) an image in an image display area of the image editing application. Examples of image display areas include the image display area 725 described above by reference to FIG. 7.

Next, the process 800 displays (at 810) a geometric shape in an area of the image editing application. In some embodiments, the process 800 displays the geometric shape at least partially in the image display area. In other embodiments, the process 800 displays the geometric shape such that the geometric shape and the displayed image do not overlap. Different embodiments display different geometric shapes. For instance, the process 800 displays a dial-shape (e.g., a partial circular shape) as the geometric shape.

The process 800 then determines (at 815) whether the computing device has moved. In some embodiments, the process 800 receives or retrieves the orientation information from a gyroscope of the computing device and uses the orientation information to determine whether the computing device has moved. The process 800 also keeps the orientation information containing the current orientation of the computing device. The process 800 compares the current orientation of the computing device and the previously recorded orientation of the computing device in order to determine the movement of the computing device with respect to a particular axis. The process determines that the computing device has not moved with respect to the particular axis when the orientation with respect to the particular axis does not change.

When the process 800 determines (at 815) that the computing device has not moved, the process 800 loops to 815 to wait for the movement of the computing device. When the process 800 determines (at 815) that the computing device has moved, the process proceeds to 820 to move the geometric shape based on the movement of the computing device. For instance, the process 800 rotates the geometric shape to the right with respect to the recorded initial rotation of the computing device when the user tilts the computing device to the left. Likewise, the process 820 rotates the geometric shape to the left when the user tilts the computing device to the right.

The process 800 then rotates (at 825) the displayed image based on the movement of the geometric shape. In some embodiments, the process 800 rotates the displayed image by an amount (e.g., degrees in angle) proportional to the amount by which the geometric shape has rotated. The process then ends.

Figure 9:
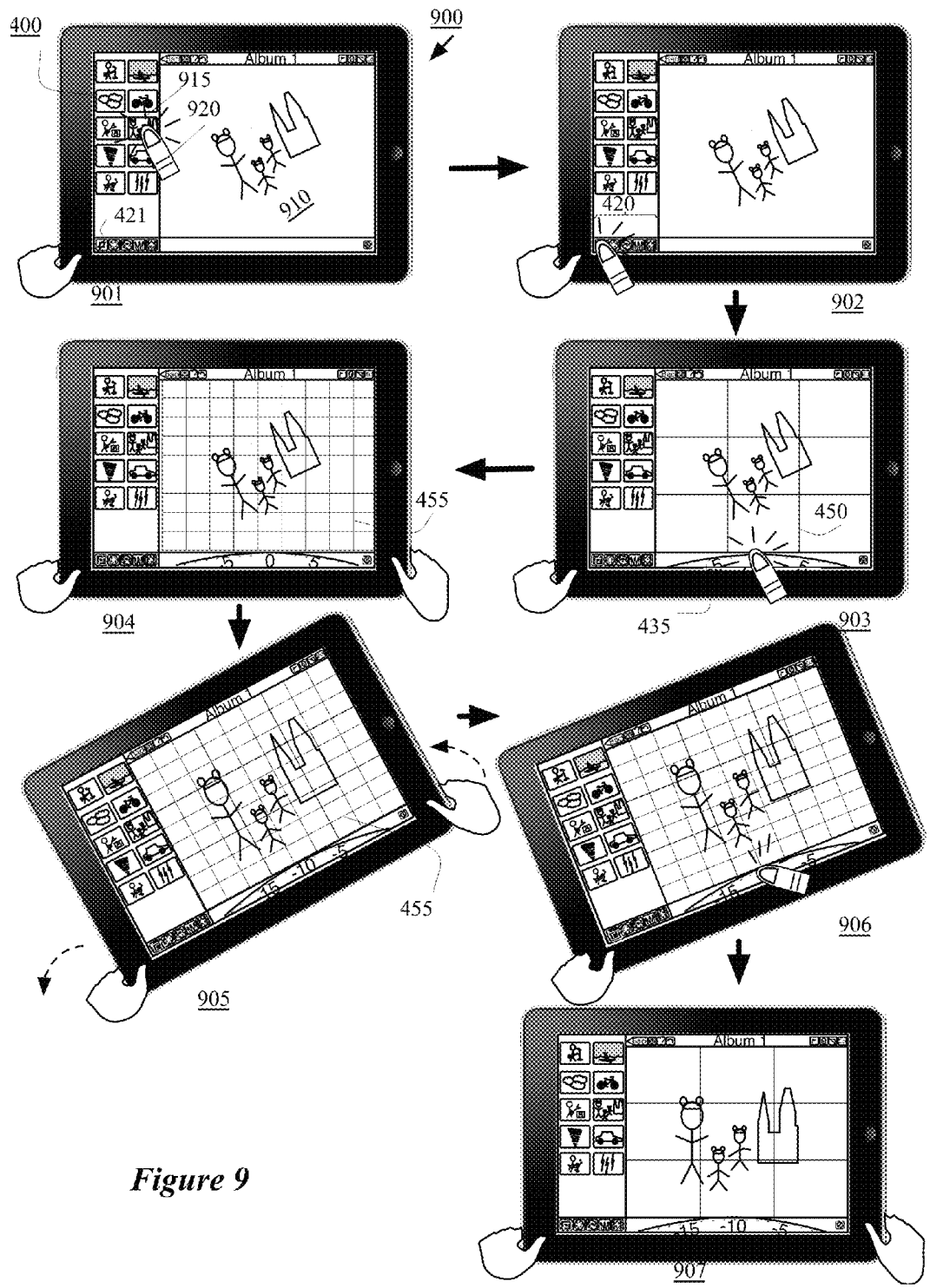
FIG. 9 conceptually illustrates straightening an image by rotating a device on which the image editing application runs.

FIG. 9 conceptually illustrates a computing device 900 on which an image editing application of some embodiments runs. Specifically, this figure illustrates in seven different stages 901-907 that a user rotates a displayed image 910 by manipulating the dial 435 by turning or rotating the computing device 900. As shown, FIG. 9 illustrates that the computing device runs the image editing application of some embodiments that has the GUI 400.

The computing device 900 is similar to the computing device 700 described above by reference to FIG. 7, in that the computing device 900 includes one or more devices (e.g., a gyroscope, an accelerometer, etc.) that detect and measure the movement of the computing device 900.

The image editing application also allows the user to indicate that the user intends to begin controlling or stop controlling the dial 435 by moving the computing device 900. For instance, when the cropping and straightening tool of the image editing application is activated in response to a selection of the icon 421, the image editing application goes into a mode in which the dial 435 is controlled by the movement of the computing device 900 upon receiving a tap on the dial 435. The image editing application gets out of the mode upon receiving another tap on the dial 435. In some embodiments, the image editing application provides a visual indication to show that the image editing application is in the mode. For instance, the image editing application highlights the dial 435 or makes the dial 435 flash when the image editing application is in the mode.

An example operation of the image editing application that includes the GUI 400 will now be described. The first stage 901 illustrates the user's selection of a thumbnail 915 by touching the thumbnail 915 with a finger 920. The image editing application displays the image 910, represented by the thumbnail 915, in the image display area 410 in response to the selection of the thumbnail 915.

At stage 902, the user then selects the icon 421 displayed in the tool selection pane 420. In response, the image editing application at stage 903 activates the cropping and straightening tool. The image editing application highlights the icon 421. The image editing application also displays the dial 435 in the tool display area 425 and the gridlines 450 in the image display area 410.

The user also taps (e.g., by fingering down and up quickly) on the dial 435 in order to indicate that the user wishes to control the dial 435 by moving the computing device 900. The cropping and straightening tool records an initial orientation of the computing device 900 before the computing device 900 is moved. For instance, the cropping and straightening tool obtains the y-axis value of the computing device 900 from a gyroscope of the computing device 900 and records at least the z-axis orientation value.

At stage 904, the user starts rotating the computing device 900 counterclockwise. The cropping and straightening tool maintains the orientation of the dial 435 with respect to the initial orientation of the computing device 900. Thereby, the cropping and straightening tool starts to rotate the dial 435 clockwise. The cropping and straightening tool also displays the gridlines 455 and turns the image display area 410 into a 9×9 grid.

The next stage 905 illustrates the GUI 400 after the user has turned the dial 435 clockwise by turning the computing device 905 counterclockwise such that the people and the building shown in the displayed image are straightened with respect to the current orientation of the image display area 410 (i.e., the current orientation of the computing device 900).

The stage 905 also illustrates that the straightening tool has zoomed in (hence, the people and the building shown in the image appear bigger) and cropped the image 910 in order to avoid displaying in the display area 410 a part that falls outside the image 910 before being rotated. The next stage 906 illustrates that the user taps (e.g., by fingering down and up quickly) on the dial 435 in order to indicate that the user no longer wishes to control the dial 435 by moving the computing device 900.

The final stage 907 illustrates the GUI 400 after the user has rotated the computing device 900 but the image 910 is not rotated with respect to the edges of the image display area 410. The cropping and straightening tool also has removed the gridlines 455 because the user has indicated in the previous stage 906 that the user is no longer rotating the dial and the image by rotating the computing device 900.

The cropping and straightening tool of some embodiments described above and below saves as a new image the portion of the image displayed in the display image area when the tool becomes deactivated. As such, the cropping and straightening tool "edits" the image to generate a new image.

Moreover, the cropping and straightening tool of some embodiments edits the image while the image is zoomed and cropped for displaying in the display area. In other embodiments, the cropping and straightening tool is purely used as a viewing aid to display as much portion of the image in the display area as possible, by zooming in and out and cropping the image, without displaying an area that is not part the image in the display area while the image is being rotated. In other words, as a pure viewing aid, the cropping and straightening tool does not "edit" the image per se.

The cropping and straightening tool of some embodiments described above allows the user to straighten a displayed image by manipulating a UI item. Some embodiments allow the user to straighten the displayed image by touching and rotating the image directly.

Figure 10:
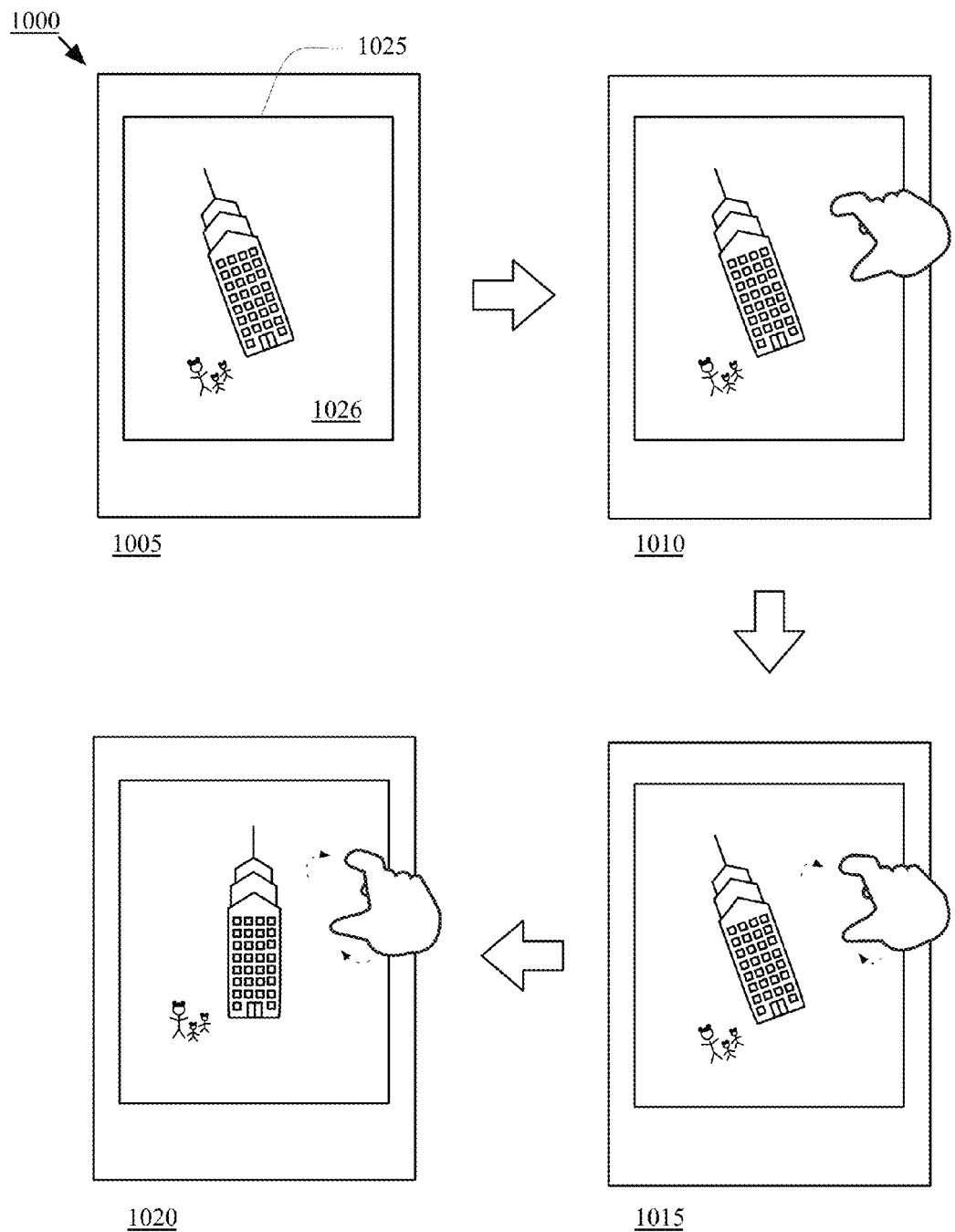
FIG. 10 conceptually illustrates straightening an image by performing a multi-touch gesture.

FIG. 10 conceptually illustrates a GUI 1000 of the image editing application of some embodiments that runs on a computing device. Specifically, this figure illustrates in four different stages 1005-1020 that a user rotates a displayed image by touching and turning the image with two fingers 1011 and 1012. FIG. 10 illustrates that the GUI 1000 includes an image display area 1025.

A computing device (not shown) on which the image editing application runs has a touch or near touch sensitive screen to receive touch inputs. The image editing application receives or retrieves the touch inputs (e.g., spatial and temporal information for touching gestures) made on the touch or near touch sensitive screen and uses the inputs to rotate the image displayed in the image display area 1025. The image display area 1025 is similar to the image display area 125 in that the image display area 1025 displays an image that the user wishes to edit using the image editing application.

The image editing application determines whether the user wishes to rotate the displayed image upon receiving the touch inputs. In some embodiments, the image editing application determines that the user wishes to rotate the displayed image when the user uses two or more fingers to touch the displayed image and rotates the fingers on the image for more than a threshold amount (e.g., several degrees). The image editing application determines the amount of rotation of the fingers by following the positions of fingers on the touch screen and measuring the amount of rotation that a line that connects the two fingers' positions makes.

The image editing application in some embodiments does not start rotating the displayed image until the user's fingers touching the image rotate for more than the threshold amount. The image editing application thereby refrains from rotating the image when the user intends to perform some other action by touching the displayed image with two or more fingers. For instance, the media editing application zooms in the displayed image and does not rotate the displayed image when the user just splits two fingers further apart while touching the image. As another example, the image editing application displays different portions of the image without rotating the image in the display area when the user swipes the image with two or more fingers. In this manner, the image editing application allows the user to straighten, crop, zoom, and slide the displayed image without lifting the fingers up from the image.

An example operation of the image editing application having the GUI 1000 will now be described. At stage 1005, the image editing application displays an image 1026 in the image display area 1025. At stage 1010, the user places two finger 1011 and 1012 on the image 1026. At stage 1015, the user rotates the two fingers 1011 and 1012 clockwise a little bit but less than a predefined threshold value (e.g., several degrees in angle). The image editing application does not start rotating the displayed image 1026 because the amount of rotation of the fingers has not gone over the threshold value.

At the fourth stage 1020, the user then rotates the fingers 1011 and 1012 clockwise further and the image editing application rotates the displayed image 1026 accordingly. The user has rotated the fingers 1011 and 1012 just enough to make the displayed image 126 straight (e.g., to make the building and three persons shown in the image level with a horizontal line of the GUI 1000).

Figure 11:
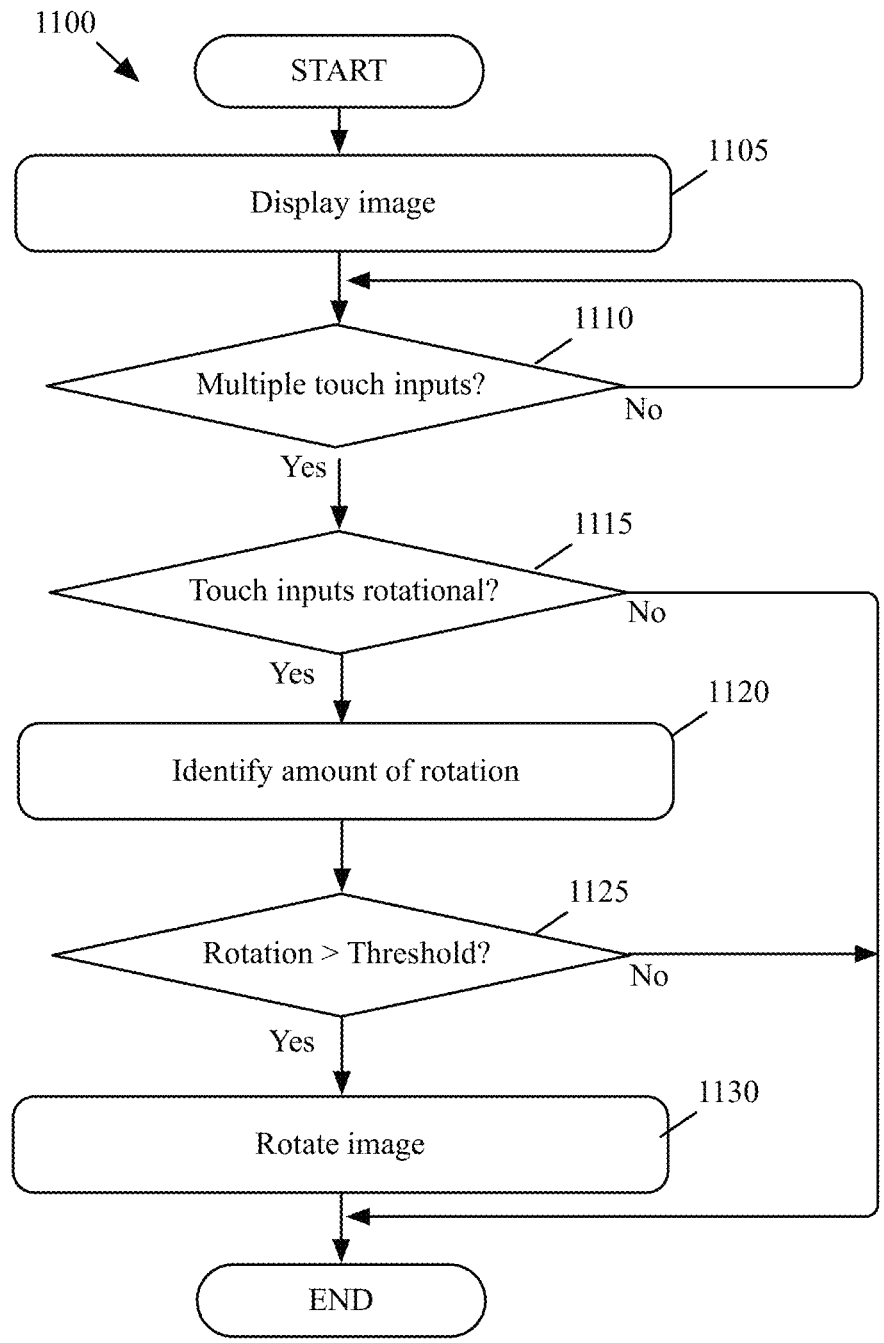
FIG. 11 conceptually illustrates a process that some embodiments perform to allow a user to straighten an image.

FIG. 11 conceptually illustrates a process 1100 that some embodiments perform to allow a user to straighten an image displayed in an image display area of an image processing application by touching and turning the displayed image using two or more fingers. The process 1100 in some embodiments is performed by the image editing application. The process 1100 starts when the image editing application runs on a computing device that has a touch or near touch sensitive screen to receive touch inputs. The process 1100 begins by displaying (at 1105) an image in an image display area of the image editing application. Examples of image display areas include the image display area 1025 described above by reference to FIG. 10.

Next, the process 1100 determines (at 1110) whether the displayed image has received two or more touch inputs. That is, the process 1100 determines (at 1110) whether the user has placed two or more fingers on the displayed image. When the process determines (at 1110) that the displayed image has not received two or more touch inputs, the process 1100 loops back to 1110 to wait for multiple touch inputs.

When the process 1100 determines (at 1110) that the displayed image has received two or more touch inputs, the process determines (at 1115) whether the touch inputs are rotational. In some embodiments, the process determines that the touch inputs are rotational when a line that connects two locations that the user's fingers are touching has rotated.

When the process 1100 determines (at 1115) that the touch inputs are not rotational, the process 1100 ends. Otherwise, the process 1100 proceeds to 1120 to identify the amount of rotation (e.g., degrees in angle) that the received touch inputs have made.

The process 1100 then determines (at 1125) whether the identified amount of rotation is over a certain threshold value (e.g., a few degrees in angle). When the process 1100 determines (at 1125) that the amount of rotation is less than the threshold value, the process ends. Otherwise, the process proceeds to 1130 to rotate the displayed image. In some embodiments, the process 1100 rotates (at 1130) the image by an amount that is proportional to the identified amount by which the touch inputs have made. That is, the process 1100 rotates (at 1130) the displayed image by the same amount by which the touch inputs have made in some embodiments. In other embodiments, the process 1100 rotates the displayed image by an amount that is more or less than the amount by which the touch inputs have made. The process then ends.

Figure 12:
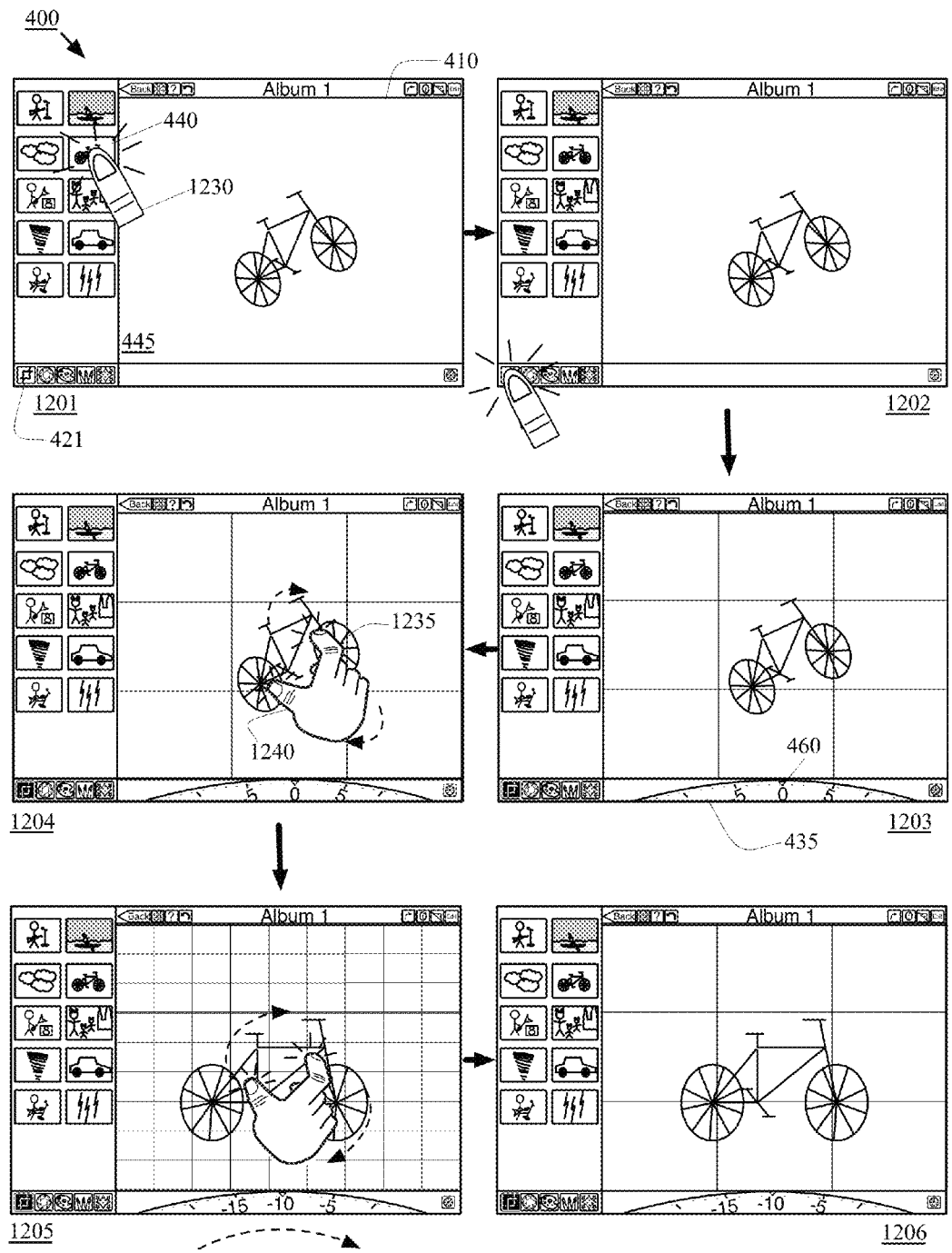
FIG. 12 conceptually illustrates straightening an image by performing a multi-touch gesture.

FIG. 12 conceptually illustrates the GUI 400 of the image editing application of some embodiments that runs on a computing device that has a touch or near touch sensitive screen to receive touch inputs. Specifically, this figure illustrates in six different stages 1205-1230 that a user rotates a displayed image by touching and turning the image.

An example operation of the image editing application that includes the GUI 400 will now be described. The first stage 1201 illustrates the user's selection of a thumbnail 440 by touching the thumbnail 440 with a finger 1230. The image editing application displays the image 445, represented by the thumbnail 440, in the image display area 410 in response to the selection of the thumbnail 440.

At stage 1202, the user then selects the icon 421 displayed in the tool selection pane 420. In response, the image editing application at stage 1203 activates the cropping and straightening tool. The image editing application highlights the icon 421 to indicate that the cropping and straightening tool is activated. The image editing application also displays the dial 435 in the tool display area 425 and the gridlines 450 in the image display area 410. The number pointed by the stationary knob 460 indicates that the dial 435 has not been turned to either direction at all.

At stage 1204, the user touches the image with two fingers 1235 and 1240 and rotates the two fingers clockwise a little bit but less than a predefined threshold value (e.g., several degrees in angle). The cropping and straightening tool does not start rotating the displayed image 445 because the amount of rotation of the fingers has not gone over the threshold value. The cropping and straightening tool does not start rotating the dial 435 nor displays more gridlines in addition to the gridlines 450.

At the next stage 1205, the user has rotated the fingers 1235 and 1240 clockwise past the predefined threshold degrees. The cropping and straightening tool rotates the displayed image 445 accordingly. The user has rotated the fingers 1235 and 1240 until the bicycle displayed in image 445 is straightened. In this example, "−10" that is pointed by the stationary knob 460 indicates that the dial 435 and the displayed image 445 have rotated clockwise by 10 degrees. The stage 405 also illustrates that the straightening tool has zoomed in (hence, the bicycle in the image appears bigger) and cropped the image 445 in order to avoid displaying a part that falls outside the image 445 before being rotated. Also, the cropping and straightening tool displays the gridlines 455 as soon as the rotation of the fingers 1235 and 1240 goes over the predefined threshold.

The final stage 1206 illustrates the GUI 400 after the user has lifted the fingers 1235 and 1240 from the displayed image 445 and is no longer touching the image. The cropping and straightening tool also has removed the gridlines 455 because the image 445 is no longer being touched.

In addition to allowing the user to touch the image to straightening a displayed image, the image editing application of some embodiments provides at least one UI control item overlaid on the image to allow the user to straighten the image using the UI control item.

Figure 13:
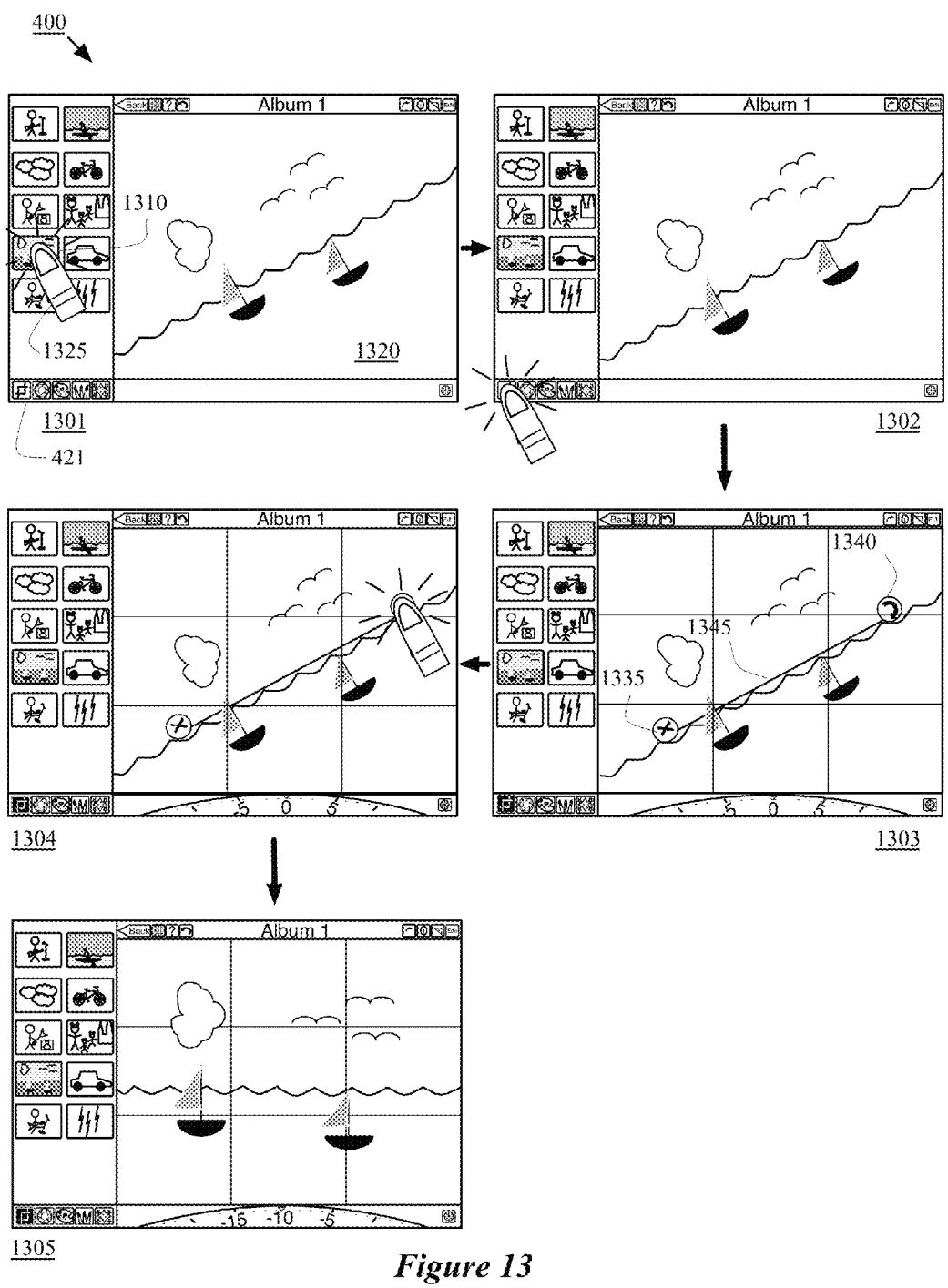
FIG. 13 conceptually illustrates the use of a horizon line to straighten an image.

FIG. 13 conceptually illustrates the GUI 400 of the image editing application of some embodiments. Specifically, this figure illustrates in five different stages 1301-1305 that a user rotates a displayed image by using a horizon line that is detected by the cropping and rotating tool of the image editing application.

In some embodiments, the cropping and straightening tool analyzes the image displayed in the display area and detects a horizon line of the image. The cropping and straightening tool displays the detected horizontal line over the image to allow the user to straighten the image using the displayed horizon line. In addition to a detected horizon line, cropping and straightening tool of some embodiments provides one or more selectable user interface items for straightening the image. One of the provided user interface items in some embodiments indicate to which direction the image editing application is going to turn the horizon line in order to straighten the image. When the user wishes to straighten the image as suggested by the horizon line and the user interface item, the user can select the user interface item to straighten the image. Detecting a horizon line is described in detail in U.S. patent application Ser. No. 13/366,613, filed Feb. 6, 2012, now published as U.S. Publication 2013/0201358. The U.S. patent application Ser. No. 13/366,613, now published as U.S. Publication 2013/0201358 is incorporated herein by reference.

An example operation of the image editing application that includes the GUI 400 will now be described. The first stage 1301 illustrates the user's selection of a thumbnail 1310 by touching the thumbnail 1310 with a finger 1325. The image editing application displays the image 1320, represented by the thumbnail 1310, in the image display area 410 in response to the selection of the thumbnail 1310.

At stage 1302, the user then selects the icon 421 displayed in the tool selection pane 420. In response, the image editing application at stage 1303 activates the cropping and straightening tool. The cropping and straightening tool detects a horizon line 1345 and displays the horizon line 1345 over the displayed image 1320. In addition, the cropping and straightening tool displays selectable UI items 1335 and 1340 at the two ends of the detected horizon line 1345. The UI item 1340 is for straightening the image and indicates the direction to which the horizon line 1345 will turn when the user selects the user interface item 1340. Because the horizon line 1345 is tilted to the left (e.g., the left end is below the right end), the cropping and straightening tool places a downward arrow in the UI item 1340 to indicate that the cropping and straightening tool will rotate the horizon line 1345 and the image 1320 clockwise to get the image 1320 straightened. The user interface item 1335 is for dismissing the horizon line 1345. When the user selects the user interface item 1335, the image editing application will make the horizon line 1345 and the user interface items 1335 and 1340 disappear.

Also at stage 1303, the image editing application highlights the icon 421. The image editing application also displays the dial 435 in the tool display area 425 and the gridlines 450 in the image display area 410. The number on the dial 435 pointed by the stationary knob 460 reads "0" indicates that the dial 435 has not been turned to either direction at all.

At stage 1304, the user selects the user interface item 1340 with a finger 1325. Next at stage 1305, the cropping and straightening tool in response straightens the image 1320 by rotating the image 1320 clockwise so that the horizon line 1345 is leveled (i.e., is parallel to the bottom edge of the image display area 410). The cropping and straightening tool has turned the displayed image 1320 clockwise by the amount of the dial 435's rotation. In this example, "−10" that is pointed to by the stationary knob 460 to indicate that the dial 435 and the displayed image 1320 have rotated clockwise by 10 degrees. The stage 1305 also illustrates that the straightening tool has zoomed in (hence, the bike in the image appears bigger) and cropped the image 1320 in order to avoid displaying a part that falls outside the image 1320 before being rotated.

Figure 14:
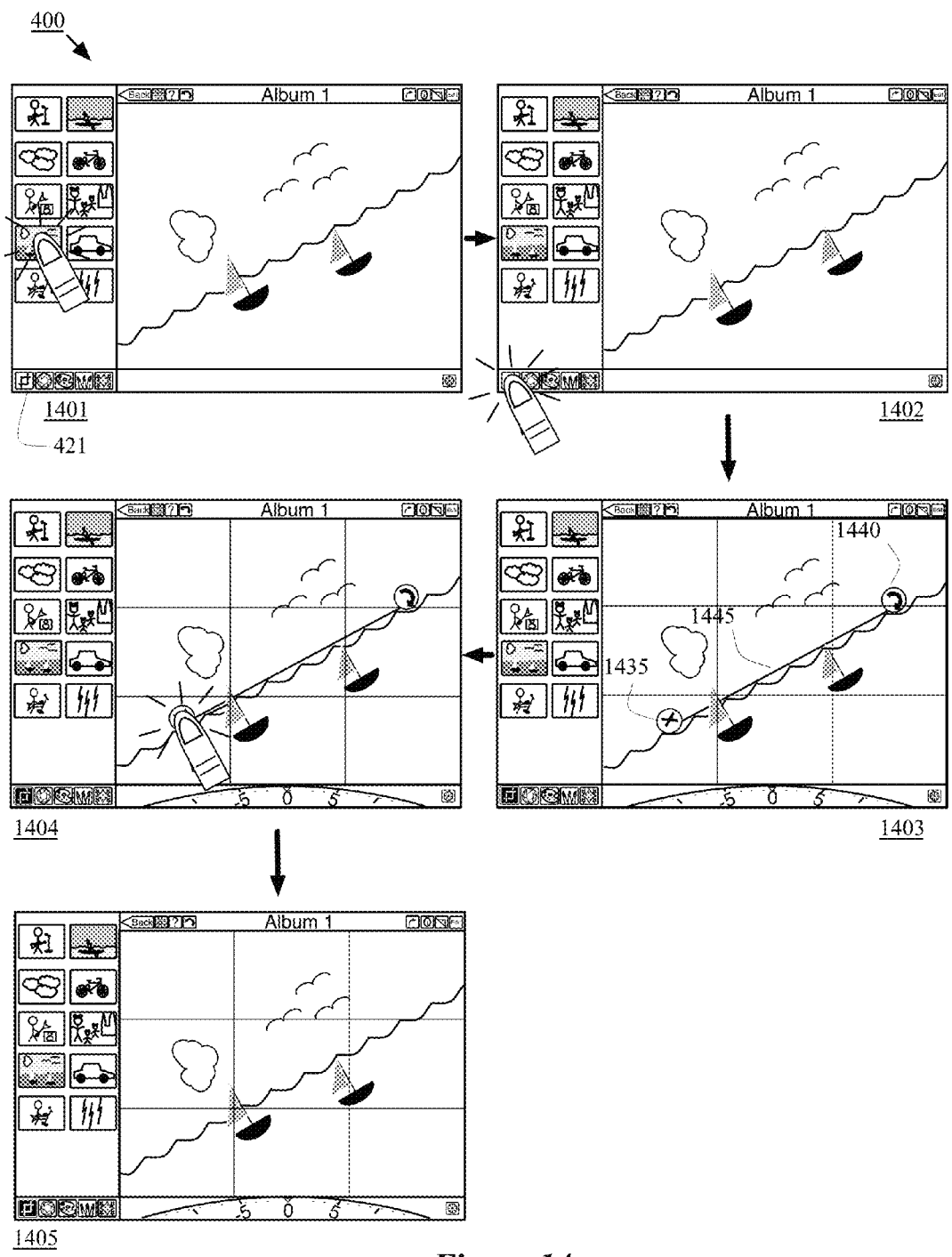
FIG. 14 conceptually illustrates dismissing a horizon line.

FIG. 14 illustrates dismissing the detected horizontal line 1345 when the user wishes not to use the horizontal line 1345 to straighten the image 1320. Specifically, this figure illustrates in five different stages 1401-1405 that the user dismisses the detected horizontal line 1345 by selecting the UI item 1335.

As mentioned above, the UI item 1335 is for dismissing the horizon line 1345. When the user selects the UI item 1335, the cropping and straightening tool will make the horizon line 1345 and the UI items 1335 and 1340 disappear. In some embodiments, the cropping and straightening tool provides other ways than selecting the UI item 1335. For instance, the cropping and straightening tool will make the horizon line 1345 and the UI items 1335 and 1340 disappear when the user taps on other areas of the GUI 400. These other areas of the GUI 400 include the dial 435, the portions of image display area 410 other than the UI item 1335, etc. In some embodiments, the image editing application provides another UI item (not shown) for the user to select. When the user selects this UI item (e.g., a reset button), the image editing application re-displays the dismissed horizon line 1345.

An example operation of the image editing application that includes the GUI 400 will now be described. The first three stages 1401-1403 are identical to the stages 1301-1303 described above by reference to FIG. 13. At stage 1404, the user selects the UI item 1435 with a finger 1425. Next at stage 1405, the cropping and straightening tool in response removes from the image display area the UI items 1435 and 1440 as well as the detected horizontal line 1445.

Figure 15:
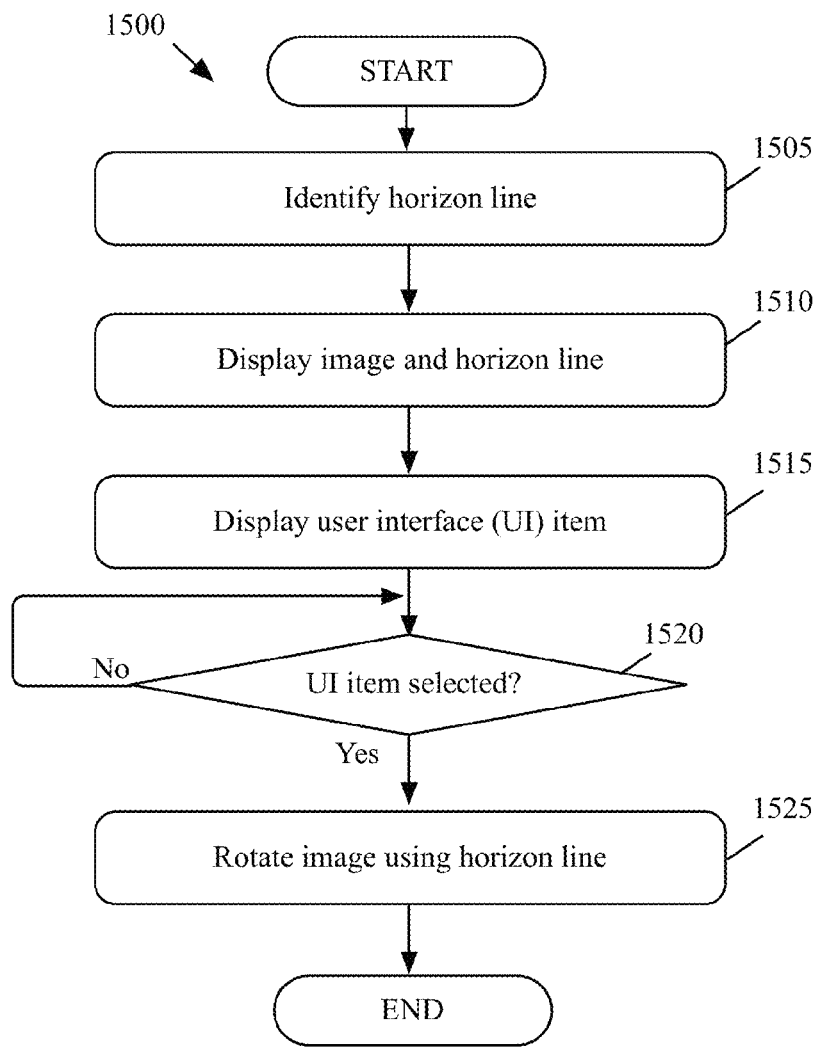
FIG. 15 conceptually illustrates a process that some embodiments perform to allow user to straighten an image by using a horizon line.

FIG. 15 conceptually illustrates a process 1500 that some embodiments perform to allow a user to straighten an image displayed in an image display area of an image processing application by selecting a user interface item for straightening the image. The process 1500 in some embodiments is performed by the image editing application. The process 1500 starts when the image editing application runs on a computing device that has a touch or near touch sensitive screen to receive touch inputs. The process 1500 begins by identifying (at 1505) a horizon line of the image. Identifying a horizon line is described in detail in U.S. patent application Ser. No. 13/366,613, now published as U.S. Publication 2013/0201358.

Next, the process 1500 displays (at 1510) an image and the identified horizon line in a display area of the image editing application. Examples of image display areas include the image display area 1325 described above by reference to FIG. 13. The process 1500 also displays (at 1515) a user interface item for straightening the displayed image. In some embodiments, the process 1500 displays the user interface item in the horizontal line to indicate that the process will rotate the horizon line and the image in a direction to straighten the horizon line and the image. An example of such a user interface item is the user interface item 1340 described above by reference to FIG. 13.

The process 1500 then determines (at 1520) whether the displayed user interface item has selected by the user. When the process 1500 determines (at 1520) that the user has not selected the user interface item, the process 1500 loops back to 1520 to wait for the user to select the user interface item.

When the process 1500 determines (at 1520) that the user has selected the user interface item, the process 1500 proceeds to 1525 to rotate the image using the horizon line. In some embodiments, the process 1500 rotates the horizon line along with the image such that the position of the horizon line relative to the image does not change as the horizon line and the image rotate. The process 1500 rotates the displayed image using the horizon line in order to straighten the displayed image. The process then ends.

B. On-Image Cropping

Figure 16:
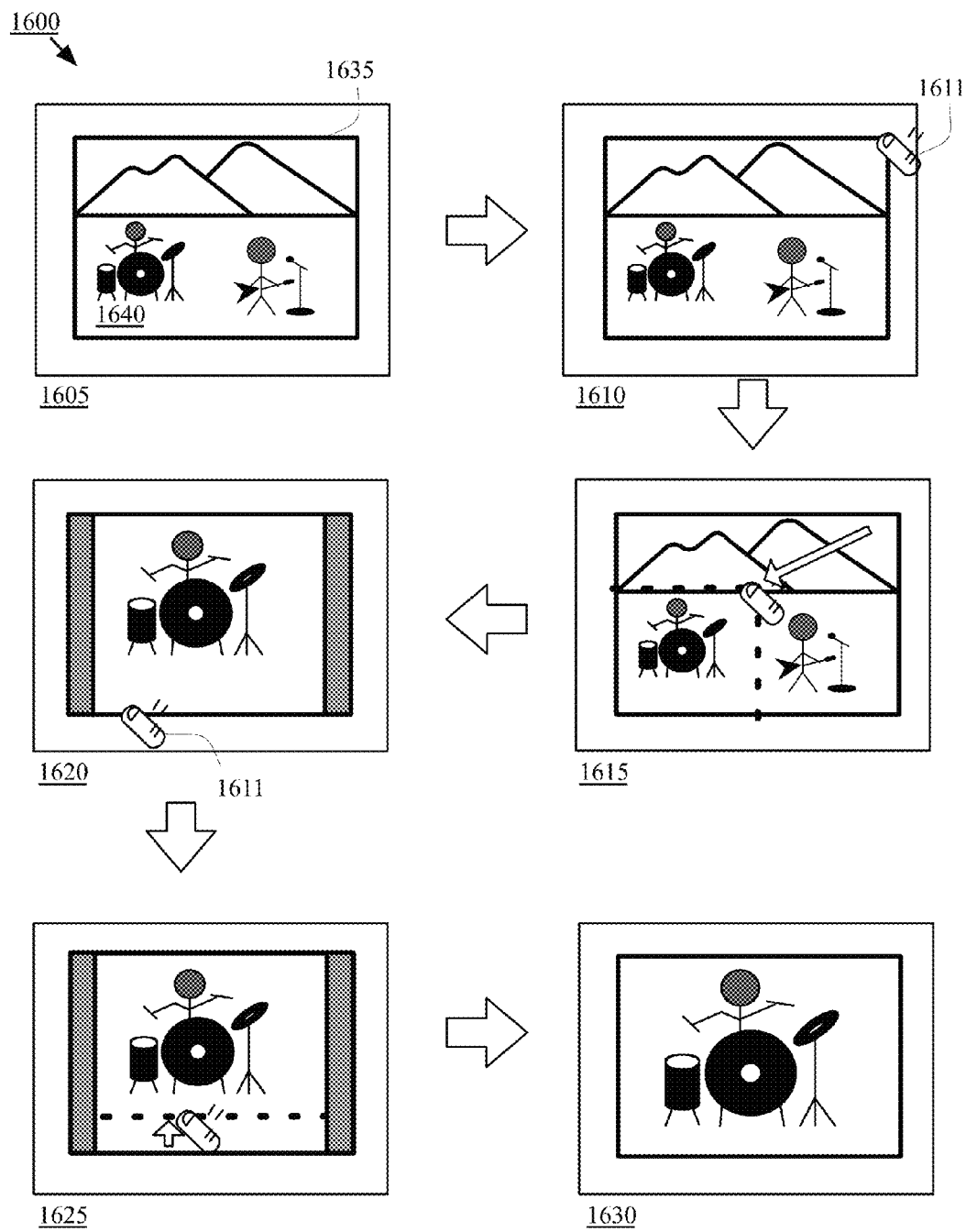
FIG. 16 conceptually illustrates cropping an image by dragging border of the image.

FIG. 16 conceptually illustrates a GUI 1600 of an image editing application of some embodiments that allows a user to crop an image by manipulating an on-image cropping tool. Specifically, this figure illustrates in six different stages 1605-1615 that the user crops an image 1640 by touching and dragging corners and edges of the image 1640. FIG. 16 illustrates that the the GUI 1600 includes an image display area 1635.

As described above by reference to FIG. 6, the on-image cropping tool allows the user to trim out unwanted parts from an image by zooming in the image. In some embodiments, the on-image cropping tool also allows the user to trim out unwanted parts from an image by dragging in and out the corners and edges of the image. The cropping tool also allows for dragging the corners and edges of the image by multiple touches. For instance, the user can drag two corners of the image towards the center of the image by making a pinch gesture (e.g., gathering two fingers towards each other on the touch or near touch sensitive screen) diagonally with respect to the image.

The on-image cropping tool in some embodiments allows the user to crop the image while maintaining an aspect ratio. The aspect ratio to maintain could be the aspect ratio of the original image before being cropped or one of predefined aspect ratios (e.g., 2×3) from which the user can choose. Also, the on-image cropping tool in some embodiments stretches the image after being cropped to match the original size of the image before being cropped.

An example operation of the image editing application having the GUI 1600 will now be described. At stage 1605, the image editing application displays the image 1640 in the image display area 1635. Next at stage 1610, the user places a finger 1611 at the upper right corner of the image 1640. At stage 1615, the user drags the upper right corner of the image 1640 diagonally to crop out the mountains and the guitarist shown in the images.

At stage 1620, the image editing application stretches the remaining portion of the image (i.e., portion of the image showing the drummer). Because the aspect ratio of the remaining portion does not match the aspect ratio of the image display area 1635, the image processing application places two grey areas on the sides of the stretched remaining portion of the image.

At this stage 1620, the user also places the finger 1611 at the bottom edge of the remaining portion. At the next stage 1625, the user drags the bottom edge up to trim out more portion of the image 1640. At stage 1630, the image editing application stretches out the remaining portion of the image. The image editing application displays no grey area in the display area 1640 because the final remaining portion of the image has the same aspect ratio as the original aspect ratio of the image before being cropped.

Figure 17:
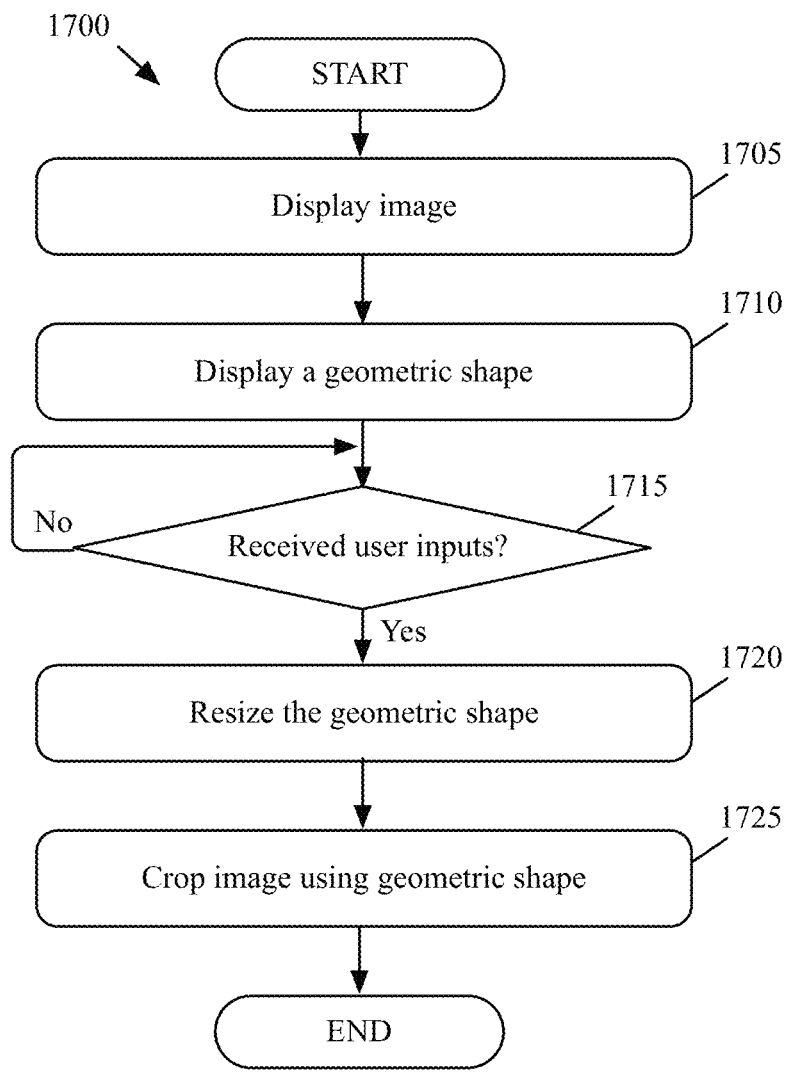
FIG. 17 conceptually illustrates a process that some embodiments perform to crop an image.

FIG. 17 conceptually illustrates a process 1700 that some embodiments perform to allow a user of an image editing application to crop an image. The process 1700 in some embodiments is performed by the image editing application. The process 1700 starts when the image editing application runs on a computing device that has a touch or near touch sensitive screen to receive touch inputs from the user. The process 1700 begins by displaying (at 1705) an image in an image display area of the image editing application.

Next, the process 1700 displays (at 1710) a geometric shape over the displayed image. In some embodiments, the geometric shape is a shape that initially overlaps with the edges the displayed image. As the geometric shape is resized, the geometric shape defines the edges of the cropped image. The process 1700 then determines (at 1715) whether the geometric shape has received a user input. In some embodiments, the process 1700 determines that the geometric shape has received a user input when the user selects a corner or an edge of the geometric shape by placing a finger on the corner or the edge. Also, the process 1700 determines that the geometric shape has received a user input when the user places and moves two or more fingers on the corners and edges of the geometric shape and an area within the geometric shape.

The process 1700 then resizes (at 1720) the geometric shape based on the received inputs. The process 1700 interprets the gestures the user has made with one or more fingers differently. For instance, the process 1700 moves in the edge when the user selects the edge of the geometric shape and drags towards the center of the geometric shape. Also, the process 1700 brings the corner in when the user places a finger on the corner of the geometric shape and drags towards the center of the displayed image. Moreover, the process 1700 moves more than one edge or more than one corner of the geometric shape at a time when the user uses two or more fingers to select and drag the edges and corners of the image or when the user performs a pinch gesture on the geometric shape (e.g., bringing two fingers together while touching inside the geometric shape) or a spreading gesture on the geometric shape (e.g., spreading two fingers apart while touching inside the geometric shape).

Next, the process 1700 crops (1725) the displayed image using the geometric shape. In some embodiments, the process crops out the portion of the displayed image that does not fall within the geometric shape. The process then ends.

Figure 18A:
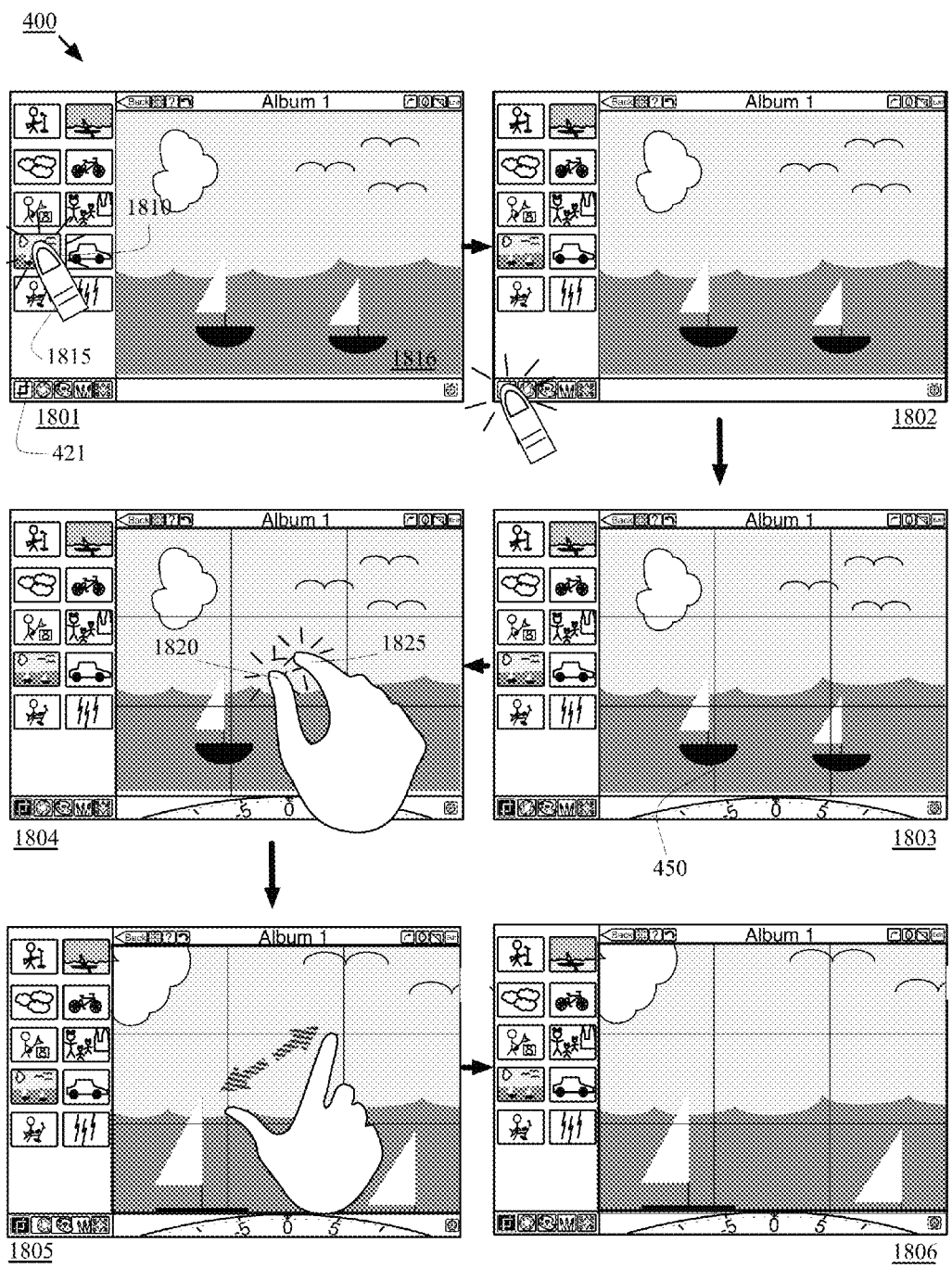
FIG. 18A conceptually illustrates cropping an image by zooming in the image.

FIG. 18A conceptually illustrates the GUI 400 of the image editing application of some embodiments. Specifically, this figure illustrates in six different stages 1801-1806 that the user crops a displayed image 1810 by using an on-image cropping tool of the image editing application.

As described above by reference to FIG. 16, the on-image cropping tool of some embodiments allows the user to crop out unwanted portions of the image by manipulating edges and corners of the image. In some embodiments, the on-image cropping tool also allows the user to crop the displayed image by zooming in the image. The on-image cropping tool crops out the portions of the image that fall out of the image display area 410 after the image is zoomed in.

An example operation of the image editing application having the GUI 400 will now be described. The first stage 1801 illustrates the user's selection of a thumbnail 1810 by touching the thumbnail 1810 with a finger 1815. The image editing application displays the image 1816, represented by the thumbnail 1810, in the image display area 410 in response to the selection of the thumbnail 1810.

At stage 1802, the user then selects the icon 421 displayed in the tool selection pane 420. In response, the image editing application at stage 1803 activates the on-image cropping tool. The image editing application highlights the icon 421. The image editing application also displays the dial 435 in the tool display area 425 and the gridlines 450 in the image display area 410.

At stage 1804, the user touches the image 1810 with two fingers 1820 and 1825. The next stage 1805 illustrates the GUI 400 after the user has performed a spreading gesture on the image 1816. In response, the on-image cropping tool zooms in the image 1816 and crops out the portions of the image that fall out of the image display area 410. The on-image cropping tool has stretched the cropped image to occupy the entire image display area 410. The final stage 1806 illustrates the GUI 400 after the user has lifted the fingers 1820 and 1825 up from the image 1816 and no longer touching the image 1816.

Figure 18B:
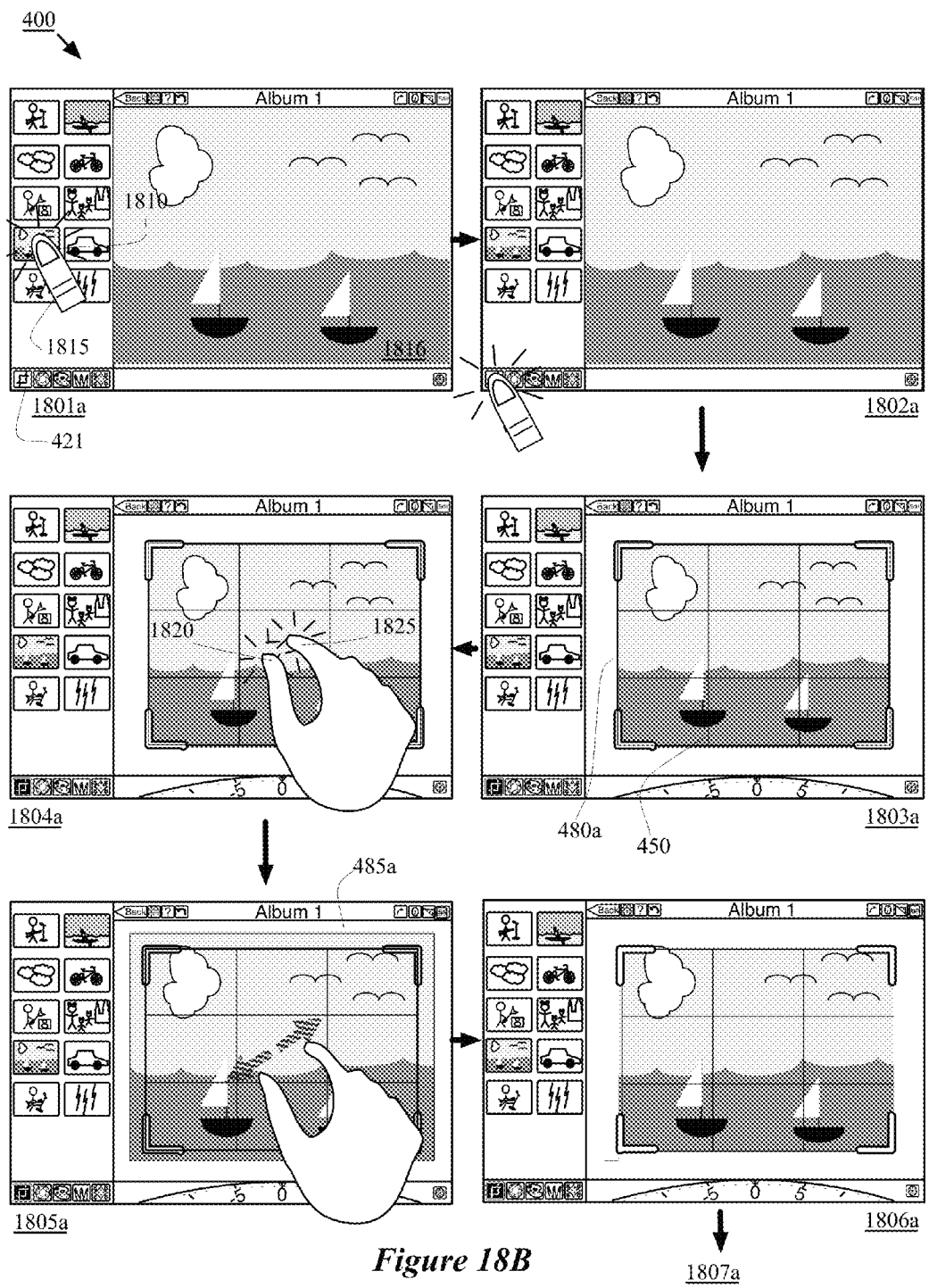
FIGS. 18B and 18C conceptually illustrates viewing an image by zooming and moving the image.
Figure 18C:
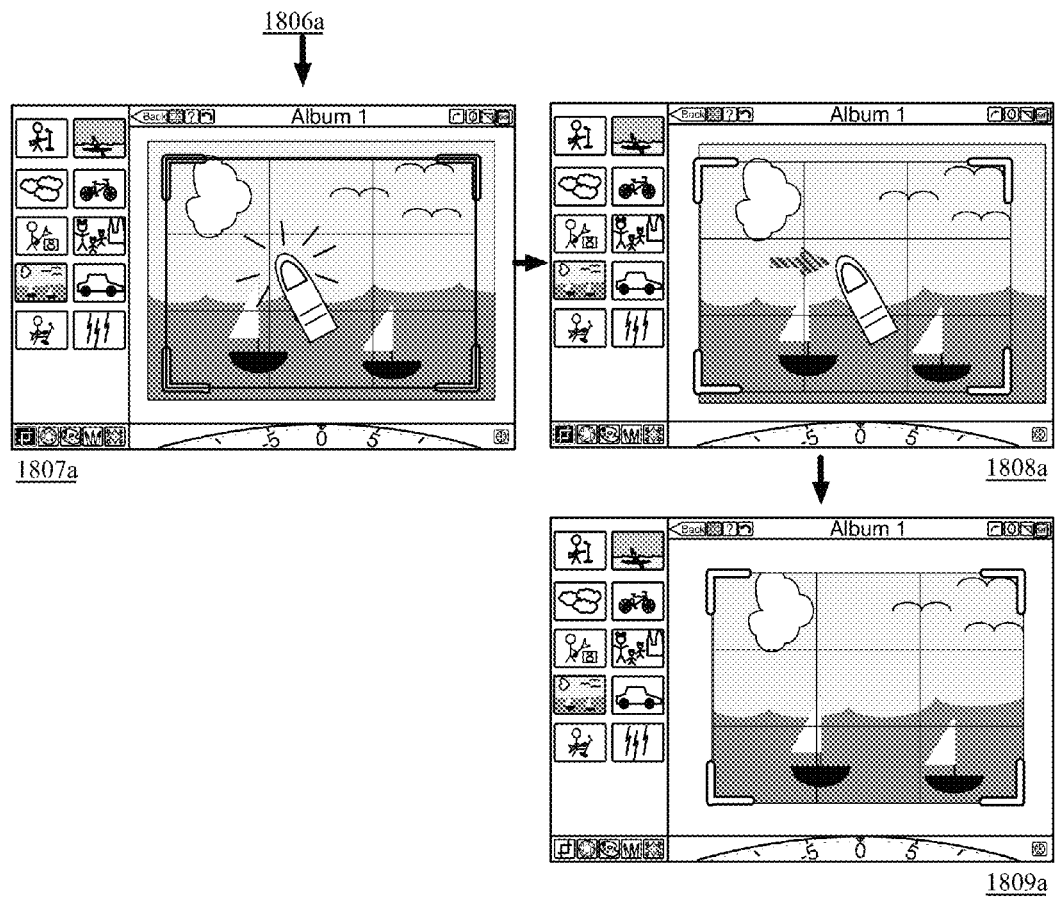

FIGS. 18B and 18C conceptually illustrates the GUI 400 of the image editing application of some embodiments. Specifically, this figure illustrates in nine different stages 1801b-1809b that the user crops a displayed image 1816 by using an on-image cropping tool of the image editing application. Specifically, FIGS. 18B and 18C illustrates the GUI 400 of some embodiments that has the inner display area 480a.

An example operation of the image editing application having the GUI 400 will now be described. The first and second stages 1801a and 1802a are identical with the stages 1801 and 1802 described above by reference to FIG. 18A. In response to the selection of the icon 421 at the stage 1802a, the image editing application at stage 1803a activates the cropping tool. The image editing application displays the inner display area 480a within the display area 410.

At stage 1804a, the user touches the image 1816 with two fingers 1820 and 1825. The next stage 1805a illustrates the GUI 400 after the user has performed a spreading gesture on the image 1816 to zoom in the image. In response, the on-image cropping tool zooms in the image 1816. The portions of the image that fall out of the inner display area 480a as a result of zooming in are displayed in the outer area 485a. The borders of the image are also displayed in the outer area 485a. The on-image cropping tool allows the user to further zoom in the image and some portions of image may fall out of the display area 410.

The next stage 1806a illustrates the GUI 400 after the user has lifted the fingers 1820 and 1825 up from the image 1816 and no longer touching the image 1816. As shown, the portions of the image and the borders of the image that were displayed in the outer area 485a are no longer displayed in the outer area 485a. The next stage 1807a illustrates the GUI 400 after the user touches the image 1816 again. The portions of the image and the borders of the image that were displayed in the outer area 485a at the stage 1805a reappear in the outer area 485a.

At stage 1808a, the user drags the image to the right and a different portion of the image 1816 is displayed in the inner display area 480a as a result. Also, different portions of the image that fall out of the inner display area 480a are now displayed in the outer area 485a. The next stage 1809a illustrates the GUI 400 after the user has lifted the finger up from the image 1816 and no longer touching the image 1816. As shown, those portions of the image and the borders of the image that were displayed in the outer area 485a at the previous stage 1808a are no longer displayed in the outer area 485a.

Figure 19:
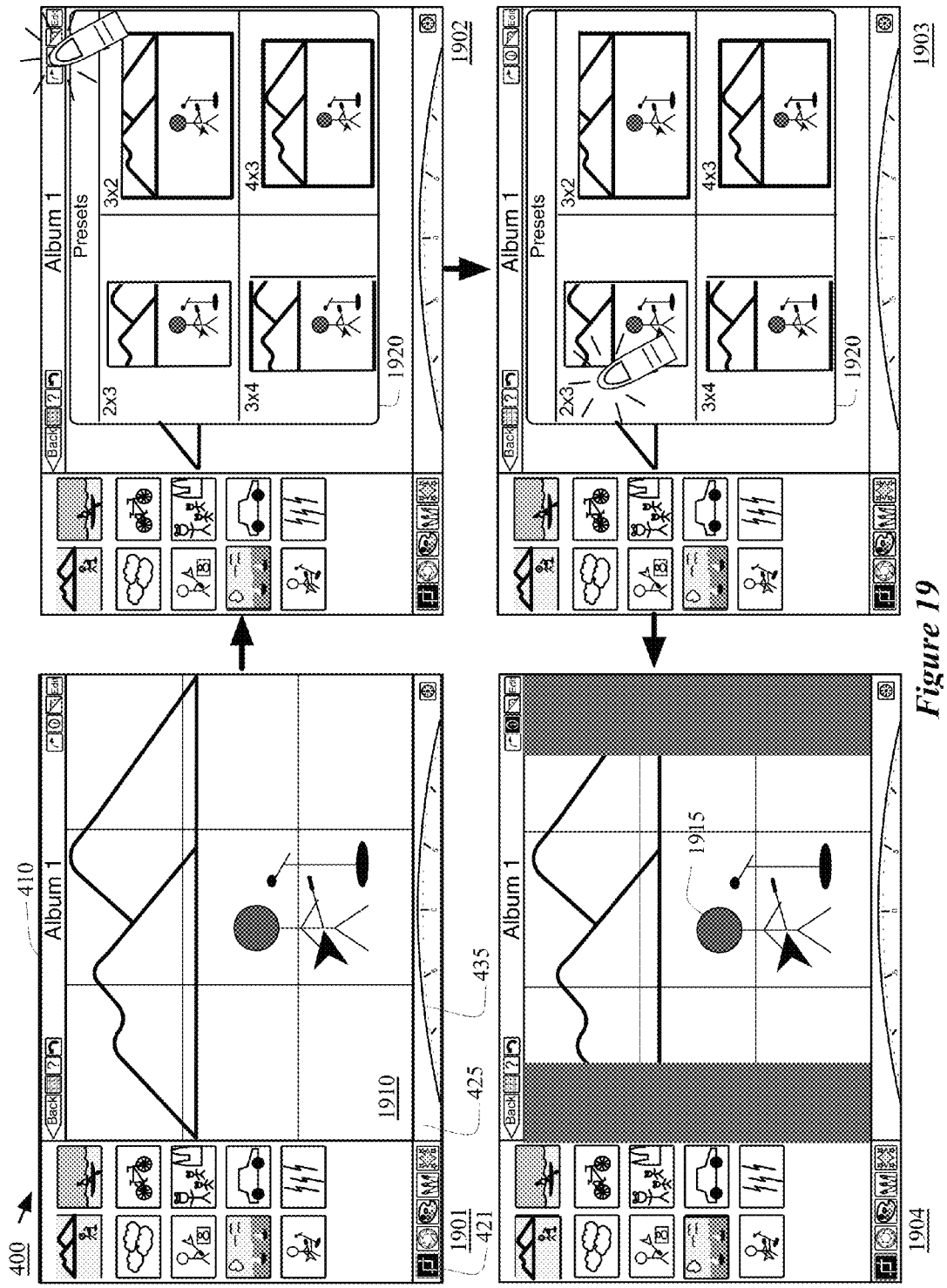
FIG. 19 conceptually illustrates cropping an image based on a selected preset aspect ratio.

FIG. 19 conceptually illustrates the GUI 400 of the image editing application of some embodiments. Specifically, this figure illustrates in four different stages 1901-1904 that the user crops a displayed image 1910 by selecting a preset aspect ratio.

The image editing application in some embodiments provides a set of aspect ratios from which the user can choose. The image editing application crops the image displayed in the image display area 410 using the selected aspect ratio. For instance, when an original image displayed in the image display area 410 has a 3×2 aspect ratio (e.g., 3 for width and 2 for height) and the selected aspect ratio is a 2×3, the image editing application trims the sides of the original image to change the aspect ratio to a 2×3 ratio.

The image editing application in some embodiments determines the portions to crop out based on the location of face(s) shown in the original image. The image editing application crops out portions of the image such that the remaining portion of the image has the face(s) in the center of the image. The image editing application finds the face(s) using a face detection technique (e.g., detecting any faces) and/or a face recognition technique (e.g., detecting an interested face).

When the image editing application finds multiple faces, different embodiments employ different techniques to put the faces in the center of the cropped image. For example, the image editing application of some embodiments identifies center coordinates of each found face, averages the identified center coordinates, and places the portion of the image having the average center coordinates in the center of the cropped image. As another example, the image editing application of some embodiments identifies the size of each face found and places the biggest face in the cropped image. As yet another example, the image editing application of some embodiments places an interested face in the center of the cropped image.

In some embodiments, the image editing application provides a set of thumbnails along with the set of aspect ratios. Each of these thumbnails provides a preview of the cropped image based on the corresponding selectable aspect ratio.

An example operation of the image editing application having the GUI 400 will now be described. The first stage 1901 illustrates the GUI 400 after the user has selected an image to edit and selected the icon 421. The image editing application has placed the dial 435 in the tool display are 425 and highlighted the icon 421.

At stage 1902, the user selects an icon 1910 for showing preset aspect ratios. The image editing application displays the preset aspect ratios from which the user can choose. The next stage 1903 shows the user's selection of a 2×3 aspect ratio.

The final stage 1904 illustrates the GUI 400 after the image editing application has cropped the image 1910. The image editing application finds a face 1915 and crops the image such that the cropped image has the face 1915 in the center. Because the sides of the image, rather than top and bottom of the image, are trimmed to make a 2×3 ratio from a 3×2 ratio, the image editing application places the face 1915 in the horizontal center of the cropped image. The grey areas displayed in the image display area 410 represents the portions of the image that have been cropped out.

Having described an on-image cropping and straightening tools of some embodiments, the next section describes other on-image tools for applying image processing operations to a selected area of an image using the image editing application of some embodiments.

II. On-Image Brush Tools

The image editing application of some embodiments provides a set of on-image brush tools to apply image processing operations to selected areas of the displayed image. Some of these tools allow the user to select an area of the displayed image and apply image processing operation to the selected area. Some of these tools allow the user to select an area of the displayed image multiple times and apply image processing operations based on the number of times that an area of the image is selected.

A. Applying Image Processing Operations by Selecting Areas

Figure 20:
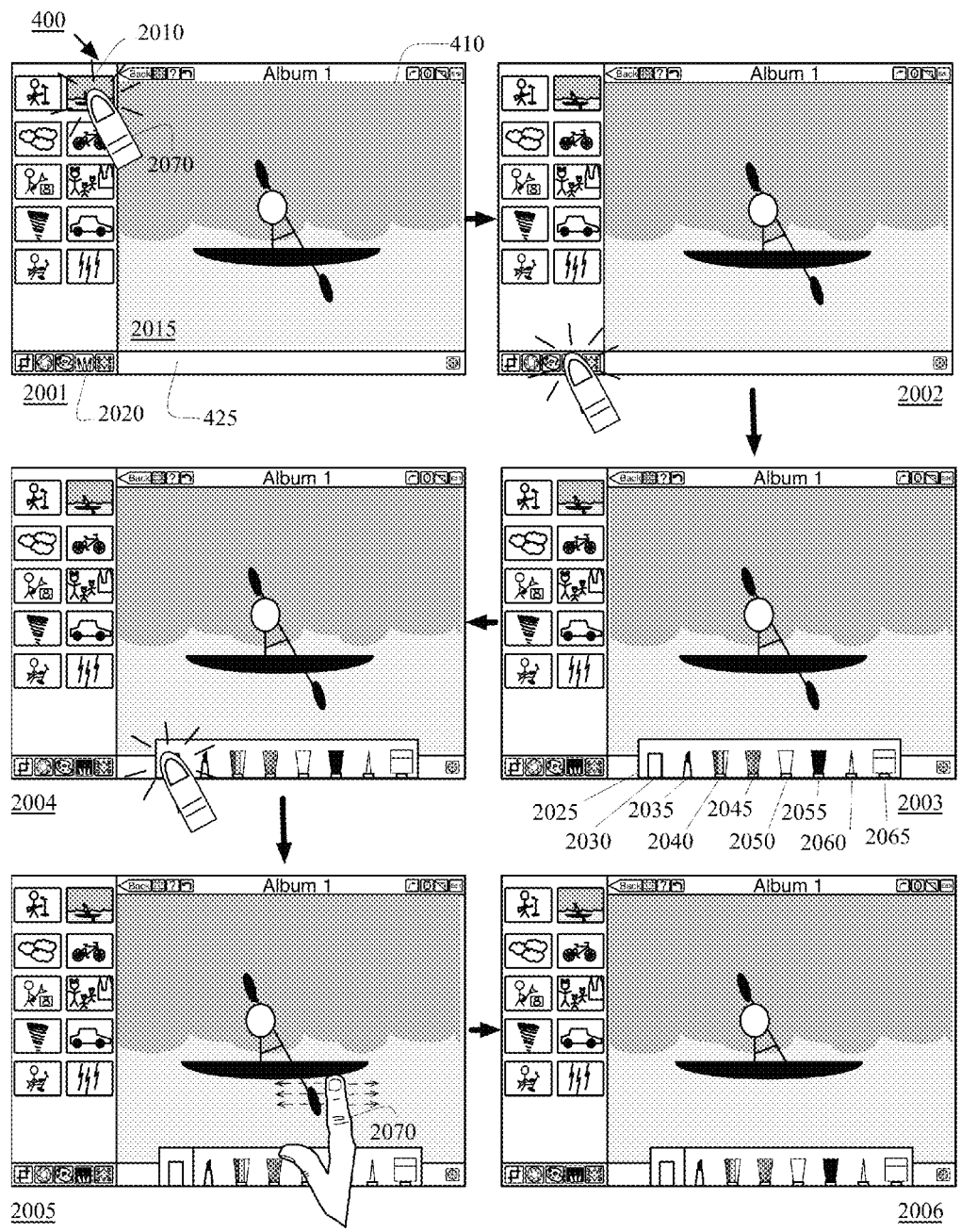
FIG. 20 conceptually illustrates applying an effect to an image by rubbing the image.

FIG. 20 conceptually illustrates the GUI 400 of an image editing application of some embodiments that allows a user to select an area within an image to which to apply an image processing operation. Specifically, this figure illustrates in six different stages 2001-2006 that the user selects an area of the image by touching the image and applies an image processing operation to the selected area of the image.

As mentioned above, the tool selection pane 420 in some embodiments displays a set of icons that represent different editing tool sets of the image editing application. The tool selection pane 420 includes an icon 2020, which in some embodiments is the fourth icon from the left displayed in the tool selection pane 420. The tools that icon 2020 displayed in the tool selection pane 420 represents include an on-image brush tools. When the user selects the icon 2020, the image editing application in some embodiments displays a set of selectable UI items 2025 that represent these on-image brush tools in the tool display area 425 (or other parts of the GUI 400). When one of the tools is selected (e.g., when the user selects the icon representing the tool), the tool is activated and the user inputs to the displayed image are treated as inputs to the selected tool.

The set of selectable UI items 2025 in some embodiments is a set of icons having different shapes of brushes for different image processing operations or effects. For instance, an icon 2030 represents a blemish removal tool. An icon 2035 represents a red eye removal tool. An icon 2040 represents a saturation tool. An icon 2045 represents a de-saturation tool. An icon 2050 represents a lightening tool. An icon 2055 represents a darkening tool. An icon 2060 represents sharpening tool. An icon 2065 represents a softening tool. Each of the tools, when activated, applies the effect to the area of the image where the user selects by touching the area.

Some of these tools apply the corresponding effects to an area regardless of the number of times that an area is touched. That is, such tools apply the effects once when an area is touched first time but does not apply the effect when the area is touched again subsequently. For instance, the blemish removal tool in some embodiments removes blemishes from an area when the user touches the area for the first time but does not attempt to remove blemishes further from the area when the user touches the area again. Another such tool is the red eye removal tool in some embodiments.

Some of the tools represented by the set of selectable UI items 2025 apply the corresponding effects based on the number of times an area of the image is touched. Such tools will be described in detail further below.

An example operation of the image editing application having the GUI 400 will now be described. The first stage 2001 illustrates the user's selection of a thumbnail 2010 by touching the thumbnail 2010 with a finger 2070. The image editing application displays the image 2015, represented by the thumbnail 2010, in the image display area 410 in response to the selection of the thumbnail 2010.

At stage 2002, the user selects the icon 2020 displayed in the tool selection pane 420. In response, the image editing application at stage 2003 displays the set of selectable UI items 2025 in the GUI 400 as shown. At stage 2004, the user selects the blemish removal tool by touching the icon 2030. The image editing application activates the blemish removal tool.

At stage 2005, the user rubs the water and a tip of the oar left and right multiple times using a finger 2070. The blemish removal tool identifies the area that has been rubbed by the user and applies blemish removal operation to the area. Example blemish removal operation is described in detail in U.S. Patent Application Publication No. 2009/0202170, published Aug. 13, 2009. The U.S. Patent Application Publication No. 2009/0202170 is incorporated herein by reference. At stage 2006, the image editing application has removed the tip of the oar and the part of the oar that fell in the rubbed area.

Figure 21:
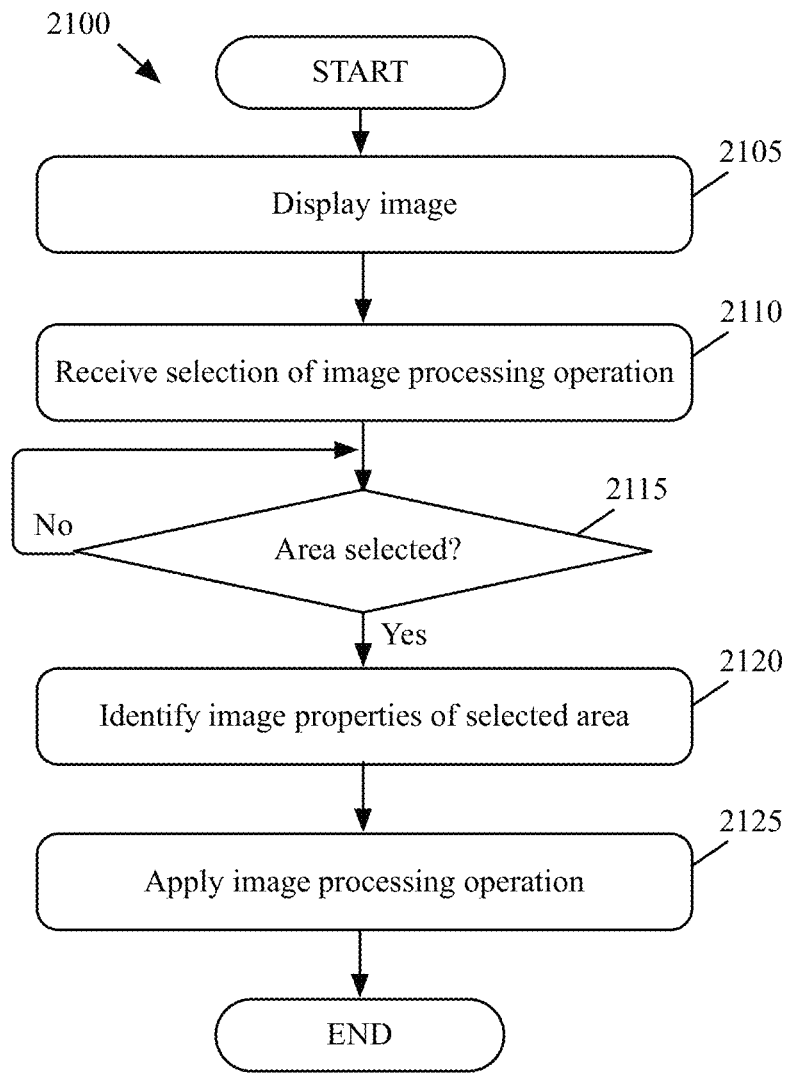
FIG. 21 conceptually illustrates a process that some embodiments perform to allow the user to edit an image by rubbing the image.

FIG. 21 conceptually illustrates a process 2100 that some embodiments perform to allow a user of an image editing application to apply an image processing operation to an area of an image by touching the area. The process 2100 in some embodiments is performed by the image editing application. The process 2100 starts when the image editing application runs on a computing device that has a touch or near touch sensitive screen to receive touch inputs (e.g., rubbing gestures) from the user. The process 2100 begins by displaying (at 2105) an image in an image display area of the image editing application.

Next, the process 2100 receives (at 2110) a selection of an image processing operation to apply. In some embodiments, the process 2100 receives the selection of an image processing operation through a user interface item (e.g., an icon) of the image editing application when the user touches the user interface item that represents an image processing operation. Examples of image processing operations include removing blemishes, removing red eye, etc.

Next, the process 2100 determines (at 2115) whether an area of the image is selected. In some embodiments, the process 2100 determines that an area of the image is selected when the user touches the area. When the process determines (at 2115) that an area has not been selected, the process 2100 loops back to 2110 to wait for user's selection of an area.

When the process 2100 determines (at 2115) that an area has been selected, the process proceeds to 2120 to identify image properties of the selected area. Examples of image properties that the process 2100 identifies include luminance, color, etc. The process 2100 then applies (at 2125) the selected image processing operation to the selected area based on the identified image properties. The process then ends.

The brush tools of some embodiments that have been described so far use a uniform brush size. That is, the width of a stroke that is made with a brush tool relative to the size of the image display area is uniform. The image editing application of some embodiments does not provide different sizes of brush. In some such embodiments, the image editing application allows for more granular application of effects for the brush tools with uniform brush size.

Figure 22:
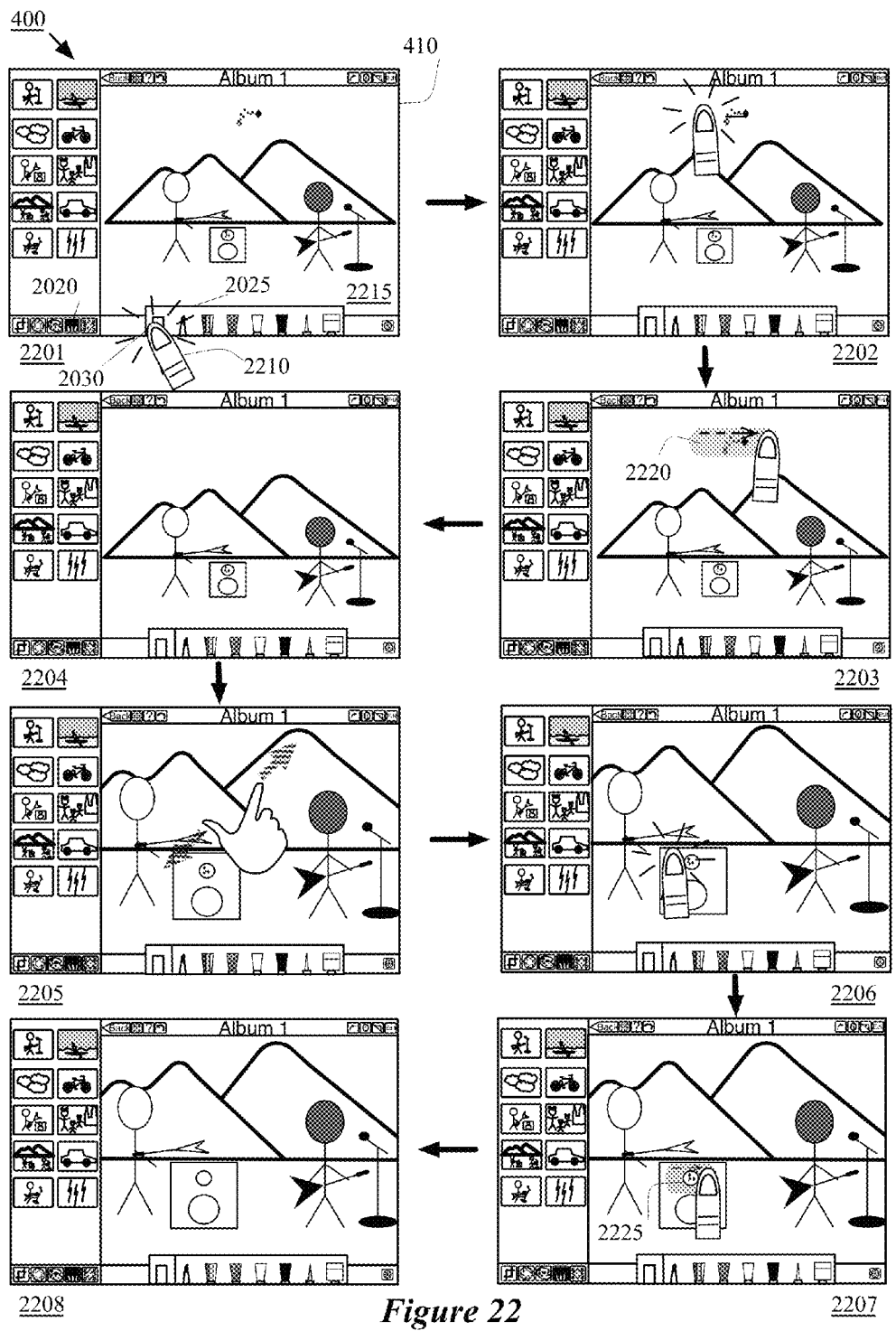
FIG. 22 conceptually illustrates zooming in an image to apply an effect to an image with granular control.

FIG. 22 conceptually illustrates the GUI 400 of the image editing application of some embodiments. Specifically, this figure illustrates in eight different stages 2201-2208 that the image editing application allows the user to zoom in an image in order to apply a blemish removal effect in a finer level using a brush that has a size that does not change relative to the size of the image display area.

An example operation of the image editing application having the GUI 400 will now be described. At stage 2201, the icon 2020 is highlighted to indicate that the image editing application is displaying the set of selectable UI items 2025 in the GUI 400. The user has selected the blemish removal tool by touching the icon 2030 with a finger 2210. The image editing application has also displayed an image 2215 in the image display area 410.

At stage 2202, the user touches near the stars shown in the image 2215. At stage 2203, the user drags the finger to the right while touching the image 2215. The grey area 2220 indicates the stroke that the user has made. The height of the grey area 2220 represents the brush size. The brush size is small enough to cover the blemishes in the sky but is too big to apply the blemish removal effect to some of the smaller objects shown in the image. For instance, the brush size is too big to touch only the upper circle of the speaker box shown in the image 2215.

The stage 2204 illustrates that the image editing application has removed the two stars from the sky shown in the image 2215. At stage 2205, the user zooms in the image 2215 by performing a spreading gesture on the image 2215. At stage 2206, the user touches the upper circle of the speaker box shown in the image 2215. At stage 2207, the user drags the finger to the right while touching the image 2215. The grey area 2225 represents the stroke that the user has made. The height of the grey area 2225 represents the brush size. Because the image is zoomed in, the same brush size is now small enough to touch only the upper circle and remove blemishes inside the upper circle. The final stage 2208 shows that the blemishes in the upper circle have been removed.

Figure 23:
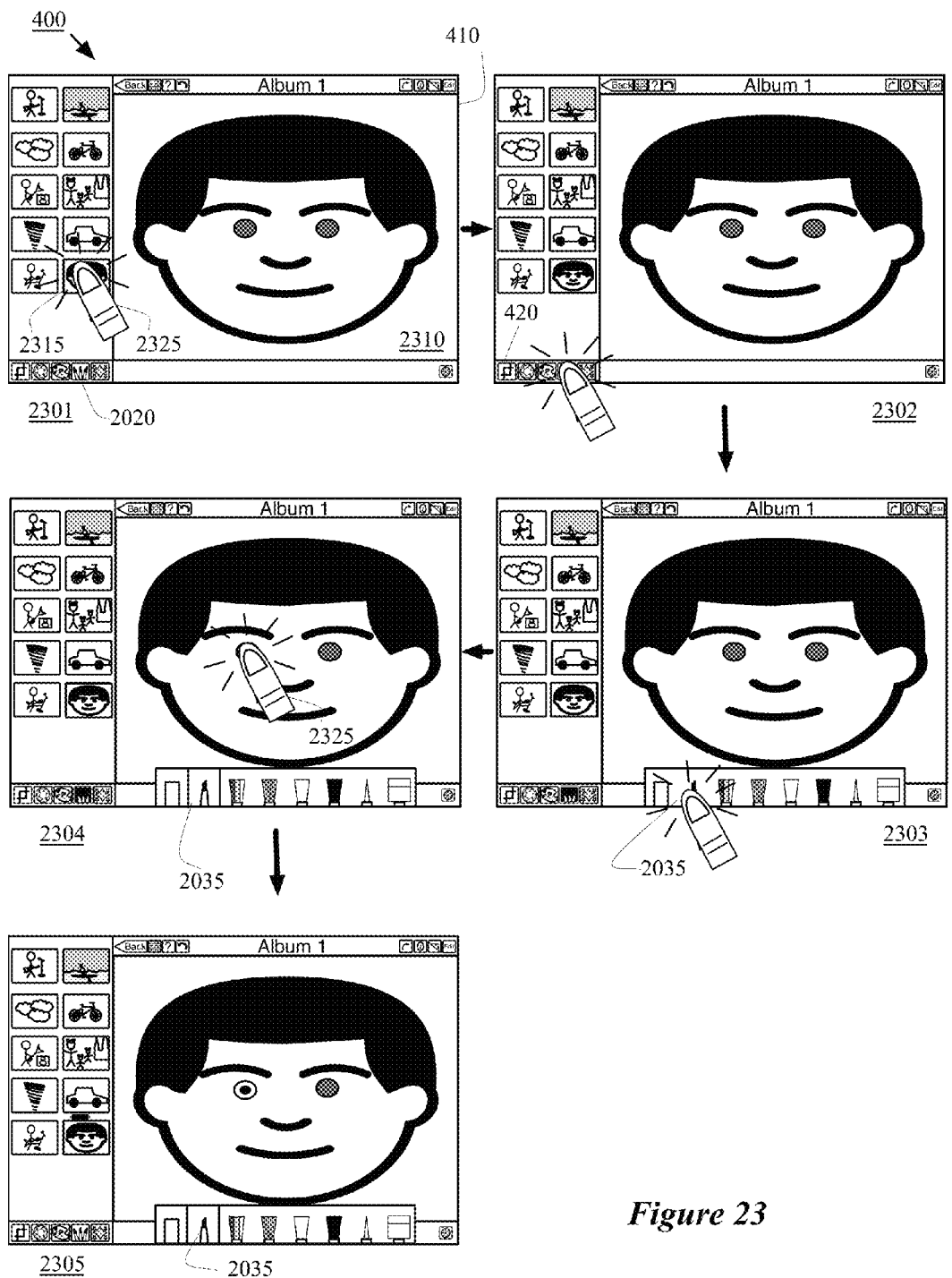
FIG. 23 conceptually illustrates applying a red eye removal effect to an image.

FIG. 23 illustrates the use of another on-image brush tool that applies an image processing operation to a selected area of an image. Specifically, this figure illustrates in five different stages 2301-2305 that the user applies a red eye removal effect to an image 2310 displayed in the image display area 410 of the GUI 400.

As mentioned above, some of the on-image brush tools apply the corresponding effects to an area regardless of the number of times that an area is touched. A red eye removal tool, represented by the icon 2035, is one such tool in some embodiments. The image editing application of some embodiments may also provide an automatic red eye removal tool, which will automatically remove all "redness" from red eyes in a displayed image. The red eye removal tool represented by the icon 2035 can be used before or after the automatic tool is used.

An example operation of the GUI 400 with the red eye removal tool will now be described. The first stage 2301 illustrates the user's selection of a thumbnail 2315 by touching the thumbnail 2315 with a finger 2325. The image editing application displays the image 2310, represented by the thumbnail 2315, in the image display area 410 in response to the selection of the thumbnail 2315.

At stage 2302, the user selects the icon 2320 displayed in the tool selection pane 420. In response, the image editing application at stage 2303 displays the set of selectable UI items 2325 in the GUI 400 as shown. Also, the user selects the red eye removal tool by touching the icon 2330. The image editing application activates the red eye removal tool.

At stage 2304, the user touches the right eye (the eye on the left side of the image 2310) of the person shown in the image 2310 with the finger 2325. The red eye removal tool in some embodiments identifies a pupil based on the area that the user has touched. Then, the red eye removal tool removes the redness from the identified pupil. In some embodiments, the red eye removal tool employs a conventional red eye removal method to remove the redness from the touched red eye.

At stage 2305, the user has lifted the finger 2325 from the image and is no longer touching the image display area 410. This stage illustrates that the image editing application has removed "redness" from the right eye of the person.

In some embodiments, the red eye removal tool plays back sound when the redness is removed. Also, the red eye removal tool in some embodiments presents a visual indication to indicate that the redness is removed from the selected eye. For instance, the red eye removal tool display an animation of a circle enlarging from the selected eye. The red eye removal tool undoes the removal of the redness when the user selects the eye again. The red eye removal tool plays back another different sound when the tool undoes the removal of the redness.

B. Applying Image Processing Operations Based on Number of Touches

As mentioned above, some of the on-image brush tools in some embodiments apply the corresponding effects to an area based on the number of times that an area is touched. Several examples of using such on-image brush tools are described below.

Figure 24:
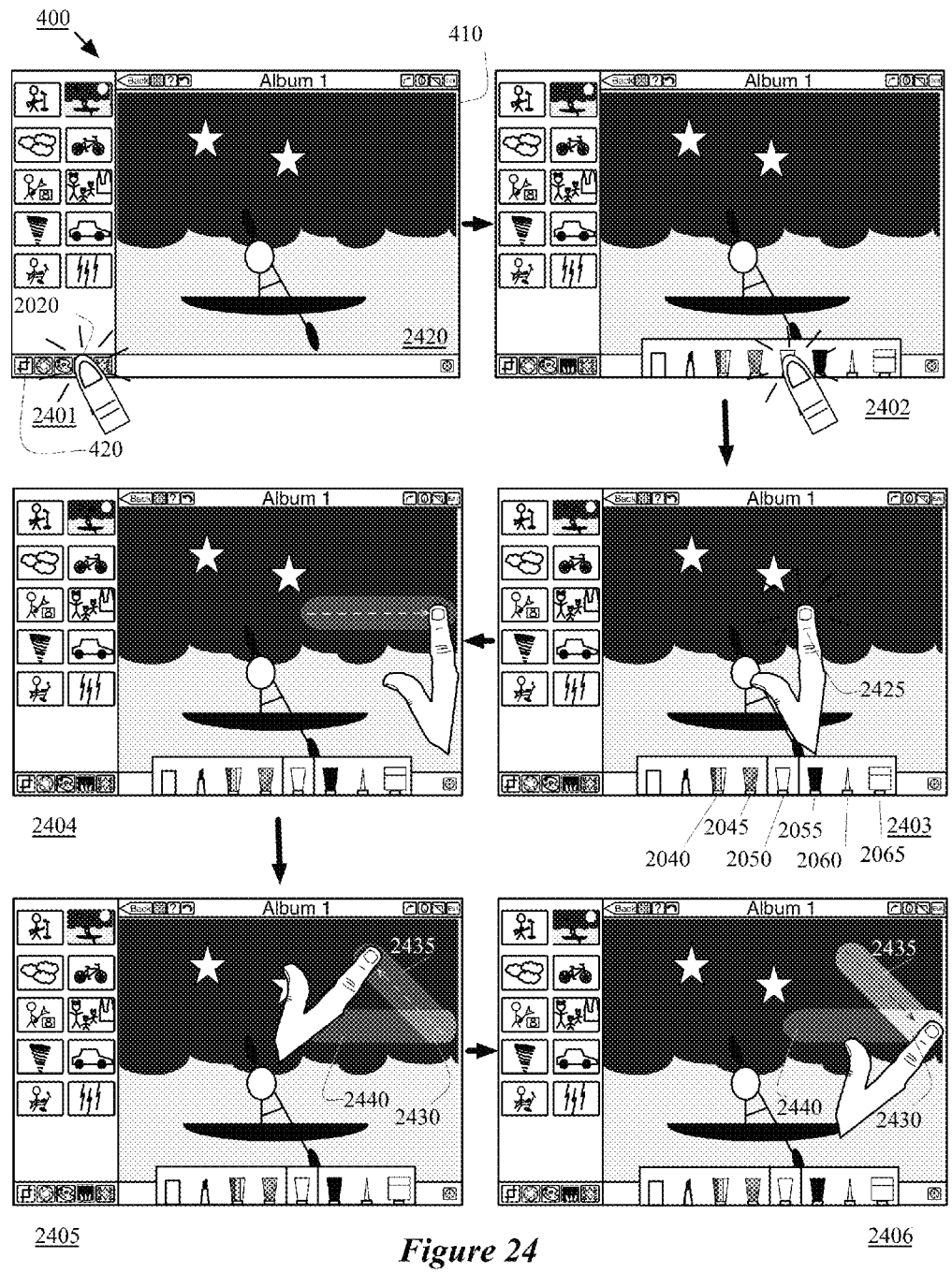
FIG. 24 conceptually illustrates incrementally applying an effect to an image by rubbing the image.

FIG. 24 conceptually illustrates the GUI 400 of an image editing application of some embodiments that allows a user to apply image processing operations incrementally to a selected area of an image. Specifically, this figure illustrates in six different stages 2401-2406 that the user applies an image processing operation incrementally to an area of the image by rubbing the image. FIG. 24 illustrates that the GUI 400 includes an image display area 410.

In some embodiments, some of the on-image brush tools allow the user to apply image processing operations by rubbing the image (e.g., swiping an area of the image one or more times). Such on-image brush tools include the saturation tool represented by the icon 2040, the de-saturation tool represented by the icon 2045, the lightening tool represented by the icon 2050, the darkening tool represented by the icon 2055, the sharpening tool represented by the icon 2060, and the softening tool represented by the icon 2065 in some embodiments.

Each time an area of the image is touched, the on-image brush tool applies the corresponding image processing operation or effect by an incremental amount. For instance, the lightening tool lightens (e.g., increases luminance values) an area of the displayed image gradually each time the area is touched.

Different embodiments determine incremental amounts of image processing operations to apply differently. For instance, the on-image brush tool increases or decreases an image property value by a predefined incremental value based on the selected image processing operation. For example, when the selected image processing operation is a lightening operation, the on screen brush tool increases the luminance values of the area by a predefined luminance value delta. In some embodiments, the on-image brush tool increases or decreases an image property value by a percentage. Also, the on-image brush tool in some embodiments uses a non-linear function to non-linearly decrease or increase the image property values of the area of the image.

In some embodiments, the on-image brush tool uses mask values to apply an image processing operation incrementally. A mask value for an image processing operation is assigned to a set of pixels of the displayed image. The on-image brush tool in some embodiments changes the mask value to apply image processing operation to the set of pixels to which the mask value is assigned. That is, the on-image brush tool in these embodiments changes mask values to incrementally apply the image processing operation.

In some embodiments, the number of touches that an area receives accumulates while the on-image brush tool is activated. That is, when the user lifts up the finger (or other device for touching, such as a stylus) after performing a rubbing operation on an area of the image (e.g., swiping an area of the image one or more times before lifting the finger) and then performs another rubbing operation on the same area again, the area is deemed being continuously rubbed. In some such embodiments, when another on-image brush tool is selected and activated to apply different corresponding effect, the number of times that an area is touched accumulates from zero or from the number of times that the area had been touched when this on-image brush tool was activated and used last time.

An example operation of the on-image brush tool of some embodiments will now be described. The first stage 2401 illustrates the image editing application displaying an image 2420 in the image display area 410. The user selects the icon 2020 displayed in the tool selection pane 420.

At stage 2402, the image editing application displays the set of selectable UI items 2025 in the GUI 400 as shown. The user selects the lightening tool by touching the icon 2050. The image editing application activates the lightening tool.

At stage 2403, the image editing application in some embodiments highlights the icon 2050 to indicate that the lightening tool that has been activated. The user places the finger 2425 on the sky shown in the image 2420. At stage 2404, the user has dragged the finger 2425 to the right while touching the image 2420. The lightening tool lightens up the area touched by the finger 2425.

At stage 2405, the user has dragged the finger 2425 to the upper left direction. The lightening tool lightens up the area touched by the finger 2425. However, a portion 2430 has been touched twice and therefore appears brighter than portions 2435 and 2440 that have only been touched once.

At stage 2406, the user has dragged the finger 2425 back to the position where the finger 2425 was at stage 2404. The lightening tool lightens up the portion 2435, which now has been touched twice. The portion 2430 appears brighter than before as the portion 2430 has been touched three times.

Figure 25:
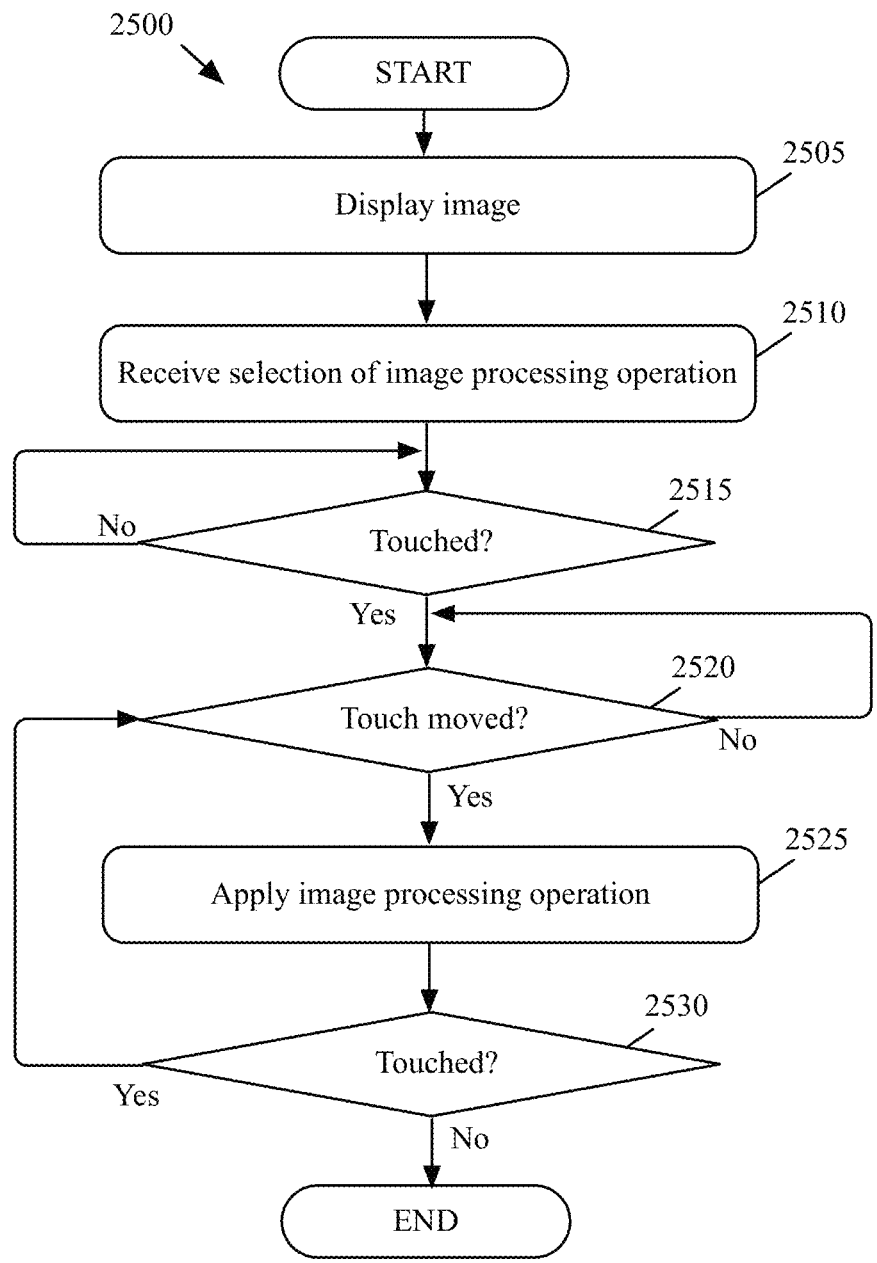
FIG. 25 conceptually illustrates a process that some embodiments perform to allow the user to incrementally apply an effect by rubbing the image.

FIG. 25 conceptually illustrates a process 2500 that some embodiments perform to allow a user of an image editing application to apply an image processing operation incrementally to an area of an image by rubbing the area. The process 2500 in some embodiments is performed by the image editing application. The process 2500 starts when the image editing application runs on a computing device that has a touch or near touch sensitive screen to receive touch inputs (e.g., rubbing gestures) from the user. The process 2500 begins by displaying (at 2505) an image in an image display area of the image editing application.

Next, the process 2500 receives (at 2510) a selection of an image processing operation to apply. In some embodiments, the process 2500 receives the selection of an image processing operation through a user interface item (e.g., an icon) of the image editing application when the user touches the user interface item that represents an image processing operation.

The process 2500 then determines (at 2515) whether an area of the image is being touched. In some embodiments, the process 2500 receives or retrieves touch information (e.g., coordinates of an area of the touch or near touch sensitive screen that user's finger is touching) from the computing device to determine whether an area of the image is touched.

When the process determines (at 2515) that an area is not being touched, the process 2500 loops back to 2515 to wait for the user's touch of an area of the displayed image.

When the process 2500 determines (at 2515) that an area is being touched, the process proceeds to 2520 to determine whether the touch has been moved from the area. In some embodiments, the process 2500 determines that the touch has been moved from the area when the area that has been touched is no longer touched. Thus, the process 2500 determines that the touch has been moved from the area when the user lifts the finger up from the area or the user has moved the finger to another area of the image. When the process 2500 determines (at 2520) that the touch has not been moved from the area, the process 2500 loops back to 2520 to wait for the touch to move.

When the process 2500 determines (at 2520) that the touch has been moved from the area, the process 2500 applies (at 2525) the selected image operation incrementally to the area of the image. The process 2500 then determines (at 2530) whether another area of the image is being touched. When the process 2500 determines (at 2530) that the other area of the image is being touched, the process 2500 loops back to 2520 to wait for the touch to move from this area. When the process 2500 determines (at 2530) that the other area of the image is not being touched, the process 2500 ends.

Having described on-image brush tools of some embodiments that apply an image processing operation based on number of touches an area receives, the next sub-section describes on-image brush tools of some embodiments that apply an image processing operation based on touch pressure.

C. Applying Image Processing Operations Based on Touch Pressure

Figure 26:
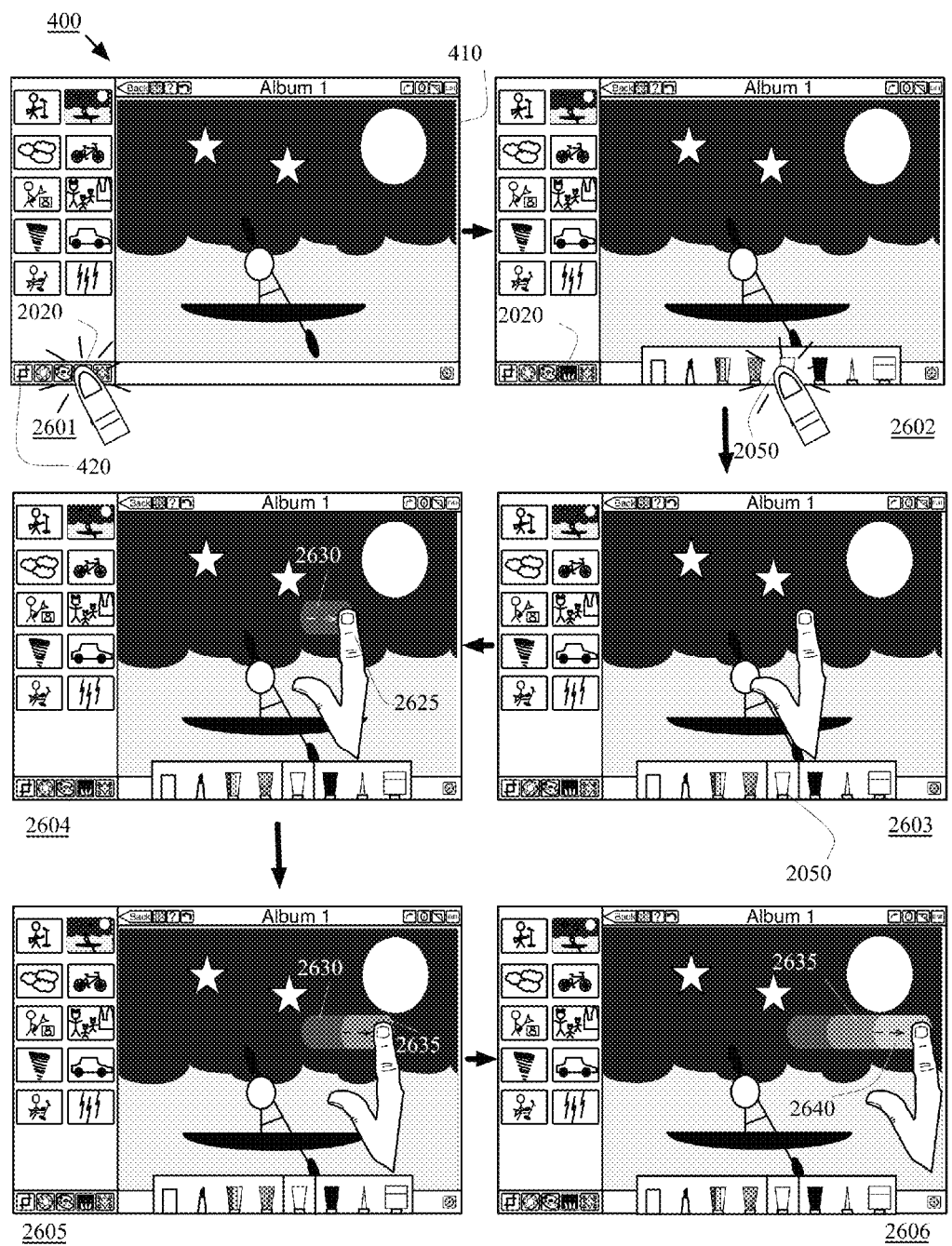
FIG. 26 conceptually illustrates applying an effect to an image by applying different pressure while swiping the image.

FIG. 26 illustrates use of an on-image brush tool of some embodiments that applies an image processing operation or effect based on the touch pressure an area of an image receives. Specifically, this figures illustrates in six different stages 2601-2606 that the user applies different levels of a lightening effect to different areas of a displayed image by touching the image with different pressures. FIG. 26 illustrates the GUI 400, which as described above is of the image editing application of some embodiments that runs on a computing device that has a touch screen that is capable of measuring touch pressure.

In some embodiments, an on-image brush tool applies an effect to an area of an image based on touch pressure. That is, the on-image brush tool in these embodiments determines the amount of the effect to apply to an area based on the pressure applied to the area when the area is being touched. Thus, the image editing application that includes the on-image brush tool in these embodiments must be running on a computing device that has a touch-sensitive screen that is capable of measure touch pressure. Such a touch-sensitive screen may utilize an accelerometer to detect and measure pressure applied to the screen.

An example operation of the on-image brush tool of some embodiments will now be described. The first three stages 2601-2603 are identical to the stages 2401-2403 described above by reference to FIG. 24. At stage 2604, the user has dragged the finger 2625 to the right from the position where the finger 2625 had been at stage 2603. The lightening tool lightens up an area 2630 touched by the finger 2625.

At stage 2605, the user has dragged the finger 2625 further to the right. However, the user pressed the image 2420 harder while moving the finger to the right from the position where the finger 2625 had been at the previous stage 2604. The lightening tool thus applies more lightening effect to an area 2635 that has been touched than in the previous stage 2604. As a result, the area 2635 appears brighter than the area 2630.

At stage 2606, the user has dragged the finger 2625 further to the right. However, the user pressed the image 2420 even harder while moving the finger to the right from the position where the finger 2625 had been at the previous stage 2605. The lightening tool thus applies even more lightening effect to an area 2640 that has been touched since the previous stage 2605. As a result, the area 2640 appears brighter than the area 2630.

The on-image brush tools of some embodiments that have been described so far apply effects to a selected area. The next sub-section will describe a smart edge detection tool, which enables the on-image brush tools to selectively apply the effects to different portions of the selected area based on the image properties of these different portions.

D. Smart Edge Detection Tool

Figure 27:
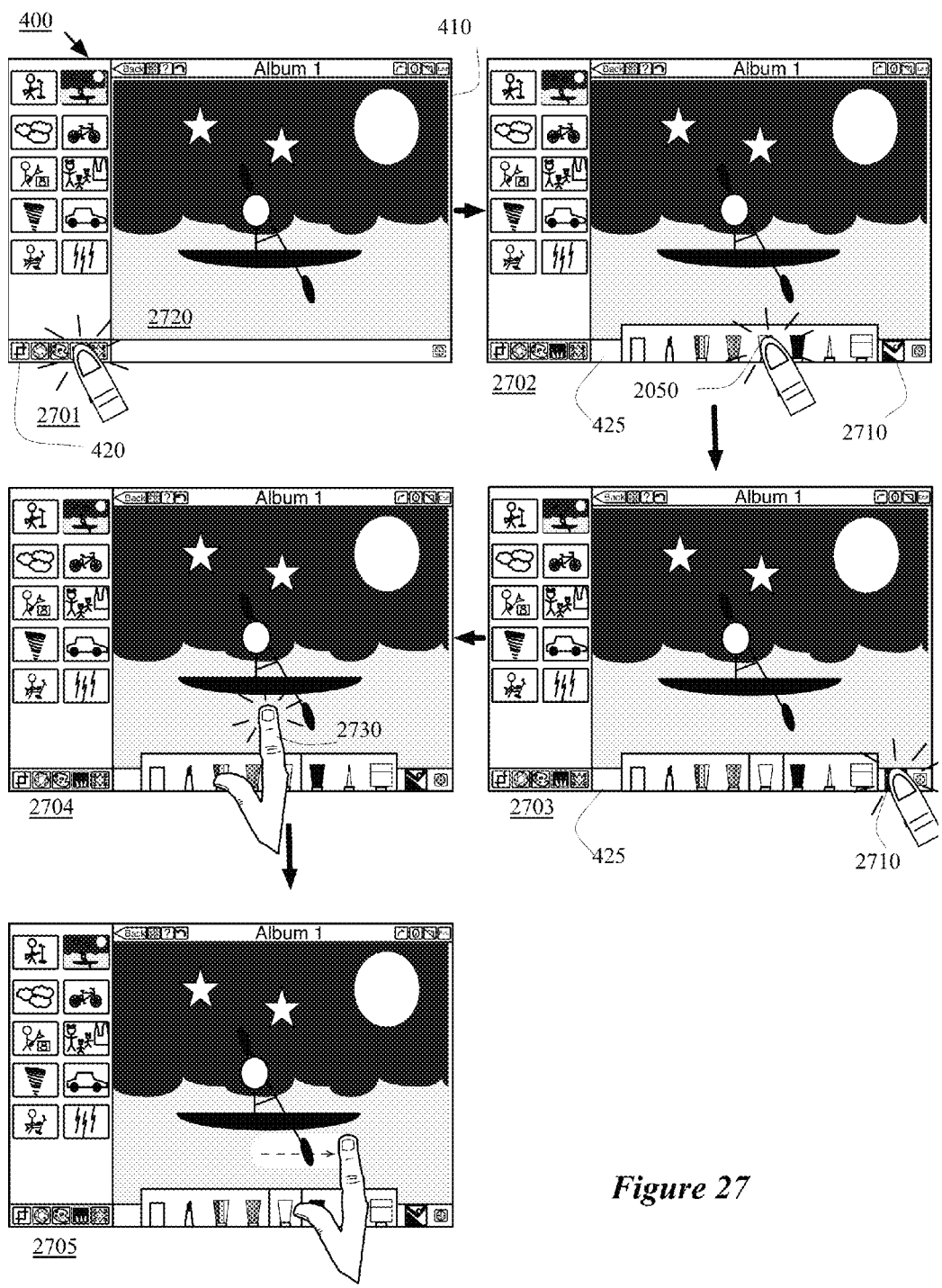
FIG. 27 conceptually illustrates the use of a smart edge detection tool.

FIG. 27 conceptually illustrates use of a smart edge detection tool. FIG. 27 illustrates the GUI 400 of the image editing application of some embodiments that allows a user to apply image processing operations selectively to different portions of a selected area of an image. Specifically, this figure illustrates in five different stages 2701-2705 that the user applies an image processing operation to only those pixels in an area of the image that satisfy certain criteria.

As mentioned above, the image editing application of some embodiments allows the user to select an area to which to apply an image processing operation. In some such embodiments, the smart edge detection tool enables an on-image brush tool to apply the corresponding image processing operation only to those pixels that satisfy certain criteria. For instance, when the smart edge detection tool is activated, the lightening tool lightens blue pixels within the selected area but leaves the red pixels intact when the user chooses to apply a lightening operation to the selected area.

In some embodiments, the smart edge detection tool identifies one or more pixels that are initially touched by the user. For instance, the tool first identifies the first pixel touched during a user's swipe of the image and uses the properties of the first pixel to determine the criteria. In other embodiments, the tool identifies a set of pixels (the first 10s and 100s of pixels) that are touched during a user's swipe of the image and uses the properties of those pixels to determine the criteria. Out of all pixels touched during the swipe, an enabled on-image brush tool only those pixels that satisfy the criteria. More about determining the criteria will be described further below.

In some embodiments, the smart edge detection tool re-defines the criteria each time the image is touched (i.e., each time the user's finger touches the image again after the finger was lifted from the image). In other embodiments, the smart edge detection tool does not re-define the criteria until a different on-image brush tool is selected or the smart edge detection tool is deactivated. That is, in these embodiments, the criteria that was initially determined is used for all subsequent touches until a different on-image brush tool is selected or the smart edge detection tool is deactivated.

This technique is also applicable to the image editing application of some of the embodiments described above that applies an image processing operation incrementally to an area of the image each time the area is touched by a user. That is, the image editing application of some embodiments incrementally applies an image processing operation to only those pixels that satisfy the criteria.

Moreover, the image editing application of some embodiments employs an edge detection to identify different regions separated by detected edges within the touch area. The image editing application of these embodiments applies an image processing operation to those pixels that satisfy the criteria and that are within an identified region that includes the set of pixels that are initially touched.

An example operation of an on-image brush tool with the smart edge detection tool activated will now be described. The first stage 2701 illustrates the image editing application displaying an image 2720 in the image display area 410. The user selects the icon 2020 displayed in the tool selection pane 420.

At stage 2702, the image editing application displays the set of selectable UI items 2025 in the GUI 400 as shown. The user selects the lightening tool by touching the icon 2050. The image editing application activates the lightening tool.

At stage 2703, the image editing application in some embodiments highlights the icon 2050 to indicate that it is the lightening tool that has been activated. The user selects an icon 2710 that represents the smart edge detection tool. In some embodiments, the image editing application displays the icon 2710 in the tool display area 425. Also, the order in which the user selects an on-image brush tool and the smart edge detection tool does not matter in some embodiments. That is, the smart edge detection tool, once it gets activated, enables any other on-image brush tool that is subsequently activated.

At stage 2704, the user places a finger 2730 on the sea near the lower end of the oar shown in the image 2720. The smart edge detection tool analyzes the pixels in the portion of the image 2720 that is initially touched by the finger 2730 and sets the criteria for other pixels in other portions of the image to satisfy in order for the lightening tool to apply the lightening effect to those pixels. Because the portion of the image that is initially touched is in the sea shown in the image 2720, the lightening tool in this example applies the lightening effect on only those pixels that have a color similar to the sea's color.

At stage 2705, the user has dragged the finger 2730 to the right while touching the image 2720. The lightening tool lightens up the area touched by the finger 2725. However, the lightening tool does not lighten up the lower end of the oar shown in the image 2720 even though the finger 2730 touched this part of the oar. This is because the smart edge detection was activated and had enabled the lightening tool to lighten only those pixels that satisfy the criteria set at the previous stage 2704.

Figure 28:
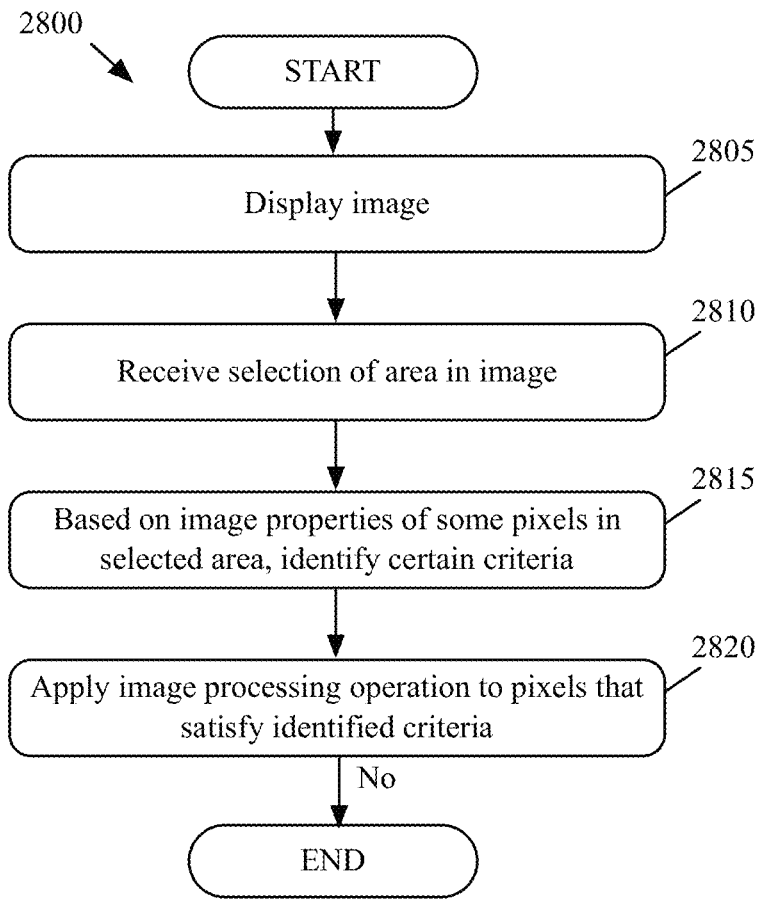
FIG. 28 conceptually illustrates a process that some embodiments perform to allow the user to selectively apply an effect to an image.

FIG. 28 conceptually illustrates a process 2800 that some embodiments perform to allow a user of an image editing application to apply an image processing operation selectively to an area of an image by rubbing the area. The process 2800 in some embodiments is performed by the image editing application. The process 2800 starts when the image editing application runs on a computing device that has a touch or near touch sensitive screen to receive touch inputs (e.g., rubbing gestures) from the user. The process 2800 begins by displaying (at 2805) an image in an image display area of the image editing application.

Next, the process 2800 receives (at 2810) a selection of an area of the image. The process 2800 then identifies (at 2815) certain criteria for determining similarities between pixels. The process 2800 in some embodiments uses the image properties of some of the pixels in the selected area. More specifically, the process 2800 in some embodiments uses a set of pixels of the selected area that are initially touched by the user.

Different embodiments differently identify the criteria using the image properties. For instance, the process 2800 in some embodiments use average color value of the set of pixels. The process 2800 converts the average color value in RGB color model to a color value in LAB color space. The process 2800 then defines a range of distance from the color value in the LAB color space as a criterion. More details of converting a color value in RGB color model to a color value in the LAB color space are described in U.S. Pat. No. 8,229, 211. U.S. Pat. No. 8,229,211 is incorporated herein by reference.

The process 2800 then applies (at 2820) an image processing operation (e.g., saturating, de-saturating, lightening, darkening, sharpening, softening, etc.) to pixels that satisfy the identified criteria. In some embodiments, the process 2800 applies the image processing operation to each pixel in the area that has a color value in the LAB color space that falls in the defined range. The process then ends.

E. Un-Applying Image Processing Operations

As mentioned above, some of the on-image brush tools in some embodiments apply the corresponding effects to an area. In some embodiment, the image editing application provides an on-image brush tool that removes the effects that are applied to the area.

Figure 29:
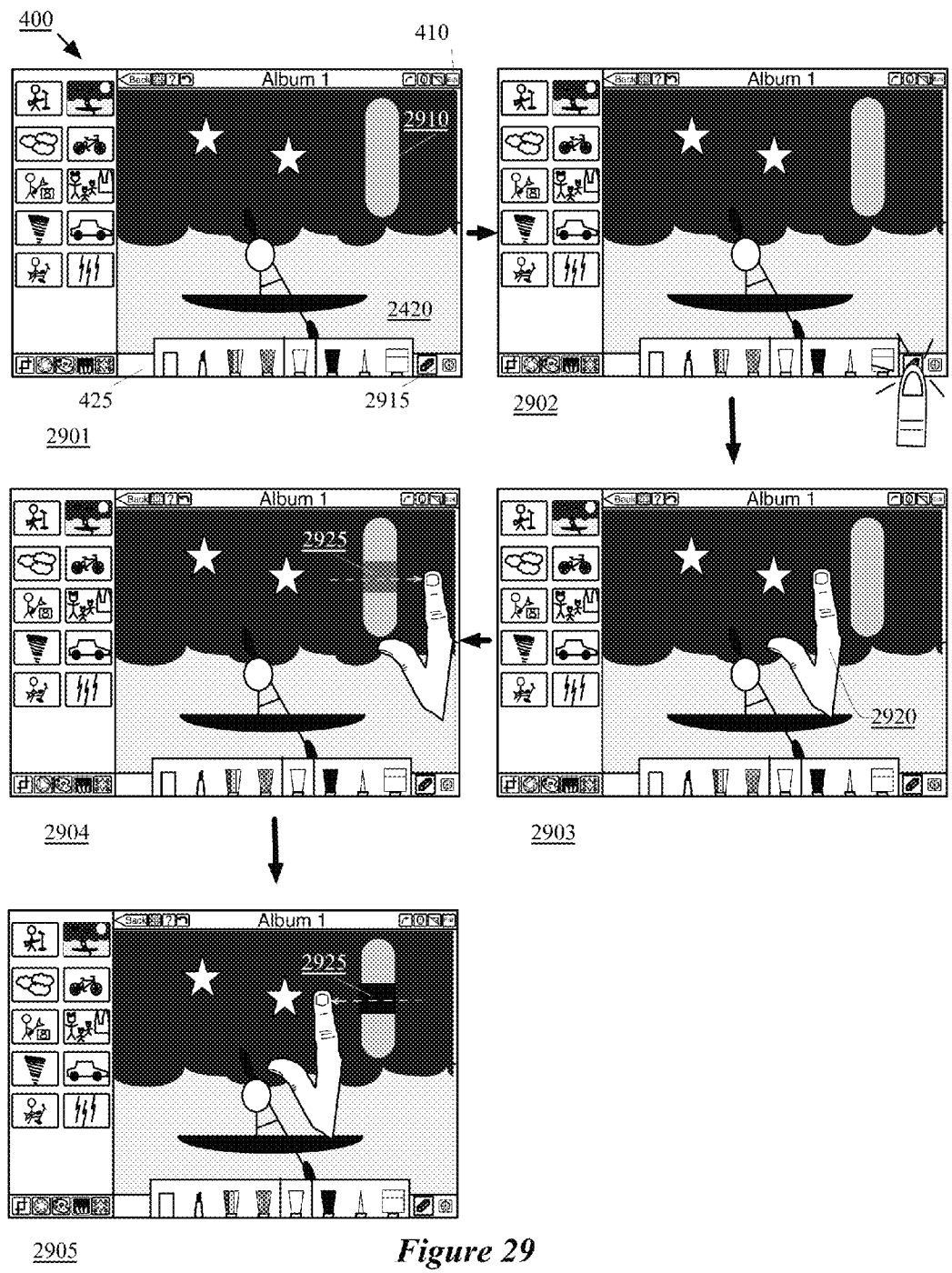
FIG. 29 conceptually illustrates the use of an eraser tool.

FIG. 29 conceptually illustrates the GUI 400 of an image editing application of some embodiments that allows a user to un-apply image processing operations from an area of an image. Specifically, this figure illustrates in five different stages 2901-2905 that the user incrementally un-applies an image processing operation that has been applied to an area of the image, by rubbing the area of the image. FIG. 29 illustrates that the GUI 2400 includes an image display area 2425.

In some embodiments, the image editing application of some embodiments provides an eraser tool which allows the user to un-apply image processing operation that have been applied to an area of the image, by rubbing the area of the image (e.g., swiping the area of the image one or more times). For instance, the eraser tool darkens a particular area of the image to which a lightening effect has been applied, by removing the lightening effect. That is, the eraser tool brings the area of the image back to a previous state before the lightening effect was applied.

In some embodiments, the eraser tool incrementally un-applies image processing operation each time the area of the image is touched. For instance, the eraser tool darkens by an incremental amount a particular area of the image to which a lightening effect has been applied. When the particular area is touched again, the eraser tool further darkens the area by the incremental amount. In some embodiments, the eraser tool does not un-apply image processing operation once the area of the image goes back to a state before the image processing operation was applied.

Different embodiments determine incremental amounts of image processing operations to remove differently. For instance, the eraser tool increases or decreases an image property value by a predefined incremental value based on the selected image operation. For example, when the image processing operation that has been applied is a lightening operation, the eraser tool decreases the luminance values of the area by a predefined luminance value delta. This delta may represent the same amount of luminance values by which some on image brush tool applies to an area per touch. In some embodiments, the eraser tool increases or decreases an image property value by a percentage. Also, the eraser tool in some embodiments uses a non-linear function to non-linearly decrease or increase the image property values of the area of the image.

Like the on-image brush tool of some embodiments does as described above, the eraser tool uses mask values to un-apply an image processing operation incrementally. That is, the eraser tool in some embodiments changes the mask value to un-apply image processing operation to the set of pixels to which the mask value is assigned.

In some embodiments, the eraser tool un-applies an image processing operation from an area of an image based on touch pressure. That is, the eraser tool in these embodiments determines the amount of the image processing operation to un-apply from an area based on the pressure applied to the area when the area is being touched. Thus, the image editing application that includes the eraser tool of these embodiments must be running on a computing device that has a touch-sensitive screen that is capable of measure touch pressure. As mentioned above, such a touch-sensitive screen may utilize an accelerometer to detect and measure pressure applied to the screen.

In some embodiments, the eraser tool does not incrementally un-apply an image processing operation. Instead, the eraser tool of these embodiments removes the image processing operation applied to an area of the image in the entirety. That is, the eraser tool restores the area of the image back to the state before the image processing operation was applied.

An example operation of the eraser tool of some embodiments will now be described. The first stage 2901 illustrates the image editing application displaying the image 2420 in the image display area 410. In this example, the first stage 2901 illustrates the GUI 400 after a lightening effect has been applied to an area 2910 of the image 2420. The image editing application also displays an icon 2915 in the tool display area 425. The icon 2915 represents the eraser tool.

At stage 2902, the user selects the icon 2915 and the image editing application activates the eraser tool in response to the selection of the icon 2915. At stage 2903, the user places a finger 2920 on the sky shown in the image 2420 left of the area 2910. The next stage 2904 illustrates that the user has dragged the finger 2920 to the right, past the area 2910, while touching the image 2420. The eraser tool incrementally removes the lightening effect from an area 2925 which is an intersection of the area 2910 and the area swiped by the finger 2920. As shown, the eraser tool has darkened the area 2925.

At stage 2904, the user has dragged the finger 2920 to the left direction. The finger 2920 touches the area 2925 again as the user drags the finger 2920 to the left. The eraser tool further darkens the area 2925. In this example, the eraser tool has moved the lightening effect that had been applied to the area 2925 completely so that the area 2925 come back to the state before the lightening effect was applied.

Figure 30:
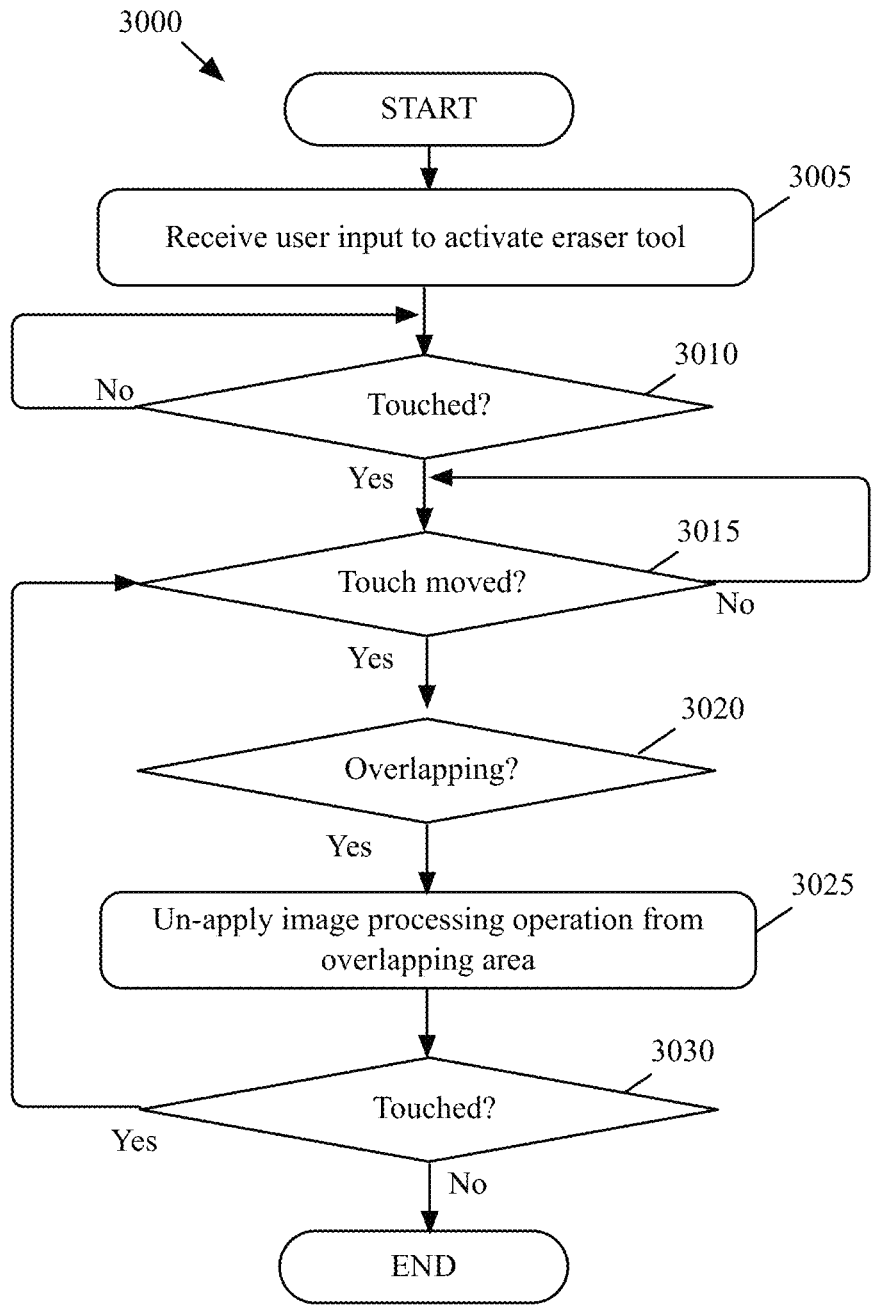
FIG. 30 conceptually illustrates a process that some embodiments perform to remove effects from an area of a displayed image.

FIG. 30 conceptually illustrates a process 3000 that some embodiments perform to allow a user of an image editing application to un-apply an image processing operation from an area of an image by rubbing the area. The process 3000 in some embodiments is performed by the image editing application. The process 3000 starts when the image editing application runs on a computing device that has a touch or near touch sensitive screen to receive touch inputs (e.g., rubbing gestures) from the user. The process 3000 starts when a displayed image has an area to which an image processing operation has been applied.

The process 3000 begins by receiving (at 3005) user input that causes the image editing application to activate the eraser tool of some embodiments. In some embodiments, such user input includes selecting an icon (e.g., the icon 2915 illustrated in FIG. 29 above).

The process 3000 then determines (at 3010) whether an area of the image is being touched. In some embodiments, the process 3000 receives or retrieves touch information (e.g., coordinates of an area of the touch or near touch sensitive screen that user's finger is touching) from the computing device to determine whether an area of the image is touched.

When the process determines (at 3010) that an area is not being touched, the process 3000 loops back to 3010 to wait for the user's touch of an area of the displayed image.

When the process 3000 determines (at 3010) that an area is being touched, the process proceeds to 3015 to determine whether the touch has been moved from the area. In some embodiments, the process 3000 determines that the touch has been moved from the area when the area that has been touched is no longer touched. Thus, the process 3000 determines that the touch has been moved from the area when the user lifts the finger up from the area or the user has moved the finger to another area of the image. When the process 3000 determines (at 3015) that the touch has not been moved from the area, the process 3000 loops back to 3015 to wait for the touch to move.

When the process 3000 determines (at 3015) that the touch has been moved from the area, the process 3000 determines (at 3020) whether the area overlaps with the area to which the image processing operation was applied. When the process 3000 determines (at 3020) that there is an overlapping area, the process 3000 un-applies (at 3025) the image processing operation by an incremental amount from the overlapping area. The process 3000 does not un-apply the image processing operation when there is nothing left to un-apply.

Different embodiments determine incremental amounts of image processing operations to remove differently. For instance, the process 3000 in some embodiments increases or decreases an image property value by a predefined incremental value based on the image processing operation applied to the overlapping area. For example, when the image processing operation that has been applied to the overlapping area is a lightening operation, the process 3000 decreases the luminance values of the area by a predefined luminance value delta. This delta may represent the same amount of luminance values by which some on image brush tool applies per touch. In some embodiments, the process 3000 increases or decreases an image property value by a percentage. Also, the process 3000 in some embodiments uses a non-linear function to non-linearly decrease or increase the image property values of the area of the image.

When the process 3000 determines (at 3020) that there is no overlapping area, the process proceeds to 3030. The process 3000 determines (at 3030) whether another area of the image is being touched. When the process 3000 determines (at 3030) that the other area of the image is being touched, the process 3000 loops back to 3015 to wait for the touch to move from this area. When the process 3000 determines (at 3030) that the other area of the image is not being touched, the process 3000 ends.

Section II has described several on-image brush tools of some embodiments. The next section will describe several on-image tools that apply several special effects to the images.

III. On-Image Effect Tools

Some embodiments provide on-image effect tools that allow the user to apply image processing operations or effects by selecting a portion of a displayed image. These on-image effect tools are not brush tools. That is, these on-image effect tools apply effects to an area that is not defined by the brush tools.

A. On-Image Gradient Tool

Figure 31:
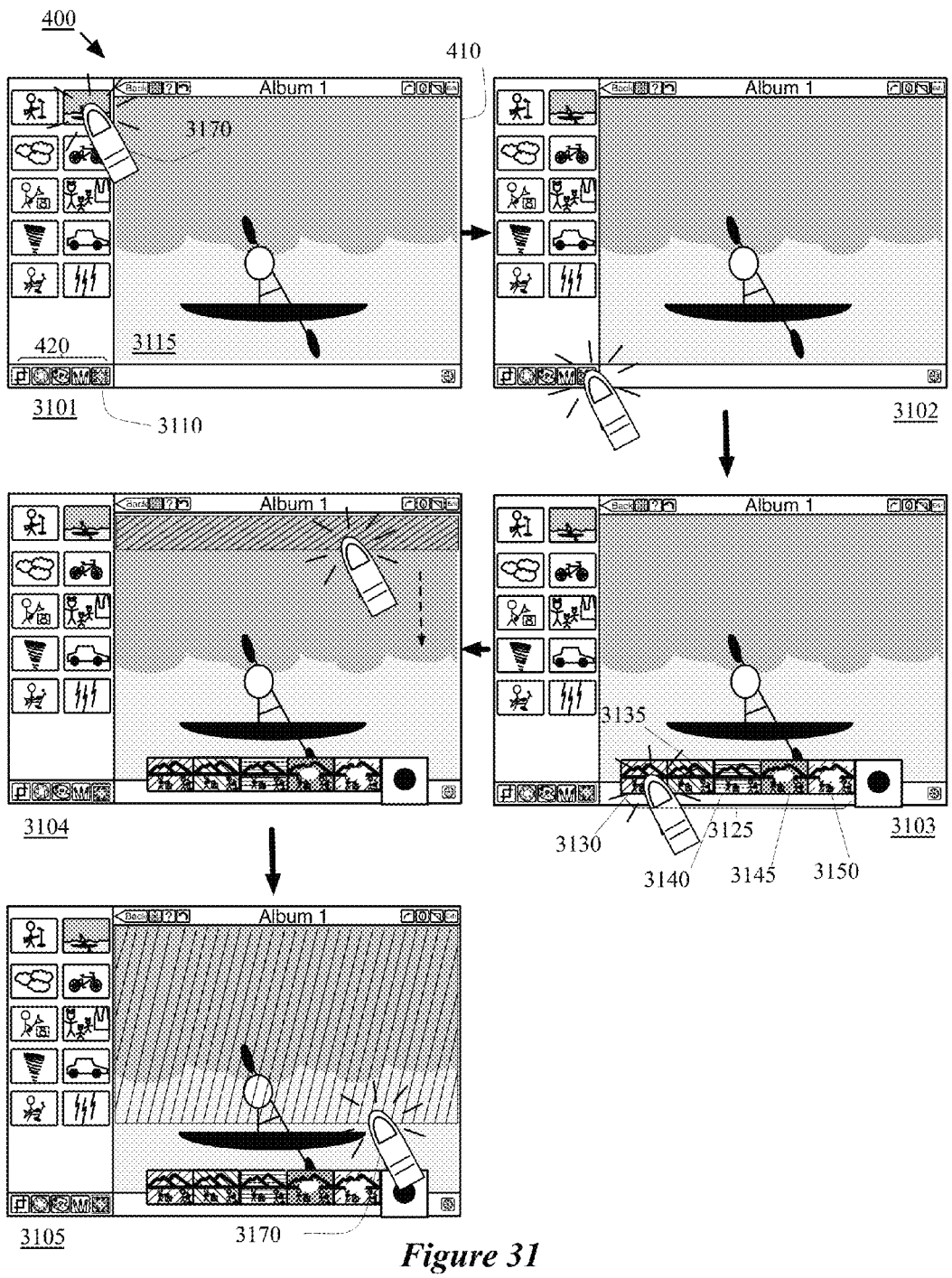
FIG. 31 conceptually illustrates the use of a gradient effect tool.

FIG. 31 conceptually illustrates use of an on-image effect tool of some embodiments that allows a user to apply image processing operations selectively to different portions of a selected area of an image. Specifically, this figure illustrates in five different stages 3101-3105 that the user applies a gradient effect to portions of the image by touching the image. FIG. 31 illustrates the GUI 400.

As mentioned above, the tool selection pane 420 in some embodiments displays a set of icons that represent different editing tool sets of the image editing application. The tool selection pane 420 includes an icon 3110, which in some embodiments is the fifth icon from the left displayed in the tool selection pane 430. The icon 3110 displayed in the tool selection pane 420 represents on-image effect tools in some embodiments. When the user selects the icon 3110, the image editing application in some embodiments displays a set of selectable UI items 3125 that represent these on-image effect tools in the tool display area 425 (or other parts of the GUI 400). When one of the tools is selected (when the user selects the icon representing the tool), the tool is activated and user inputs to the displayed image are treated as inputs to the selected tool.

The set of selectable UI items 3125 in some embodiments is a set of thumbnails and icons. In some embodiments, the set of selectable UI items 3125 is on one of the cards that fan out when the icon 3110 is selected. More details about fanning the cards are described in U.S. Provisional Patent Application 61/607,574.

The thumbnails and icons in the set of selectable UI items 3125 represent a number of different effects. For instance, a UI item 3130 represents an on-image dark gradient tool. A UI item 3135 represents an on-image warm gradient tool. A UI item 3140 represents an on-image cool gradient tool. A UI item 3145 represents a vignette tool. A UI item 3150 represents a tilt shift tool. Each of the tools, when activated, applies the effect to the area of the image defined by the user by touching the area.

An example operation of the on-image gradient tool will now be described. The first stage 3101 illustrates the user's selection of a thumbnail 3110 by touching the thumbnail 3110 with a finger 3170. The image editing application displays the image 3115, represented by the thumbnail 3110, in the image display area 410 in response to the selection of the thumbnail 3110.

At stage 3102, the user selects the icon 3110 displayed in the tool selection pane 420. In response, the image editing application at stage 3103 displays the set of selectable UI items 3125 in the GUI 400 as shown. The user selects the on-image dark gradient tool by touching the UI item 3130. The image editing application activates the on-image dark gradient tool.

At stage 3104, the user has touched a location near the top of the image 3115 with the finger 3170 or dragged the finger 3170 down to the location while touching the image 3115. The on-image dark gradient tool has applied a dark gradient effect from the top of the image 3115 to the location where the finger 3170 is. The portion of the image that is above the finger 3170 is depicted darker than before to indicate a gradient effect has been applied to this portion.

Stage 3105 illustrates the GUI 400 after the user has touched a location of the image that is closer to the bottom of the image 3115 or dragged the finger 3170 to this location while touching the image 3115. The dark gradient tool has applied the gradient effect from the vertical location where the finger 3170 was at the previous stage 3104 to the vertical location of the finger 3170 at the current stage 3105. The portion of the image that is above the finger 3170 is depicted darker than before to indicate a gradient effect has been applied to this portion.

In some embodiments, the on-image dark gradient tool allows the user to apply the gradient effect by touching two locations in the image. When the user touches two locations, an upper location and a lower location, the on-image dark gradient tool draws an invisible horizontal line that crosses each of the two locations and applies the gradient effect on the portion of the image between the two lines. In some embodiments, these two lines are parallel lines and the distance between the two lines can be adjusted by dragging one or both of the two fingers used to touch the two locations closer or farther from each other. Moreover, in some embodiments, the on-image dark gradient tool allows the user to rotate the two lines such that two lines become not horizontal. Furthermore, the on-image dark gradient tool applies different amount of the gradient effect on a portion of the image between the two lines. For instance, the pixels near one of the two lines become darkest (e.g., representing 100% of the gradient effect) and the pixels close to the other line become lightest (e.g., representing 0% of the gradient effect) in some embodiments. In some such embodiments, the amount of gradient effect applied to pixels in the portion depends on the pixels proximity to either of the two lines. The use of two lines are applicable to other gradient tools (e.g., the warm gradient tool) described in this application.

Figure 32:
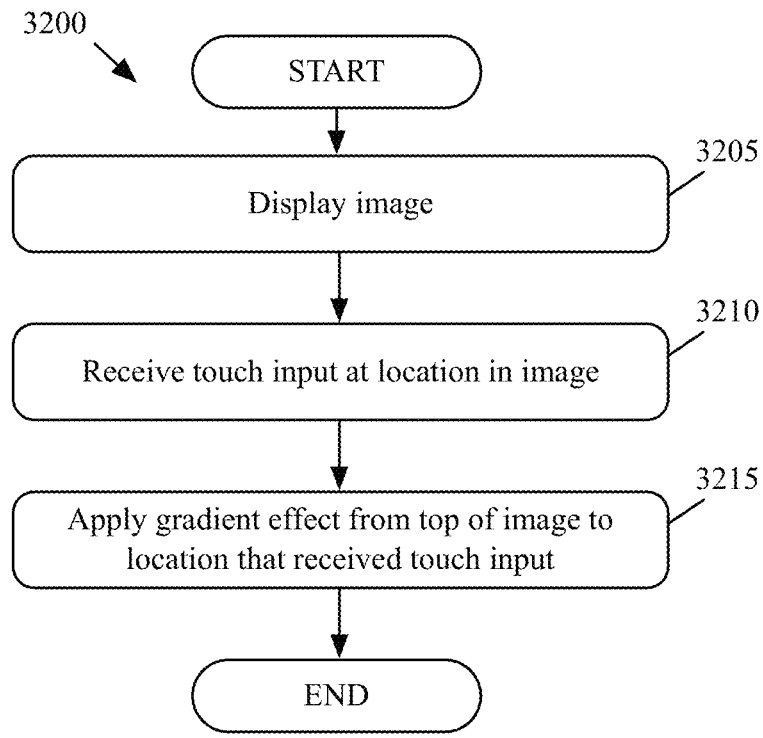
FIG. 32 conceptually illustrates a process that some embodiments perform to allow the user to apply a gradient effect to an image.

FIG. 32 conceptually illustrates a process 3200 that some embodiments perform to allow a user of an image editing application to apply a gradient effect to an image. The process 3200 in some embodiments is performed by the image editing application. The process 3200 starts when the image editing application runs on a computing device that has a touch or near touch sensitive screen to receive touch inputs (e.g., tapping, swiping, etc.) from the user. The process 3200 begins by displaying (at 3205) an image in an image display area of the image editing application.

Next, the process 3200 receives (at 3210) a touch input on a location in the displayed image. In some embodiments, the process 3200 receives a touch input on a location when the user taps on the location. The process 3200 receives a touch input when the user drags a finger from another location in the displayed image while touching the displayed image (e.g. without lifting the finger up).

The process 3200 then applies (at 3215) the gradient effect to the image. When the user taps a location in the displayed image, the process 3200 applies the gradient effect from the top of the image to the location of the image. When the user drags the finger from a first location of the image to a second location that is further from the top of the image than the first location is, the process 3200 applies the gradient effect to the portion of the image that vertically spans from the top of the image to the second location. When the gradient effect has been already applied to a portion of the image that spans from the top of the image to the first location, the process 3200 applies the gradient effect to a portion of the image that vertically spans from the first location to the second location.

The several different on-image gradient effect tools mentioned above apply different gradient effects to the image. When applied, these different gradient effects provide different visual characteristics. For instance, a portion of the image to which the "dark gradient" effect is applied appears dark. The "warm gradient" effect makes a portion of the image appear "warm." The on-image gradient tools effectuate these different visual characteristics by differently processing the pixels of the image. The next four figures, FIGS. 33-36, illustrate two different example gradient effects that the on-image gradient effect tools may apply.

Figure 33:
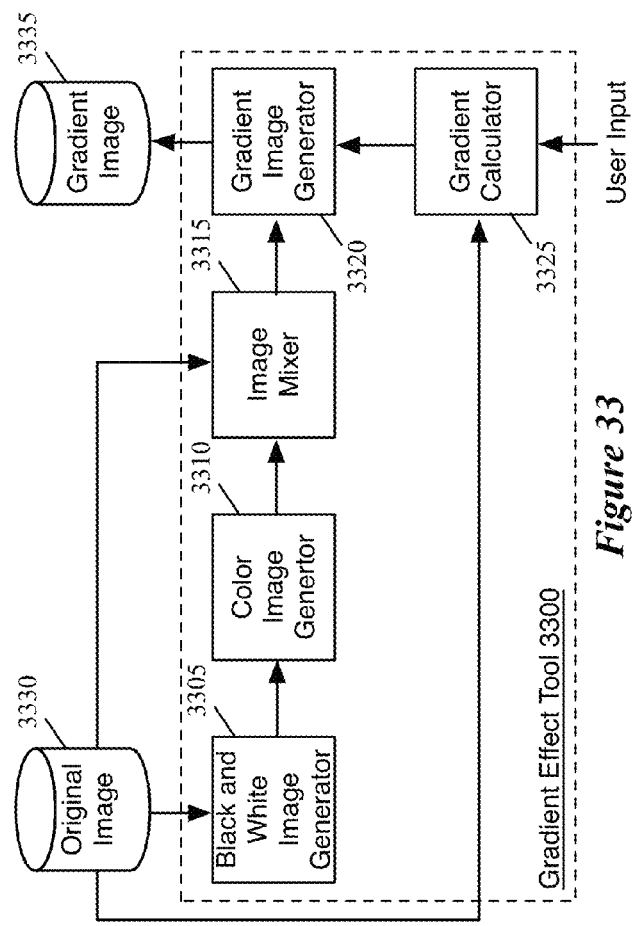
FIG. 33 conceptually illustrates architecture of an on-image gradient effect tool that applies a particular gradient effect to a portion of image that is selected by the user.

FIG. 33 conceptually illustrates architecture of an on-image gradient effect tool that applies a particular gradient effect to a portion of image that is selected by the user. Specifically, this figure illustrates that the on-image gradient effect tool applies a "blue" gradient effect. As shown, FIG. 33 illustrates a gradient effect tool 3300, an original image data 3330, and a gradient image 3335.

The original image 3330 is image data for a selected image before a gradient effect is applied. The selected image is an image that is displayed in an image display area of the image editing application. The gradient image 3335 is image data for an image resulting from applying a gradient effect to the image. In some embodiments, the gradient image 3335 is a set of instructions to perform to generate a new image from the original image.

The gradient effect tool 3300 applies the blue gradient effect to the original image. The gradient effect tool 3300 includes a black and white image generator 3305, a color image generator 3310, an image mixer 3315, a gradient calculator 3325, and a gradient image generator 3320.

The black and white (B/W) image generator 3305 generates a black and white image based on the original image 3330. In some embodiments, the B/W image generator 3305 emphasizes the blues in the black and white image. The B/W image generator 3305 in some embodiments uses a blue RGB triplet, e.g., (0.02, 0.018, 0.77). The three numbers in the triplet represent three channels of the primary colors—i.e., redness, greenness, and blueness, respectively. Each of the three numbers has a range of 0 to 1, representing range of the color. For instance, 0 represents no blueness and 1 represents maximum blueness for the first number in the parenthesis. One of the ordinary skill in the art recognizes that other ranges may be used for an RGB value, e.g., 0-255, 0%-100%, 0-65535, etc.

To generate a B/W image emphasizing the blues, the B/W image generator 3305 computes a dot product of each pixel in the original image and the square of the blue RGB triplet. Such a dot product can be expressed in the following pseudo code:

$$c1=\text{dot}(\text{image.rgb},\text{blue.rgb}^2);$$

Image.rgb is an RGB triplet of a pixel in the original image. Blue.rgb is the blue RGB triplet. C1 is the dot product and is also the brightness value (e.g., luminance value, RGB sum, etc.) for the corresponding pixel in the resulting B/W image. The brightness value for the pixel in the B/W image has a (grayscale) range of 0 to 1 with 0 being black and 1 being white.

The color image generator 3310 converts the B/W image generated by the B/W image generator 3305 into a blue image. In some embodiments, the color image generator 3310 generates the RGB triplet of each pixel of the blue image by squaring the brightness value of the corresponding pixel in the B/W image, multiplying the blue RGB triplet by the squared brightness value, and then doubles the result of multiplication. This could be expressed in the following pseudo code:

$$\text{blueImage}=2.0*(c1^2)*\text{blue.rgb};$$

BlueImage is an RGB value of a pixel in the generated blue image.

The image mixer 3315 mixes the original image and the blue image by using a grayscale of 0-1 in order to ensure that bright areas in the image retain their whiteness while darker areas appear blue. The mixing can be performed using the following pseudo code example:

$$\text{mixedImage}=\text{mix}(\text{originalImage},\text{blueImage},(1.0-c1));$$

MixedImage is an RGB triplet of a pixel in the mixed image. OriginalImage is the RGB triplet of the corresponding pixel in the original image. Mix( ) is a function. Different embodiments use different mix( ) functions. In some embodiments, the mix( ) function computes an arithmetic average of the three input values/triplets. When a triplet is averaged with a single value (e.g., 1.0−c1), each value is averaged with the single value.

The gradient calculator 3325 computes a gradient value for each pixel of the original image. The gradient calculator 3325 in some embodiments computes the gradient value for a particular pixel based on the location of the pixel in the original image. Because the on-image gradient effect tool in some embodiments applies a gradient effect based on the vertical location of the user's touch, the gradient calculator 3325 computes gradient value based on the row number of the particular pixel. The computation of gradient value for the particular pixel is also based on the row number of the touched location and the overall height of the original image.

In some embodiments, the row number of a pixel is the pixel's y-coordinate with the top most pixels (i.e., the top row of pixels of the image) having a y-coordinate of 0 and the bottom pixels (i.e., the bottom row of pixels of the image) having a y-coordinate of the overall height (i.e., number of pixels in a column of pixels in the image −1). That is, y-coordinate starts from the top row of the image.

The gradient calculator 3325 in some embodiments sets the gradient value for the particular pixel to 0 when the particular pixel is below the vertical location of the user's touch. This is expressed in the following pseudo code:

```
if row > heightTouched
    gradient = 0.0;
```

Row is the y-coordinate value of the particular pixel. Height-Touched is the y-coordinate of the user's touch (e.g., vertical center pixel(s) of a set of pixels touched). The gradient calculator gets the heightTouched value from the touch information (i.e., user input) from a user interface module (not shown) that receives the user's touch.

The gradient calculator 3325 in some embodiments computes the gradient value for the particular pixel when the particular pixel is above the vertical location of the user's touch using the following pseudo code:

```
topY = min(0.0, heightTouched.n − 0.2);
r = row / (height − 1);
r = (r − topY) / (heightTouched.n − topY);
if (r < 0.8)
    gradient = (0.1r + (0.8 − r)*0.8) / 0.8;
elseif ( r < 0.9)
    gradient = ((r − 0.8)*0.03 + (0.9 − r)*0.1) / 0.1;
else
    gradient = ((r − 0.9)*0.03 + (1 − r)*0.1) / 0.1;
```

TopY is computed in order to apply a gentle falloff of the gradient effect for the pixels near the top of the image. R is a normalized row number having a range of 0 to 1. Height is the overall height (i.e., number of pixels in a column of pixels) of the original image. HeightTouched.n is a normalized heightTouched and has a range of 0 to 1, with 0 being the top pixel row of the original image and 1 being the bottom pixel row of the original image.

The gradient image generator 3320 blends the mixed image with the original image using the gradient values computed by the gradient calculator 3325. In some embodiments, the gradient image generator 3320 uses the following pseudo code to blend the mixed image with the original image to generate a new image:

```
gradImage=originalImage*(1−gradient)+
    mixedImage*gradient;
```

GradImage is an RGB triplet of a pixel in the new image that has been generated by applying the blue gradient effect to the original image.

Figure 34:
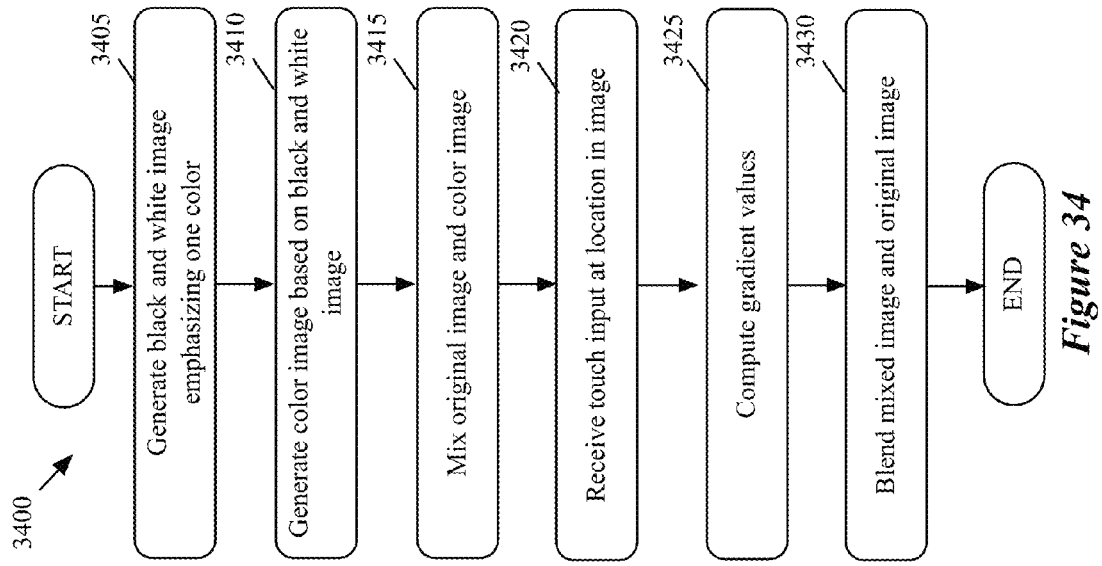
FIG. 34 conceptually illustrates a process that some embodiments perform to apply a gradient effect an image.

An example operation of the blue gradient effect tool 3300 will now be described by reference to FIGS. 33 and 34. FIG. 34 conceptually illustrates a process 3400 that some embodiments perform to apply the blue gradient effect an image. The process 3400 in some embodiments is performed by an on-image gradient effect tool such as the gradient effect tool 3300. The process 3400 starts when the on-image gradient effect tool is activated by the image editing application and has received an image data for a displayed image.

The process 3400 begins by generating (at 3405) a black and white (B/W) image emphasizing one color based on the original image. The process 3400 in some embodiments emphasizes blue in the B/W image by using a blue RGB triplet, e.g., (0.02, 0.018, 0.77). The values in the blue RGB triplet may be different for different embodiments as long as the blueness is greater than the redness and greenness. For instance, the difference between the blueness and other colors in the triplet may be an order of magnitude.

The process 3400 in some embodiments computes a brightness value for each pixel of the B/W image using the RGB triplet of the corresponding pixel (i.e., pixel having the same coordinates) of the original image. For instance, the B/W image generator 3305 computes the brightness value for a pixel of the B/W image by taking a dot product of the RGB triplet, (0.5, 0.5, 0.5) of the corresponding pixel of the original image and the blue RGB triplet. Then, the brightness value for the pixel of the B/W image would be 0.02*0.5+0.018*0.5+0.77*0.5, which is 0.404.

Next, the process 3400 generates (at 3410) a color image for the emphasized color based on the B/W image. In some embodiments, the process 3400 generates a blue image by computing an RGB triplet for each pixel of the blue image based on the brightness value of the corresponding pixel in the B/W image. For instance, the color image generator 3310 computes the RGB triplet of a pixel for the blue image using the previously generated brightness value 0.404 of the corresponding pixel in the B/W image. The RGB triplet of the pixel in the blue image is $2.0*(0.404^2)*(0.02, 0.018, 0.77)$, which is (0.00652864, 0.005875776, 0.25135264).

Next, the process 3400 mixes (at 3415) the original image and the generated color image based on the B/W image. For instance, the image mixer 3315 mixes the pixels of the original image and the color image generated using the brightness value 0.404 and the corresponding pixels in the B/W image. As mentioned above, the original pixel has an RGB triplet (0.5, 0.5, 0.5). The RGB triplet of the corresponding pixel in the blue image is (0.00652864, 0.005875776, 0.25135264). Thus, the RGB triplet of the corresponding pixel in the mixed image is ((0.5+0.00652864+0.0404)/3, (0.5+0.005875776+0.0404)/3, (0.5+0.25135264+0.0404)/3) in some embodiments, which is (0.182309547, 0.182091925, 0.263917547).

Next, the process 3400 receives (at 3420) a touch input on a location in the original image. In some embodiments, the process 3400 receives a touch input on a location when the user taps on the location. The process 3400 receives a touch input when the user drags a finger from another location in the original image while touching the displayed image (e.g. without lifting the finger up). For instance, the original image has a height of 768 pixels and the location of the touch is 300th pixel from the top of the image. In some embodiments, the pixel that is considered to have been touched is a pixel at the center of the set of pixels that were touched by the user's finger. In some embodiments, the pixel that is considered to have been touched is the average pixel coordinate of the set of pixels that were touched by the user's finger.

The process 3400 then computes (at 3425) a gradient value for each pixel of the original image. In some embodiments, the process 3400 computes the gradient value for a particular pixel based on the location of the pixel in the original image. Because the on-image gradient effect tool in some embodiments applies a gradient effect based on the vertical location of the user's touch, the process 3400 computes the gradient value based on the row number of the particular pixel. The computation of the gradient value for the particular pixel is also based on the row number of the touched location and the overall height of the original image.

For instance, the gradient calculator 3325 computes a gradient value for a pixel that is the 200th pixel from the top of the original image. The gradient calculator 3325 computes topY. The topY is the minimum of 0.0 and (200/768)−0.2, which is 0.0. The gradient calculator 3325 computes the normalized row number. The normalized row number is (200/(768−1)−0.0)/(300/768−0.0), which is 0.668407311. The gradient calculator 3325 then computes the gradient value. Because the normalized row number is smaller than 0.8, the gradient value is (0.1*0.668407311+(0.8−0.668407311)*0.8)/0.8, which is 0.215143603.

The process 3400 then blends (at 3430) the mixed image and the original image using the computed gradient values. The process 3400 computes an RGB triplet for each pixel of the blended image. For instance, the gradient image generator 3320 computes an RGB triplet for a pixel in the blended image. The corresponding pixel in the original image is the pixel that is 200th pixel from the top. Thus, the RGB triplet for the pixel in the blended image is (0.5, 0.5, 0.5)*(1−0.215143603)+(0.182309547, 0.182091925, 0.263917547)*0.215143603, which is (0.431650931, 0.431604111, 0.44920837).

Figure 35:
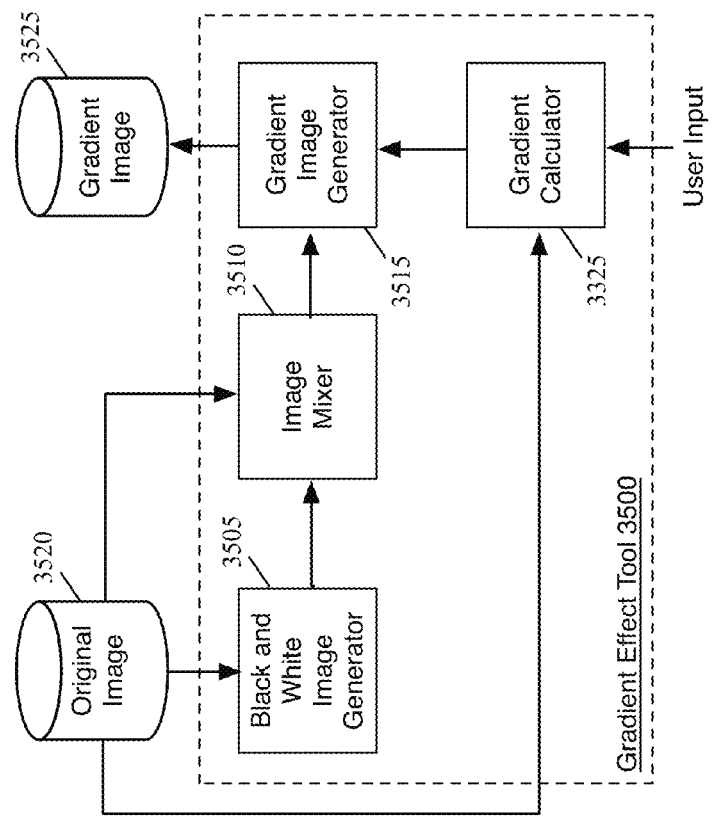
FIG. 35 conceptually illustrates architecture of an on-image gradient effect tool that applies a particular gradient effect to a portion of image that is selected by the user.

FIG. 35 conceptually illustrates architecture of an on-image gradient effect tool that applies a particular gradient effect to a portion of image that is selected by the user. Specifically, this figure illustrates that the on-image gradient effect tool applies a "coffee" gradient effect. As shown, FIG. 35 illustrates a gradient effect tool 3500, an original image data 3520, and a gradient image 3525.

The original image 3520 is image data for a selected image before a gradient effect is applied. The selected image is an image that is displayed in an image display area of the image editing application. The gradient image 3525 is image data for an image resulting from applying a gradient effect to the image. In some embodiments, the gradient image 3525 is a set of instructions to perform to generate a new image from the original image.

The gradient effect tool 3500 applies the coffee gradient effect to the original image. The gradient effect tool 3500 includes a black and white image generator 3505, an image mixer 3510, the gradient calculator 3325, and a gradient image generator 3515.

The black and white (B/W) image generator 3505 generates a black and white image based on the original image 3530. The B/W image generator in some embodiments uses a B/W RGB triplet, e.g., (0.2, 0.7, 0.1) to generate the B/W image. Each of the three numbers in the triplet has a range of 0 to 1, representing a range of the color. To generate a B/W image, the B/W image generator 3505 computes a dot product of the RGB triplet for each pixel in the original image and the B/W RGB triplet. The B/W image generator 3505 in some embodiments also scales the dot product by 2.0 to get a brighter B/W image. Such a dot product can be expressed in the following pseudo code:

$$bw = 2.0 * \text{dot}(im, (0.2, 0.7, 0.1)) = 2.0 * (im.r * 0.2 + im.g * 0.7 + im.b * 0.1);$$

Bw is the brightness value of a pixel in the B/W image. Im is the RGB triplet (im.r, im.g, im.b) of the corresponding pixel in the original image.

The image mixer 3510 mixes the original image and the B/W image by using a coffee RGB triplet, which defines a brownish color. In some embodiments, the coffee RGB triplet is (0.7, 0.5, 0.35). The image mixer 3510 in some embodiments mixes original image and the B/W image by multiplying the RGB values of the pixels of the original image by the coffee RGB triplet and by the brightness values of the pixels of the B/W image. Such mixing can be expressed in the following pseudo code:

$$\text{mixedImage} = im * \text{coffeeRGB} * bw;$$

Mixedimage is an RGB triplet of a pixel in the mixed image. CoffeeRGB is the coffee RGB triplet. Bw is the RGB triplet of the corresponding pixel in the B/W image generated by the B/W image generator 3505.

The gradient image generator 3520 blends the mixed image with the original image using the gradient values computed by the gradient calculator 3325. In some embodiments, the gradient image generator 3520 uses the following pseudo code to blend the mixed image with the original image to generate a new image:

$$\text{gradImage} = \text{originalImage} * (1 - \text{gradient}) + \text{mixedImage} * \text{gradient};$$

GradImage is an RGB triplet of a pixel in the new image that has been generated by applying the coffee gradient effect to the original image.

Figure 36:
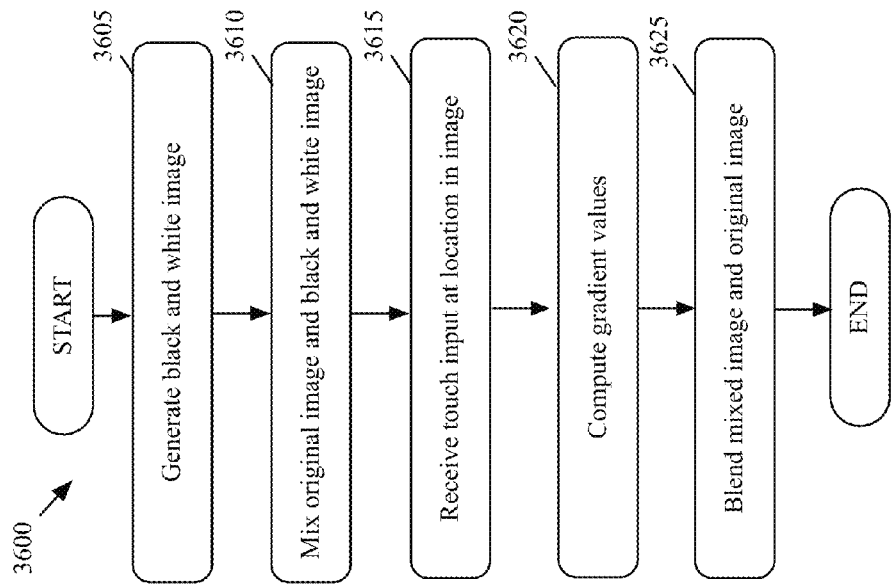
FIG. 36 conceptually illustrates a process that some embodiments perform to apply a gradient effect to an image.

An example operation of the coffee gradient effect tool 3500 will now be described by reference to FIGS. 35 and 36. FIG. 36 conceptually illustrates a process 3600 that some embodiments perform to apply the coffee gradient effect to an image. The process 3600 in some embodiments is performed by an on-image gradient effect tool such as the gradient effect tool 3500. The process 3600 starts when the on-image gradient effect tool is activated by the image editing application and has received an image data for a displayed image.

The process 3600 begins by generating (at 3605) a black and white (B/W) image. The process 3600 in some embodiments generates the B/W image by using a B/W RGB triplet, e.g., (0.2, 0.7, 0.1). The process 3600 in some embodiments computes a brightness value for each pixel of the B/W image using the RGB triplet of the corresponding pixel (i.e., pixel having the same coordinates) of the original image. For instance, the B/W image generator 3505 computes the brightness value for a pixel of the B/W image by taking a dot product of the RGB triplet, e.g., (0.3, 0.4, 0.5) of the corresponding pixel of the original image and the B/W RGB triplet. Then, the brightness value for the pixel of the B/W image would be 2.0*(0.3*0.2+0.3*0.7+0.5*0.1), which is 0.64.

Next, the process 3600 mixes (at 3610) the original image and the B/W image using a coffee RGB triplet, e.g., (0.7, 0.5, 0.35). For instance, the image mixer 3515 mixes the pixels of the original image and the generate color image using the brightness value 0.64 of the corresponding pixel in the B/W image. As mentioned above, the original pixel has an RGB triplet (0.3, 0.4, 0.5). Thus, the RGB triplet of the corresponding pixel in the mixed image is (0.3, 0.4, 0.5)*(0.7, 0.5, 0.35)*0.64, which is (0.0768, 0.128, 0.112).

Next, the process 3600 receives (at 3615) a touch input on a location in the original image. In some embodiments, the process 3600 receives a touch input on a location when the user taps on the location. The process 3600 receives a touch input when the user drags a finger from another location in the original image while touching the displayed image (e.g. without lifting the finger up). For instance, the original image has a height of 768 pixels and the location of the touch is the 400th pixel from the top of the image. In some embodiments, the pixel that is considered to have been touched is a pixel at the center of the set of pixels that were touched by the user's finger. In some embodiments, the pixel that is considered to have been touched is the average pixel coordinate of the set of pixels that were touched by the user's finger.

The process 3600 then computes (at 3620) a gradient value for each pixel of the original image. In some embodiments, the process 3600 computes the gradient value for a particular pixel based on the location of the pixel in the original image. Because the on-image gradient effect tool in some embodiments applies a gradient effect based on the vertical location of the user's touch, the process 3600 computes the gradient value based on the row number of the particular pixel. The computation of the gradient value for the particular pixel is also based on the row number of the touched location and the overall height of the original image.

For instance, the gradient calculator 3325 computes a gradient value for a pixel that is the 300th pixel from the top of the original image. The gradient calculator 3525 computes topY. The topY is the minimum of 0.0 and (300/768)−0.2, which is 0.0. The gradient calculator 3525 computes the normalized row number. The normalized row number is (300/(768−1)−0.0)/(400/768−0.0), which 0.750977835. The gradient calculator 3325 then computes the gradient value. Because the normalized row number is smaller than 0.8, the gradient value is (0.1*0.750977835+(0.8−0.750977835)*0.8)/0.8, which is 0.142894394.

The process 3600 then blends (at 3625) the mixed image and the original image using the computed gradient values. The process 3600 computes an RGB triplet for each pixel of the blended image. For instance, the gradient image generator 3515 computes an RGB triplet for a pixel in the blended image. The corresponding pixel in the original image is the pixel that is 300th pixel from the top. Thus, the RGB triplet for the pixel in the blended image is (0.3, 0.4, 0.5)*(1−0.142894394)+(0.0768, 0.128, 0.112)*0.142894394, which is (0.268105971, 0.361132724, 0.444556975).

Several on-image gradient effect tools have been described in this sub-section. The next sub-section below describes several on-image tilt shift tools.

B. On-Image Tilt Shift Tools

Figure 37:
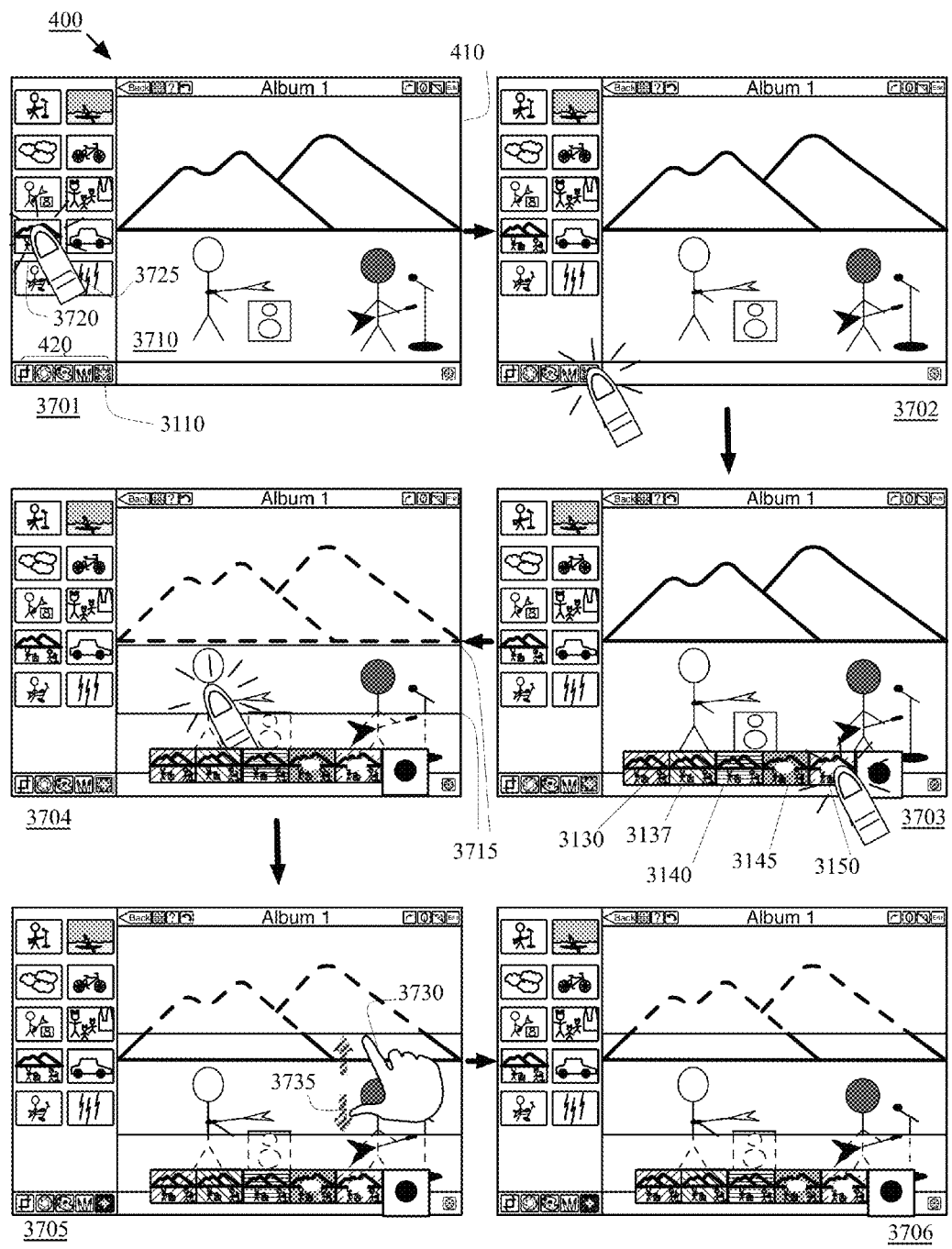
FIG. 37 conceptually illustrates the use of a tilt-shift effect tool.

FIG. 37 conceptually illustrates use of an on-image effect tool of some embodiments that allows a user to apply a tilt shift effect to a selected portion of an image by touching the image. Specifically, this figure illustrates in six different stages 3701-3706 that the user applies a tilt shift effect to an image 3725 by touching and manipulating a tilt shift tool 3715, which is a visible on-image tool. FIG. 37 illustrates the GUI 400, the icons 3110, and 3130-2950.

As mentioned above, the image display area 410 displays an image that the user wishes to edit using the image editing application. In some embodiments, the image editing application allows the user to apply a tilt shift effect to the image by touching the displayed image and manipulating the tilt shift tool 3715. The image editing application overlays the image displayed in an image display area 410 with the tilt shift tool 3715. The tilt shift tool 3715 is similar to the tilt shift tool 211 described above by reference to FIG. 2.

An example operation of the on-image tilt shift tool will now be described. The first stage 3701 illustrates the user's selection of a thumbnail 3710 by touching the thumbnail 3720 with a finger 3725. The image editing application displays the image 3710, represented by the thumbnail 3720, in the image display area 410 in response to the selection of the thumbnail 3710.

At stage 3702, the user selects the icon 3110 displayed in the tool selection pane 420. In response, the image editing application at stage 3703 displays the set of selectable UI items 3125 in the GUI 400 as shown. The user selects the on-image tilt shift tool by touching the UI item 3150. The image editing application activates the on-image tilt shift tool.

The next stage 3704 illustrates the GUI 400 after the user has touched an area of the image slightly below the vertical center of the image. At this stage, the tilt shift tool 3715 has placed two parallel lines on the image such that the center of the touched area is equidistant from the two parallel lines. The tilt shift tool 3715 also has blurred the portion of the image that is vertically above the top parallel line and the portion of the image that is vertically below the bottom parallel line. In some embodiments, the tilt shift tool 3715 may place the two parallel lines on the default locations of the image with a default width.

At stage 3705, the user has performed a spreading gesture on the image using fingers 3730 and 3735 to spread the two parallel lines further apart. Both the top and bottom lines have moved. The top line has moved up and the bottom line has moved down. As a result, the portion of the image between the two parallel lines has become bigger and the tilt shift tool does not blur this portion of the image.

The next stage 3706 illustrates the GUI 400 after the user has lifted the fingers 3730 and 3735 up from the image 3730. The two parallel lines remain visible to indicate that these two lines can be manipulated. When the user exits an edit mode of the image editing application, the two parallel lines disappear from the image 3710.

Figure 38:
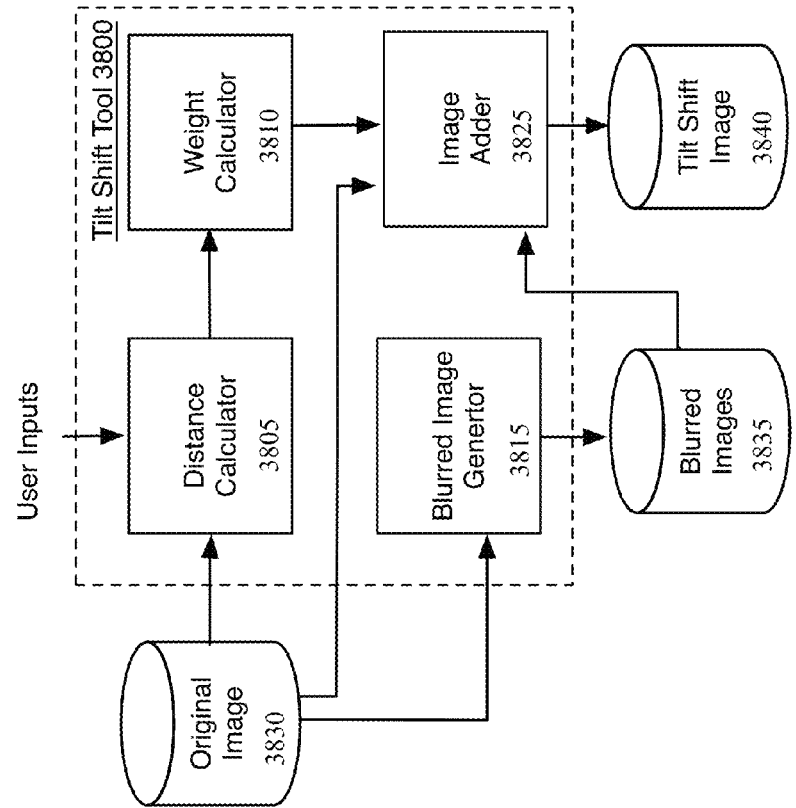
FIG. 38 conceptually illustrates the architecture of an on-image tilt-shift effect tool.

FIG. 38 conceptually illustrates the architecture of an on-image tilt shift tool of some embodiments that applies a tilt shift effect to a portion of image that is selected by the user. Specifically, this figure illustrates that the on-image tilt effect tool applies a tilt shift effect using several pre-generated images that are blurred based on the original selected image. As shown, FIG. 38 illustrates an on-image tilt shift tool 3800, an original image data 3830, blurred images 3835, and a tilt shift image 3840.

The original image data 3830 is image data for a selected image before a tilt shift effect is applied. The selected image is an image that is displayed in an image display area of the image editing application. The tilt shift image 3840 is image data for an image resulting from applying a tilt shift to the image. In some embodiments, the tilt shift image 3335 is a set of instructions to perform to generate a new image from the original image.

The on-image tilt shift tool 3800 includes a blurred image generator 3815, a distance calculator 3805, a weight calculator 3810, and an image adder 3825. The on-image tilt shift tool in some embodiments allows for a vertical tilt-shift— blurring the image except a horizontal strip of the image defined based on the vertical location of the user's touch (in other words, blurring part of the image that is not within a predefined vertical distance from the location of the user's touch). The on-image tilt shift tool 3800 may be modified to enable the tilt shift tool 3800 to allow for a radial tilt shift— blurring part of the image that is not within a predefined distance from the location of the user's touch. The on-image tilt shift tool 3800 in some embodiments generates a tilt shift image by combining the original image with the blurred versions of the original image.

The blurred image generator 3815 generates several blurred images based on the original image. In some embodiments, the blurred image generator 3815 generates the blurred images by convolving the original image with Gaussian kernels. The standard deviations of the Gaussian kernels are relative to the size of the original image to process. Also, the standard deviations increase proportionally with the dimension of the original image. That is, the bigger the dimensions of the original image, the bigger the standard deviations of the Gaussian kernels become. For instance, when the blurred image generator 3815 generates five blurred images, the standard deviations for the five Gaussian kernels are set as 1.6, 4, 8, 12 and 16 pixels large for an original image with a dimension of 2000 pixels. When the on-image tilt shift tool 3800 is activated by the image editing application, the blurred image generator 3815 pre-generates the blurred images and stores the blurred images (e.g., in cache) so that these blurred images can be quickly combined to generate the tilt shift image upon receiving user's touch on the original image.

The distance calculator 3805 receives the user input from a user interface module (not shown) that receives touch inputs. For each pixel in the original image, the distance calculator 3805 computes the vertical distance (e.g., difference between y-axis values) between the pixel and the pixel that has been touched by the user. In some embodiments, the distance calculator 3805 normalizes the computed vertical distance using this example pseudo code:

```
denom = 1.0 / max(heightTouched, imageHeight − heightTouched);
dist = 1.1 − | (currentRow−heightTouched) |*denom*1.25;
dist = max( min(dist, 1.0), 0.0);
```

HeightTouched is the y-coordinate of the pixel that the user has touched (e.g., vertical center pixel(s) of a set of pixels touched). In some embodiments, the y-coordinate starts from the top row of the image. That is, the top row of pixels of the image has a y-coordinate of 0 and the bottom row of pixels of the image has a y-coordinate of the overall height (e.g., number of pixels in a column of pixels in the image −1). ImageHeight is the overall height of the original image. CurrentRow is the y-coordinate of the row to which a particular pixel that is currently being processed belongs. Dist is a normalized distance for the particular pixel. Distance is normalized to have a range of 0 to 1.1.

Figure 39:
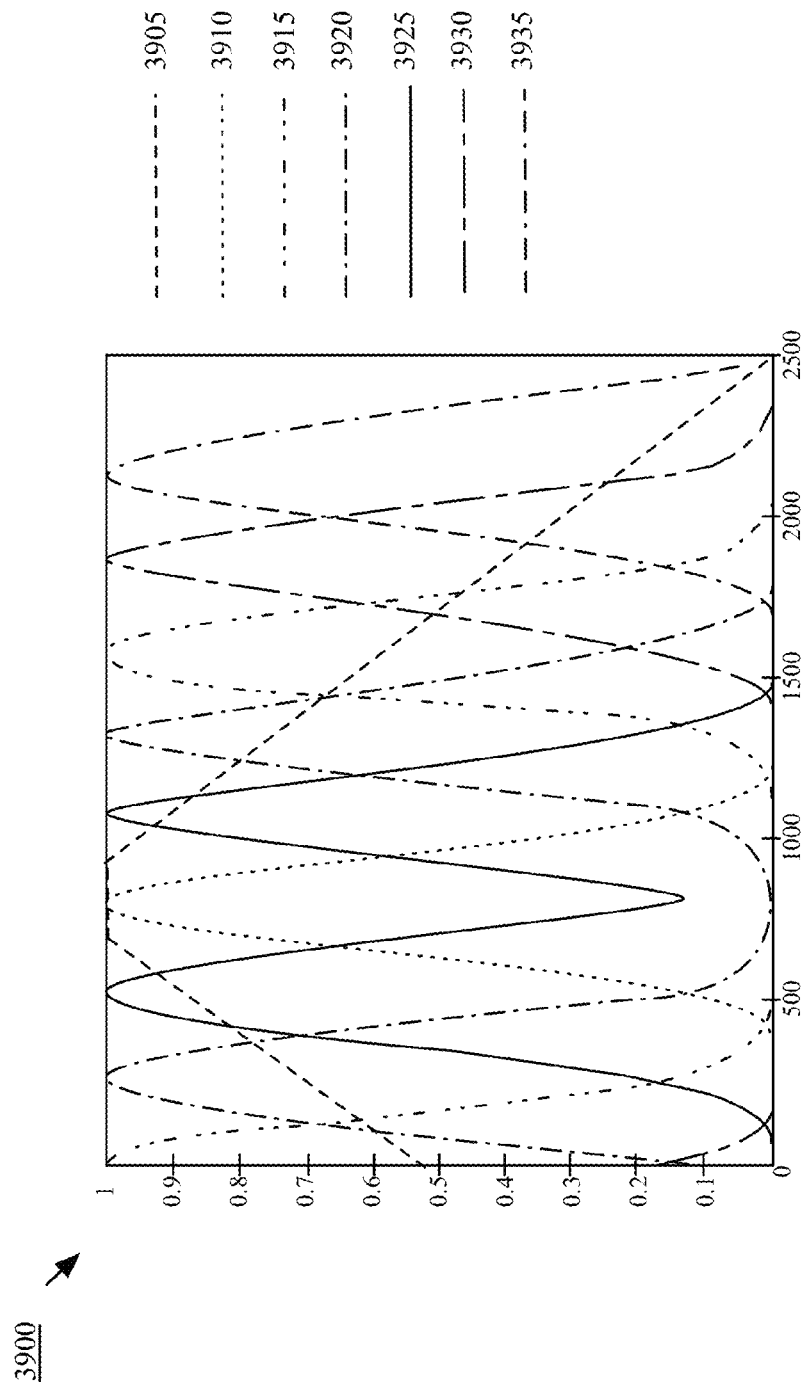
FIG. 39 illustrates a set of graphs for an original image and blurred images.

The computed distance is plotted as a curve 3905 in a graph 3900 illustrated in FIG. 39. The pixel that the user has touched is about the 800th pixel from the top row. The graph 3900 is for an original image that has a height of 2500 pixels. The vertical axis of the graph 3900 represents a normalized distance for the curve 3905 and represents a normalized weight for the curves 3910, 3915, 3920, 3925, 3930, and 3935. The horizontal axis represents the row numbers, from the top row, 0, to the bottom row, 2500. The curve 3905 looks like a pyramid with a flat top. The curve 3905 has the flat top because the fourth line of the pseudo code shown above sets any normalized distance value above 1.0 to 1.0.

The weight calculator 3810 computes a weight for each of the blurred images generated by the blurred image generator 3815 and a weight for the original image. The weight calculator in some embodiments derives the weight for each blurred image from the distance from the vertical location of the pixel that the user has touched. The weight calculator 3810 computes the weight for each blurred image using a Gaussian function of which the input is the normalized distance. The Gaussian function that the weight calculator 3810 uses is:

$$f(x) = ae^{-\frac{(x-b)^2}{2c^2}}$$

The parameter a is set to 1 in some embodiments so that the function is controlled by two parameters b and c. As known in the art, b is the position of the center of the symmetric "bell curve" or Gaussian kernel and c controls the width of the "bell." The center of the Gaussian kernel 3910, which controls the weight for the original image, is set as the vertical pixel location of the pixel that user has touched. The centers of other Gaussian kernels 3910-3935 are set sequentially such that one Gaussian kernel and the next Gaussian kernel intersect at or near their half maximum. The widths of the Gaussian kernels are controlled by the user's pinching gesture. The larger the distance between the fingers (i.e., the distance between the two parallel lines of an on-image tilt shift tool) is, the wider the Gaussian kernels' widths will be. All the Gaussian kernels have the same width. The weight calculator 3810 computes the width of the Gaussian kernels using the following pseudo code:

```
width = 0.12*FXheight/0.32;
if (width < 0.06)
    width = 0.06;
```

FXheight is the normalized distance between the two parallel lines of the on-image tilt shift tool. Width is the computed with. The weight calculator 3810 normalizes the weights to ensure that the weights add up to 1.0.

The image adder 3825 generates a tilt shift image by adding the weighted original image and the weighted blurred images. That is, the image adder 3825 adds a weighted pixel value of each pixel of the original image with the weighted pixel values of the blurred images generated by the blurred image generator 3835.

Figure 40:
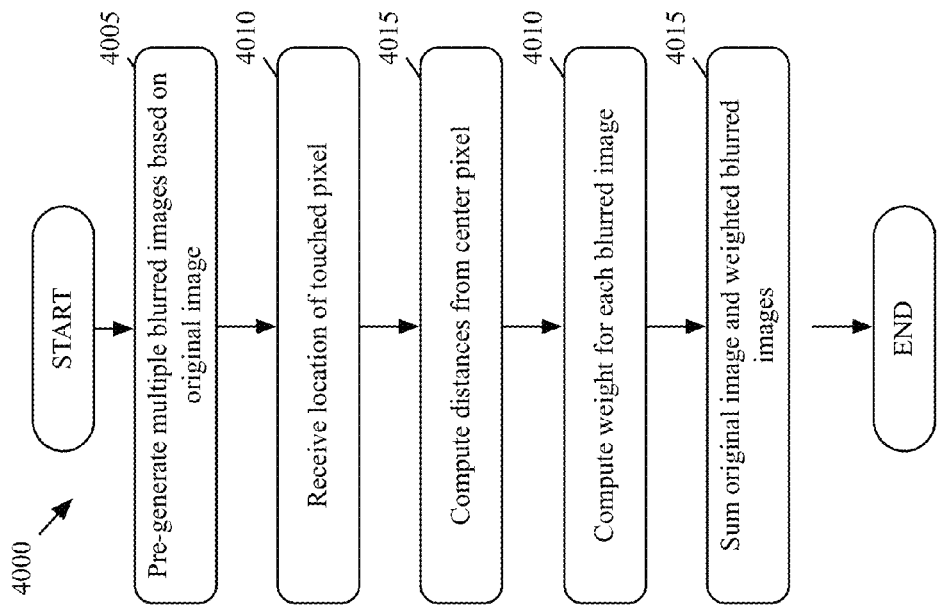
FIG. 40 conceptually illustrates a process that some embodiments perform to apply a tilt-shift effect to an image.

An example operation of the on-image tilt shift tool 3800 will now be described by reference to FIGS. 38 and 40. FIG. 40 conceptually illustrates a process 4000 that some embodiments perform to apply the tilt shift effect to an image. The process 4000 in some embodiments is performed by an on-image tilt shift tool such as the on-line shift tool 3800. The process 4000 starts when the on-image tilt shift tool is activated by the image editing application and has received an image data for a displayed image.

The process 4000 begins by pre-generating (at 4005) several blurred images based on the original image. For instance, the blurred image generator 3815 generates five blurred images. The blurred image generator 3815 generates the first blurred image using averages equal in size to 1.6 pixels. That is, the blurred image generator 3815 in some embodiments averages the pixel values of all pixels within every 1.6×1.6 pixel square of the original image. The blurred image generator 3815 generates the second blurred image using averages equal in size to 4 pixels. That is, the blurred image generator 3815 in some embodiments averages the pixel values of all pixels within every 4×4 pixel square of the original image. In a similar manner, the blurred image generator 3815 generates the third, fourth, and fifth blurred images using averages equal in size to 8, 12, and 16 pixels, respectively.

Next, the process 4000 receives (at 4010) a selection of center pixel. For instance, the distance calculator 3805 receives the location of the pixel that is touched by the user. In this example, the pixel that is touched by the user is 800th from the top of the original image, which has 2500 pixels vertically.

The process 4000 then computes (at 4015) a distance from the touched pixel for each row of pixels. In some embodiments, the process 4000 also normalizes the computed distance. For instance, the distance calculator 3805 computes the distance between the 500th row from the top of the image and the touched pixel. The distance is 1.1−(|499−799|*(1.0/max (799, 2499−799))*1.25), which is 0.879411765.

The process 4000 then computes (at 4020) a weight for each of the generated blurred images and for the original image. In some embodiments, the process 4000 also normalizes the computed weights such that all weights sums up to 1.0. For instance, the weight calculator 3810 computes the same width for all Gaussian kernels for all blurred images. In this example, the distance between the two parallel lines of the on-image tilt shift tool is 200 pixels. This distance, when normalized, is 1.1−(|200−799|*(1.0/max(799, 2499−799))*1.25), which is 0.658823529. Thus, the width is 0.12*0.658823529/0.32, which is 0.247058823, Because the width is not smaller than 0.06, the width is 0.247058823. Then, the weight for the original image is $e^{((1.0-1.0)\hat{0}2/2*(0.247058823)\hat{~}2)}$, which is 1. The weight calculator 3810 normalizes the computed weight for the original image after the weight calculator 3810 computes a weight for each blurred image.

The process 4000 then adds (at 4025) the weighted original image and weighted blurred images. That is, the process 4000 adds a weighted pixel value of a pixel in the original image and the weighted pixel values of the corresponding pixels in the blurred images.

An on-image tilt shift tool of some embodiments has been described in this sub-section. The next sub-section below describes an on-image vignette tools.

C. On-Image Vignette Tools

Figure 41:
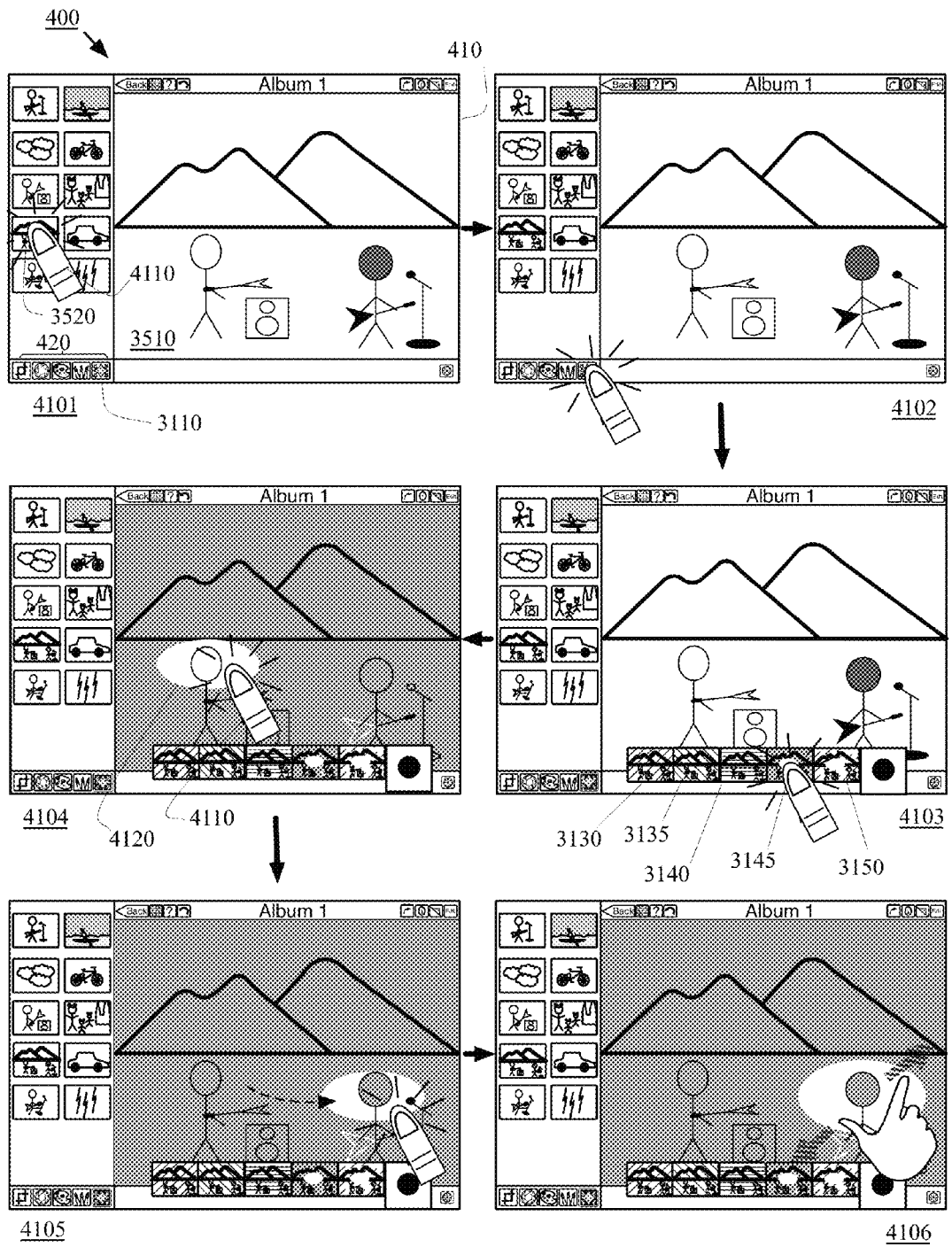
FIG. 41 conceptually illustrates the use of a vignette effect tool.

FIG. 41 conceptually illustrates use of an on-image effect tool of some embodiments that allows a user to apply a vignette effect to a selected portion of an image by touching the image. Specifically, this figure illustrates six different stages 4101-4106 that the user applies a vignette effect to the image 3710 by touching and manipulating an invisible (e.g., borderless) geometric shape. FIG. 41 illustrates the GUI 400, the thumbnail 3720, the image 3710, and the icons 3110 and 3130-2950.

As mentioned above, the image display area 410 displays an image that the user wishes to edit using the image editing application. In some embodiments, the image editing application allows the user to manipulate the application of the vignette effect to the image by moving and resizing a geometric shape. When the user touches a location of the image, the image editing application applies the vignette effect based on the touched location of the image. The image editing application in some embodiments draws an invisible geometric shape (i.e., the shape does not have a visible borderline) that encloses the touched location of the image and darkens the area of the image that is outside the geometric shape. As a result, the area of the image that is inside the geometric shape look brighter than the area of the image that is outside the geometric shape. Consequently, the geometric shape looks visible because of the difference in brightness between the area outside the geometric shape and the area inside the geometric shape. However, the geometric shape itself is still invisible in a sense that the shape does not have its own borderline.

The image editing application of some embodiments allows the user to move and resize the geometric shape (i.e., the brighter region). The user can move the geometric shape by touching the geometric shape and drag the geometric shape to other location in the displayed image. The user can enlarge the geometric shape by touching the inside of the geometric shape with multiple fingers and spreading the fingers apart. The user can contract the geometric shape by performing a pinch gesture on the geometric shape (e.g., gather the fingers touching the geometric shape closer).

In some embodiments, the geometric may be any other shapes. A non-inclusive list includes a circle, triangle, rectangle, or the like. The shape may also be an irregular shape or the shape of a familiar object such as a hand, a flower, or the like.

An example operation of the image editing application having the GUI 4100 will now be described. The first two stages 4101 and Q02 are identical to the stages 3701 and 3702, respectively. In response to the user's selection of the thumbnail 3110 at the previous stage 3702, the image editing application at stage 4103 displays the set of selectable UI items 3125 in the GUI 400 as shown. The user selects the on-image vignette tool by touching the UI item 3145. The image editing application activates the on-image vignette tool.

At stage 4104, the user has touched with a finger 4110 a location of the image near the face of the person on the left in the image. The on-image vignette tool draws a borderless ellipse 4120 enclosing the touched location of the image and darkens the area outside of the ellipse. As a result, the left person's face appears spotlighted.

At stage 4105, the user drags the finger 4110 to another location of the image, the face of the person on the right. The on-image vignette tool has the ellipse follow (or move together with) the finger 4110 to that location. Alternatively, the user may have lifted up the finger 4110 from the image and touched the location near the top of the image 3710 with a finger 4110, or the user may have dragged the finger 4110 to the location while touching the image 3710. The on-image vignette tool has applied the vignette effect by darkening area outside the ellipse as shown.

Next at stage 4106, the user has performed a spread action (e.g., spreading fingers while touching the image) on the ellipse 4120. The on-image vignette tool resizes the ellipse and applies the vignette effect based on the size of the resized ellipse.

Figure 42:
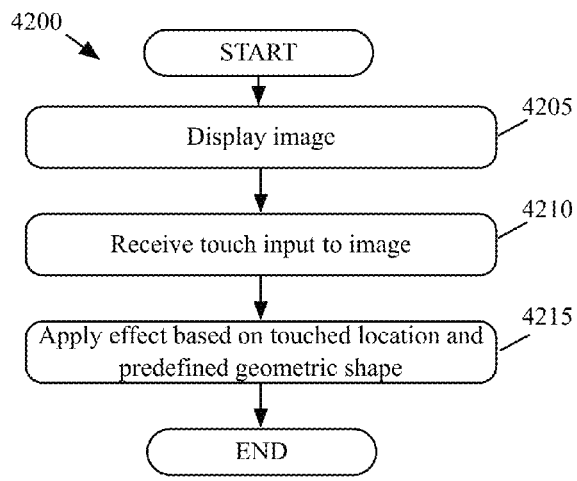
FIG. 42 conceptually illustrates a process that some embodiments perform to allow the user to apply a vignette effect to an image.

FIG. 42 conceptually illustrates a process 4200 that some embodiments perform to allow a user of an image editing application to apply a vignette effect to an image. The process 4200 in some embodiments is performed by the image editing application. The process 4200 starts when the image editing application runs on a computing device that has a touch or near touch sensitive screen to receive touch inputs (e.g., tapping, swiping, etc.) from the user. The process 4200 begins by displaying (at 4205) an image in an image display area of the image editing application.

Next, the process 4200 receives (at 4210) a touch input on a location in the displayed image. In some embodiments, the process 4200 receives a touch input on a location when the user taps on the location. The process 4200 receives a touch input when the user drags a finger from another location in the displayed image while touching the displayed image (e.g. without lifting the finger up).

The process 4200 then applies (at 4215) the vignette effect to the image. When the user taps a location in the displayed image, the process 4200 draws an invisible geometrics shape and darkens the area outside the geometric shape.

Figure 43:
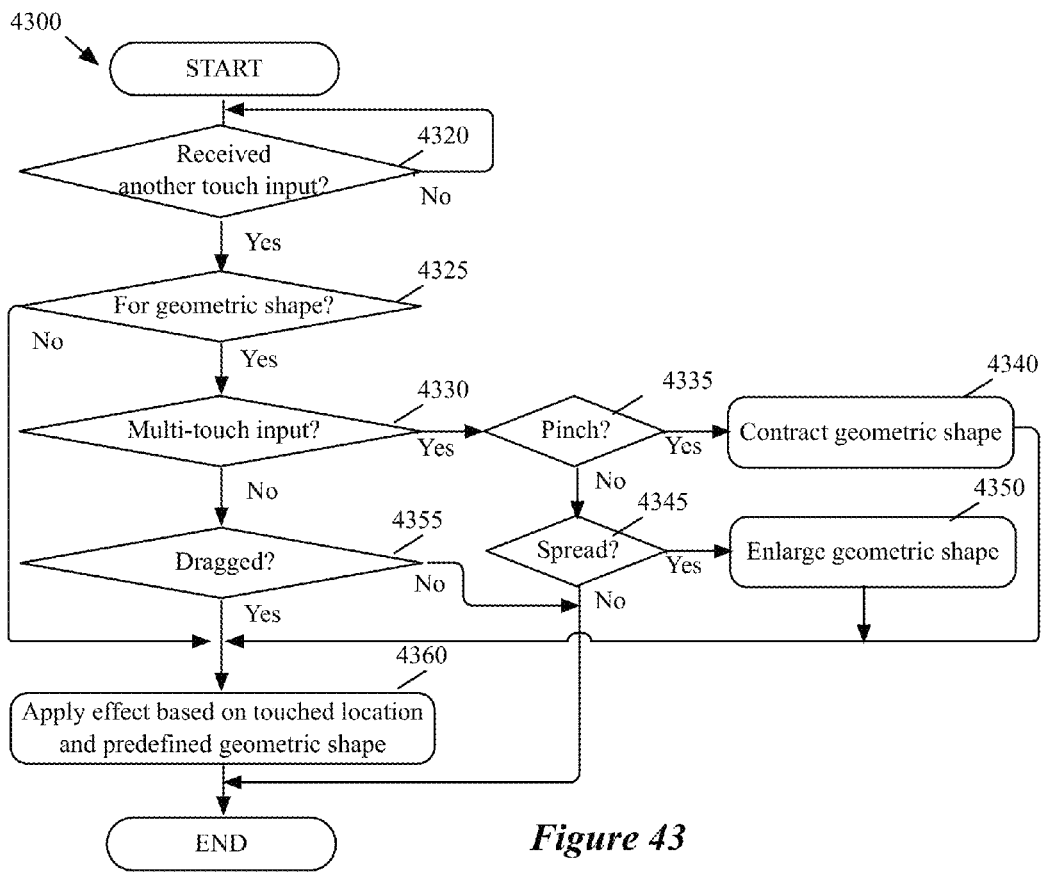
FIG. 43 conceptually illustrates a process that some embodiments perform to allow the user to apply a vignette effect to an image.

FIG. 43 conceptually illustrates a process 4300 that some embodiments perform to allow a user of an image editing application to apply a vignette to an image. The process 4300 in some embodiments is performed by an on-image vignette tool. The process 4300 starts after the on-image vignette tool has received an initial touch input and applied vignette effect based on location of the initial touch input.

The process 4300 begins by determining whether the on-image vignette tool has received another touch input. When the process 4300 determines that the on-image vignette tool has not received another touch input, the process 4300 loops back to 4320 to wait to receive another touch input.

When the process 4300 determines that the on-image vignette tool has received another touch input, the process 4300 proceeds to 4325 to determine whether the touch input is for the geometric shape. In some embodiments, the process 4300 determines the touch input is for the geometric shape when the touch input touches an area inside or near the geometric shape. When the process 4300 determines that the touch input is not for the geometric shape, the process 4300 proceeds to 4360, which will be described further below.

When the process 4300 determines (4125) that the touch input is for the geometric shape, the process determines (4130) whether the touch input is a multi-touch input. When the process 4300 determines that the touch input is not a multi-touch input, the process 4300 proceeds to 4355, which will be described further below. When the process 4300 determines (at 4330) that the touch input is a multi-touch input, the process 4300 proceeds to 4335 to determine whether the multi-touch input was a pinch action.

When the process 4300 determines (at 4335) that the multi-touch input was a pinch action, the process 4300 contracts (at 4340) the geometric shape to reduce the size of the geometric shape. When the process 4300 determines (at 4335) that the multi-touch input was not a pinch action, the process 4300 determines (at 4345) whether the multi-touch input was a spread action (or, spreading gesture). When the process 4300 determines (at 4345) that the multi-touch input was not a spread action, the process ends. Otherwise, the process 4300 enlarges the geometric shape.

When the process 4300 determines (at 4330) that the touch input is not multi-touch input, the process 4300 determines (4155) whether the touch input was dragged. When the process 4300 determines (at 4355) that the touch was not dragged, the process 4300 ends. Otherwise, the process 4300 applies an effect based on the location of the touch input and a predefined geometric shape.

Figure 44:
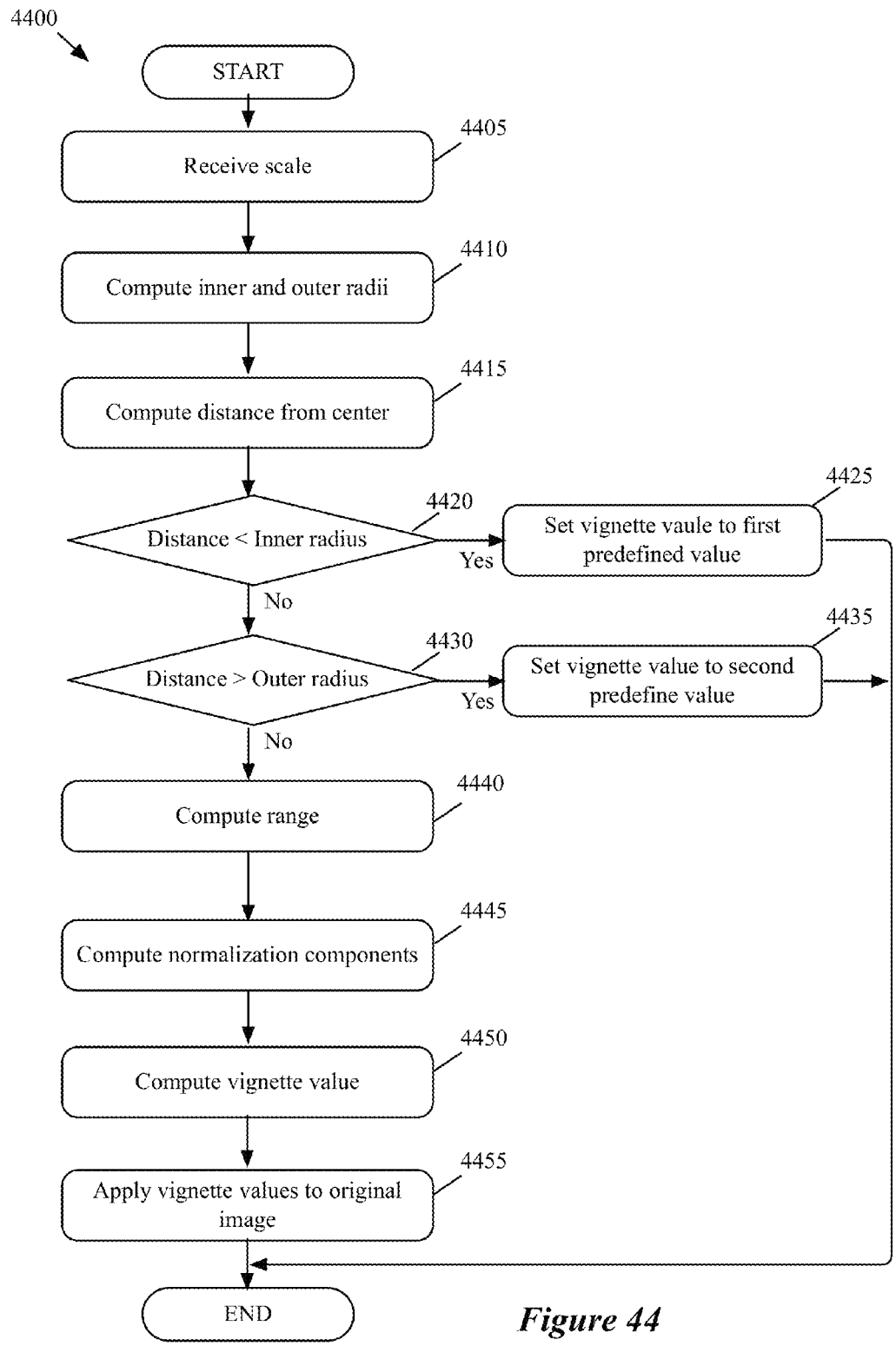
FIG. 44 conceptually illustrates a process that some embodiments perform to apply a vignette effect based on a location of the user's touch in a displayed image.

FIG. 44 conceptually illustrates a process 4400 that some embodiments perform to apply a vignette effect based on a location of the user's touch in a displayed image. The process 4400 in some embodiments is performed by the on-image vignette tool. The process 4400 starts when the on-image vignette tool has received the location of the user's touch.

The process 4400 begins by receiving (at 4405) a scale value. In some embodiments, the vignette effect is a "sigmoidal" shaped falloff based on a single "scale" value. The scale value corresponds to the size of the geometric shape (e.g., the radius of a circular shape) that the user adjusts by performing a pinching gesture or a spreading gesture when the on-image vignette tool is activated. In some embodiments, the scale value is normalized to have a range of 0 to 1.

Next, the process 4400 computes (at 4410) the inner and outer radii of the circular shape. In some embodiments, the process 4400 uses the following example pseudo code to compute the radii:

```
innerRadius = scale*(1-scale)*0.8;
outerRadius = scale + 0.5;
```

InnerRadius is the inner radius of the circular shape. OuterRadius is the outer radius of the circular shape. Scale is the received scale value.

The process 4400 next computes (at 4415) the distance between the pixel that the user has touched and each pixel in the original image. In some embodiments, the distance is calculated using a Euclidian distance metric:

$$\text{dist} = ((x - \text{center}X)2 + (y - \text{center}Y)^2)^{(1/2)};$$

Dist is the distance computed. X is the x-coordinate of the pixel and y is the y-coordinate of the pixel with the lower left corner of the image is the origin, (0, 0). In some embodiments, the process uses squared distance.

Next, the process 4400 determines (at 4420) whether the computed distance is smaller than the computed inner radius of the circular shape. If the computed distance is smaller than the computed inner radius, the process 4400 sets (at 4425) the vignette value for each pixel of the image to a first predefined value. In some embodiments, the first predefined value is 1.0. The process then proceeds to 4455, which will be described further below.

When the process 4400 determines (at 4420) that the computed distance is not smaller than the computed inner radius of the circular shape, the process 4400 determines (at 4430) whether the computed distance is larger than the computed outer radius of the circular shape. If the computed distance is larger than the computed outer radius, the process 4400 sets (at 4435) the vignette value for each pixel of the image to a second predefined value. In some embodiments, the second predefined value is 0.05. The process then proceeds to 4455, which will be described further below.

When the process 4400 determines (at 4430) that the computed distance is not larger than the computed outer radius, the process 4400 computes (at 4440) the range of the sigmoidal shape. Because the process has determined (at 4420 and 4430) that the computed distance is not smaller than the computed inner radius and is not larger than the computed outer radius, the distance between the pixel of the image that is being processed is between the two radii. The process 4400 in some embodiments uses the following example pseudo code to compute the range:

```
range=3.0+2.0*scale;
```

The process 4400 also computes (at 4445) several normalization components using the following example pseudo code:

$$\text{rangeMin} = 1 / (1 + e^{range});$$
$$\text{rangeNorm} = 1 + e^{-range} - \text{rangeMin};$$

RangeMin is the normalized minimum range. RangeNorm is the normalized range.

Next, the process 4400 computes (at 4450) the vignette value for each pixel of the image of which the distance from the touched pixel is between the computed radii. The process 4400 computes the vignette values for such pixels using the following example pseudo code:

tmp = 1 / (1 + e^{tmp});
vignette = 1 − (tmp − rangeMin)*rangeNorm*0.95;

e is the Euler's number. RangeMin and RangeNorm serve to prevent the vignette value from going above 1.0 or below 0.05.

The process 4400 then applies the vignette to the image. In some embodiments, the process applies the vignette to the image by simply multiplying each pixel value of the image by the vignette value for the pixel. However, one of ordinary skill in the art will recognize that methods other than multiplication may be employed to apply the vignette values to the pixels of the image.

IV. Alternative User Interface Layout

The GUIs of the image editing application illustrated in the figures described above are illustrated under an assumption that the device on which the image editing application runs has a screen large enough to display the GUIs. However, some of the devices on which the image editing application runs may have limited screen sizes and may be unable to display UI items the way the items are displayed in larger screens of larger devices. Also, the larger screens of the larger devices may be deemed limited when the devices are held in different orientations (e.g., portrait). In some embodiments, the image editing application displays different sets of different UI items at different instances in time to accommodate limited screen sizes.

Figure 45B:
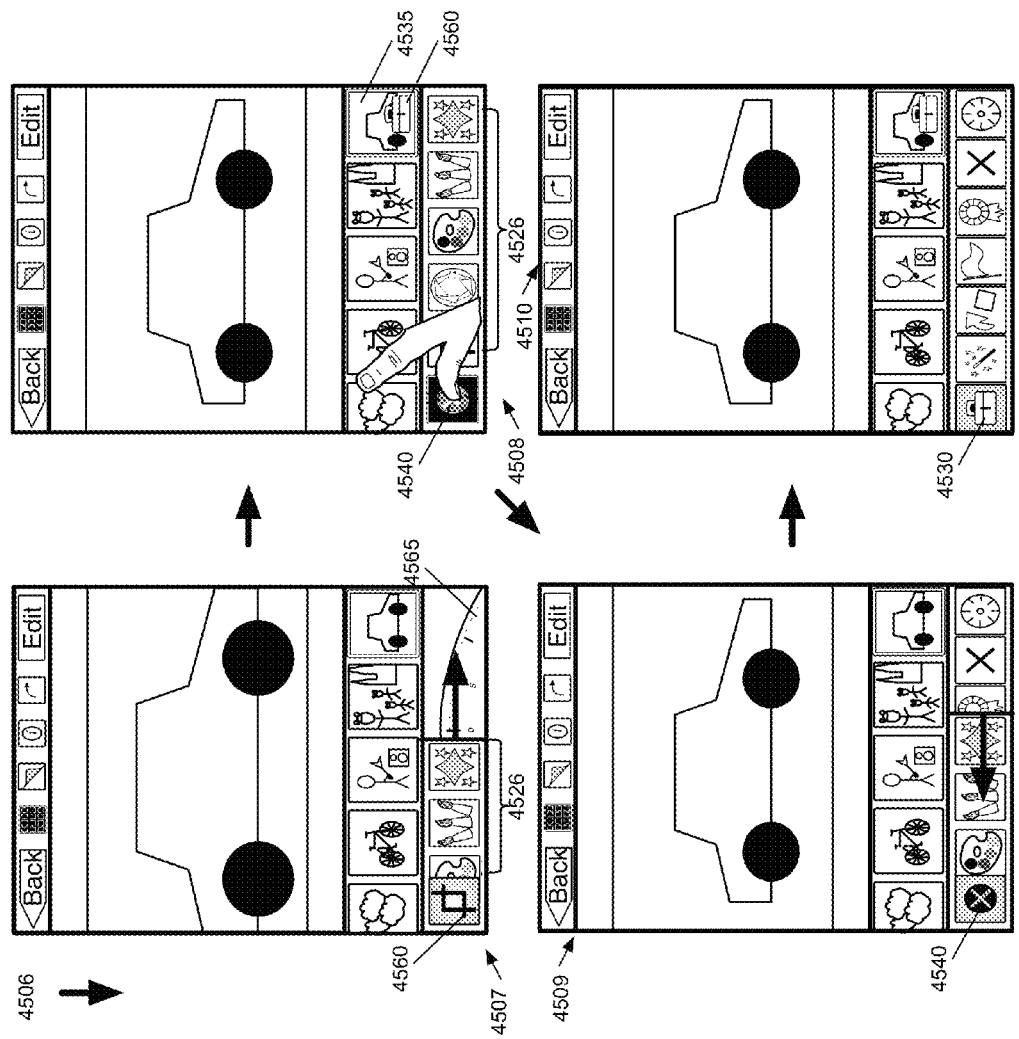

FIGS. 45a-45b conceptually illustrate a GUI 4500 of some embodiments. Specifically, these figures illustrate in ten different stages 4501-4510 that the image editing application of some embodiments displays different sets of different UI items at different instances in time. FIGS. 45a-45b illustrate that the GUI 4500 includes a control pane 4515, an image display area 4516, a collection display area 4520, and a tool navigation pane 4525.

The image display area 4516 is similar to the image display area 410 described above, in that the image display area 4516 displays an image that the user wishes to edit using the image editing application. The collection display area 4515 is similar to the collection display area 415 in that the collection display area 4515 displays a collection of thumbnails of images that are available for editing using the image editing application. In some embodiments, the image editing application allows the user to scroll up and down or sideways to display different thumbnails. Also, the image editing application provides a visual indication (e.g., highlights) on a thumbnail to show that the thumbnail has been chosen and the corresponding image is displayed in the display area. Moreover, the image editing application of some embodiments provides a visual indication (e.g., a toolbox icon) on a thumbnail to show that the corresponding image has been edited.

The tool navigation pane 4525 displays different sets of selectable or controllable UI items at different instances in time. In some embodiments, a set of user interface items that is currently displayed in the tool navigation pane 4525 depends on the user's interaction with the set of UI items that was previously displayed in the tool navigation pane 4525. For instance, when the user touches a particular UI item that represents a set of editing tools, a set of UI items for the set of editing tools related to that particular UI item replaces the set of UI items that includes the particular UI item in the tool navigation pane 4525.

The image editing application may replace a first set of UI items displayed in the tool navigation pane 4525 with a second set of UI items in a number of different ways. For instance, the image editing application overlays the first set with the second set as the second set is sliding in. The image editing application may slide out the first set while sliding in the second set. Moreover, the direction of sliding by the first and second sets may be any direction—up, down, left, right, diagonal, etc.

An example operation of the GUI 4500 will now be described. At stage 4501, the image editing application displays an image 4517 in the image display area 4516. The image 4517 corresponds to a thumbnail 4535 displayed in the collection display area 4520. That is, the image editing application displays the image 4517 in the image display area 4516 in response to the user's selection (e.g., by touching) the thumbnail 4535. At this stage, the user selects a UI item 4530, which in this example is an icon showing a toolbox. The UI item 4530 represents a set of editing tools that the image editing application provides.

The next stage 4502 illustrates that a first set of UI items 4524 that was displayed in the tool navigation pane 4525 is being replaced by a second set of UI items 4526. In this example, the stage 4502 shows that the first set of UI items is being overlaid with the second set of UI items while the second set of UI items 4526 is sliding to the right and into the tool navigation pane 4525. However, in some embodiments, the UI item 4530 of the first set of UI items stays in place while the second set of UI items 4526 is sliding in under the UI item 4530 over the rest of the first set of UI items as shown.

At stage 4503, the image editing application displays the second set of UI items 4526 in the tool navigation pane 4525. As shown, the second set of UI items 4526 in this example includes five UI items, including UI items 4545, 4550, and 4555. The UI item 4540, which does not belong to the second set of UI items, has replaced the UI item 4530. The UI item 4540 is for replacing the second set of UI items with another set of UI items in the tool navigation pane 4525. The UI item 4540 is also for the user to touch to indicate that the user does not wish to use the editing tools represented by the second set of UI items. The UI item 4545 represents the on-image cropping and straightening tool. The UI item 4550 represents the on-image brush tools. The UI item 4555 represents the on-image effect tools. At this stage, the user touches the UI item 4545 to select the on-image cropping and straightening tool.

At stage 4504, the image editing application is revealing a third set of UI items in response to the user's selection of the UI item 4545 at the previous stage 4503. In some embodiments, the image editing application slides out the second set of UI items to reveal the third set of UI items. The third set of UI items, which is not fully shown at stage 4504, represents the cropping and straightening tool. In some embodiments, the image editing application slides out the second set of UI items to the left under the UI item 4540 as shown.

The next stage 4505 illustrates the GUI 4500 after the image editing application has replaced the second set of UI items and the UI item 4540 with the third set of UI items. The third set of UI items represent the cropping and straightening tool and includes UI items 4560 and 4565. The UI item 4550 indicates that it is the cropping and straightening tool that is currently being shown and activated in the tool navigation pane 4525. The UI item 4560 is also for replacing the third set of UI items with another set of UI items in the tool navigation pane 4525. The UI item 4560 is also for the user to touch to indicate that the user does not wish to use or is done with using the cropping and straightening tool. The UI item 4565 is similar to the dial 455 described above. Also at the stage 4505, the user has performed a spreading gesture on the displayed image 4517 to crop the image.

The next stage 4506 illustrates the GUI 4500 after the cropping and straightening tool has zoomed in the image 4517 and cropped out the portions of the image that were not displayable in the image display area 4516. The user also touches the UI item 4560 to exit from the cropping and straightening tool.

At stage 4507, the image editing application is sliding in the second set of UI items in response to the user's selection of the UI item 4560 at the previous stage 4506. As shown, the image editing application slides in the second set of UI items 4526 to the left over the UI item 4565 but under the UI item 4560 in some embodiments.

The next stage 4508 illustrates the GUI 4500 after the image editing application has replaced the third set of UI items with the second set of UI items. The UI item 4560 of the third set of UI items has been replaced by the UI item 4540 as shown. The image editing application has also overlaid a visual indication 4560 on the thumbnail 4535. The visual indication 4560 indicates that the image represented by the thumbnail 4535 has been edited. At stage 4508, the user selects the UI item 4540 to exit from the second set of UI items 4526.

At stage 4509, the image editing application is sliding out the second set of UI items to the left and under the UI item 4540 in order to reveal the first set of UI items in response to the user's selection of the UI item 4540 at the previous stage 4506. The next stage 4510 illustrates the GUI 4500 after the image editing application has replaced the second set of UI items with the first set of UI items. The UI item 4530 has replaced the UI item 4540 as shown.

V. Software Architecture

Figure 46:
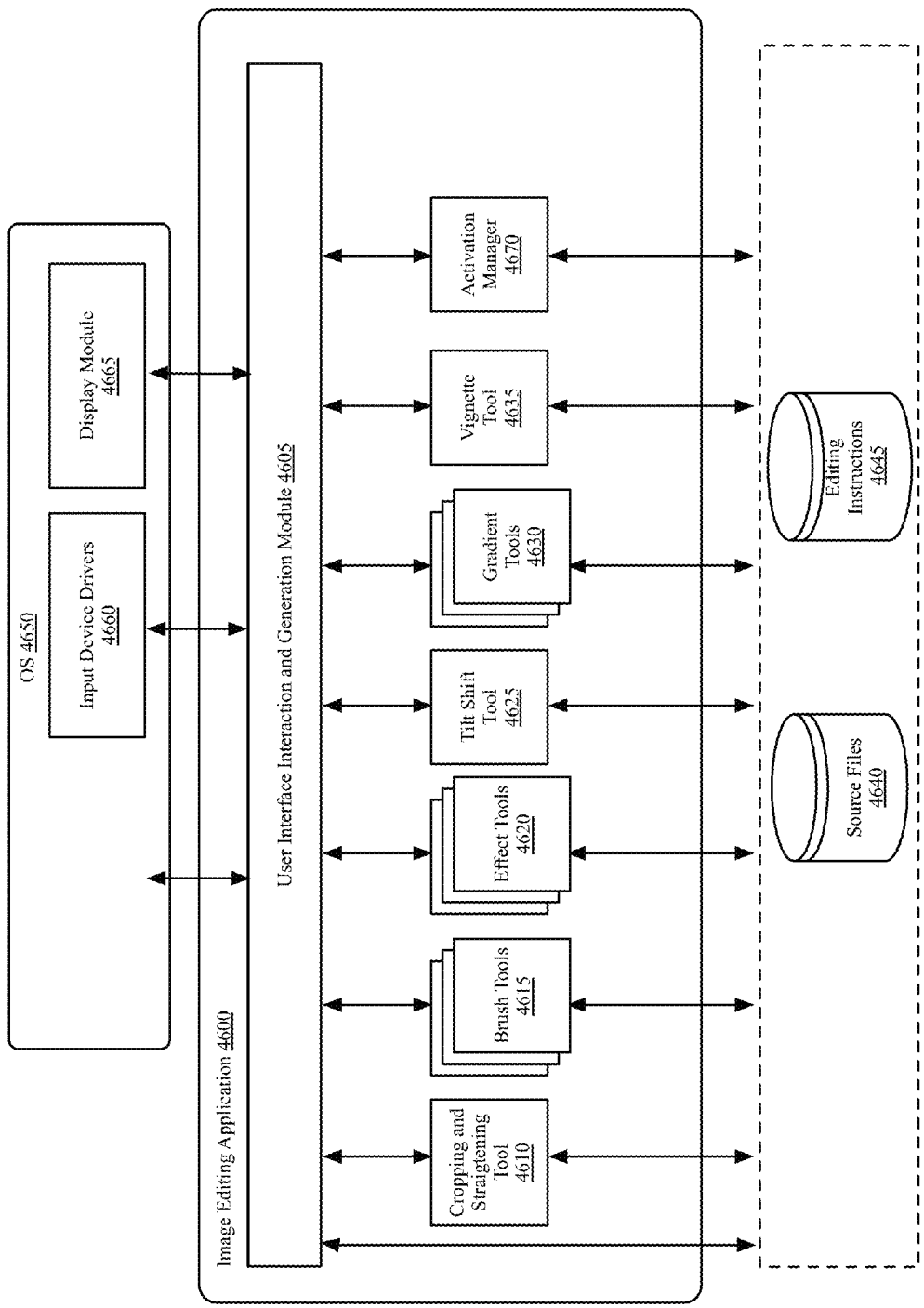
FIG. 46 conceptually illustrates the software architecture of an image viewing, editing, and organization application of some embodiments.

In some embodiments, the processes described above by reference to FIGS. 5, 8, 11, 15, 17, 21, 25, 28, 30, 32, 34, 36, 40, 42, 43, and 44 are implemented as software running on a particular machine, such as a computer or a handheld device, or stored in a computer readable medium. FIG. 46 conceptually illustrates the software architecture of an image editing application 4600 of some embodiments. In some embodiments, the image editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The image editing application 4600 includes a user interface (UI) interaction module 4605, a cropping and straightening tool 4610, brush tools 4615, effect tools 4620, a tilt shift tool 4625, a gradient tool 4630, a vignette tool 4635, and an activation manger 4670. The image editing application also uses source files 4640 and editing instructions 4645. In some embodiments, the source files 4640 stores the media content (e.g. text, audio, image, and video content). The editing instructions 4645 store the image editing operations that the image editing application 4600 performed as a set of instructions. The image editing application 4600 uses these set of instructions to generate new images based on the original data stored in the source files. In some embodiments, the media content data are stored as .mov, .avi, .jpg, .png, gif, pdf, .mp3, .wav, .txt, etc. files in the source files 4640. In some embodiments, storages 4640 and 4645 are all stored in one physical storage. In other embodiments, the storages are in separate physical storages, or one of the storages is in one physical storage while the other is in a different physical storage. For instance, the other project data and the source files will often be separated.

FIG. 46 also illustrates an operating system 4650 that includes input device driver(s) 4660 and a display module 4665. In some embodiments, as illustrated, the device drivers 4655 and 4660 and display module 4665 are part of the operating system 4655 even when the image editing application is an application separate from the operating system.

The input device drivers 4660 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction module 4605.

The present application describes a graphical user interface that provides users with numerous ways to perform different sets of operations and functionalities. In some embodiments, these operations and functionalities are performed based on different commands that are received from users through different input devices (e.g., keyboard, track pad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch-screen device. In some embodiments, with touch control, a user can directly manipulate objects by interacting with the graphical user interface that is overlaid on the display of the touch-screen device. For instance, a user can select a particular object in the graphical user interface by simply touching that particular object on the display of the touch-screen device. As such, when touch control is utilized, a cursor may not even be provided for enabling selection of an object of a graphical user interface in some embodiments. However, when a cursor is provided in a graphical user interface, touch control can be used to control the cursor in some embodiments.

Moreover, the present application describes the use of hotkeys to invoke various commands (e.g., editing commands such as trimming, extending edit points, splitting, marking regions of interest, etc.) to edit a media clip or a sequence of media clips in some embodiments. In some embodiments, the hotkeys are tangible keys in a typical keyboard (e.g., keyboard for a desktop computer, keypad for a smartphone, etc.). However, in other embodiments, hotkeys are provided through a touch control. A hotkey in some such embodiments is a key in a graphical keyboard rendered on a touch-screen device, any user interface item that is selectable or clickable, or any other touch-screen methods.

The display module 4665 translates the output of a user interface for a display device. That is, the display module 4665 receives signals (e.g., from the UI interaction module 4605) describing what should be displayed and translates these signals into pixel information that is sent to the display device. The display device may be an LCD, plasma screen, CRT monitor, touch screen, etc.

The UI interaction module 4605 of image editing application 4600 interprets the user input data received from the input device drivers and passes it to various modules, including the cropping and straightening tool 4610, the brush tools 4615, the effect tools 4620, the tilt shift tool 4625, the gradient tool 4630, and the vignette tool 4635. The UI interaction module also manages the display of the UI, and outputs this display information to the display module 4665.

The activation manger 4670 manages the activation and deactivation of the editing tools. The activation manger 4670 interprets user inputs to the UI items for activating and deactivating the editing tools and activates and deactivates the editing tools so that the user inputs to the images are handled by the appropriate editing tool(s).

The cropping and straightening tool 4610 are similar to the cropping and straightening tool described above in that the tool 4610 performs cropping, straightening, and zooming operations. The brush tools 4615 include the blemish removal tool, the red eye removal tool, the saturation tool, the desaturation tool, the lightening tool, the darkening tool, the sharpening tool, the softening tool, and the smart edge detection tool discussed above. The effect tools 4620 include tools for applying effects to the displayed image. The tilt shift tool 4625 is similar to the tilt shift tool discussed above. The gradient tools 4630 in some embodiments include the dark gradient tool, the warm gradient tool, the cool gradient tool, the blue gradient tool, and the coffee gradient tool that are discussed above. The vignette tool 4635 is similar to the vignette tool discussed above.

While many of the features have been described as being performed by one module (e.g., gradient tools 4630), one of ordinary skill would recognize that the functions might be split up into multiple modules, and the performance of one feature might even require multiple modules.

VI. Image Viewing, Editing, and Organization Application

Figure 47:
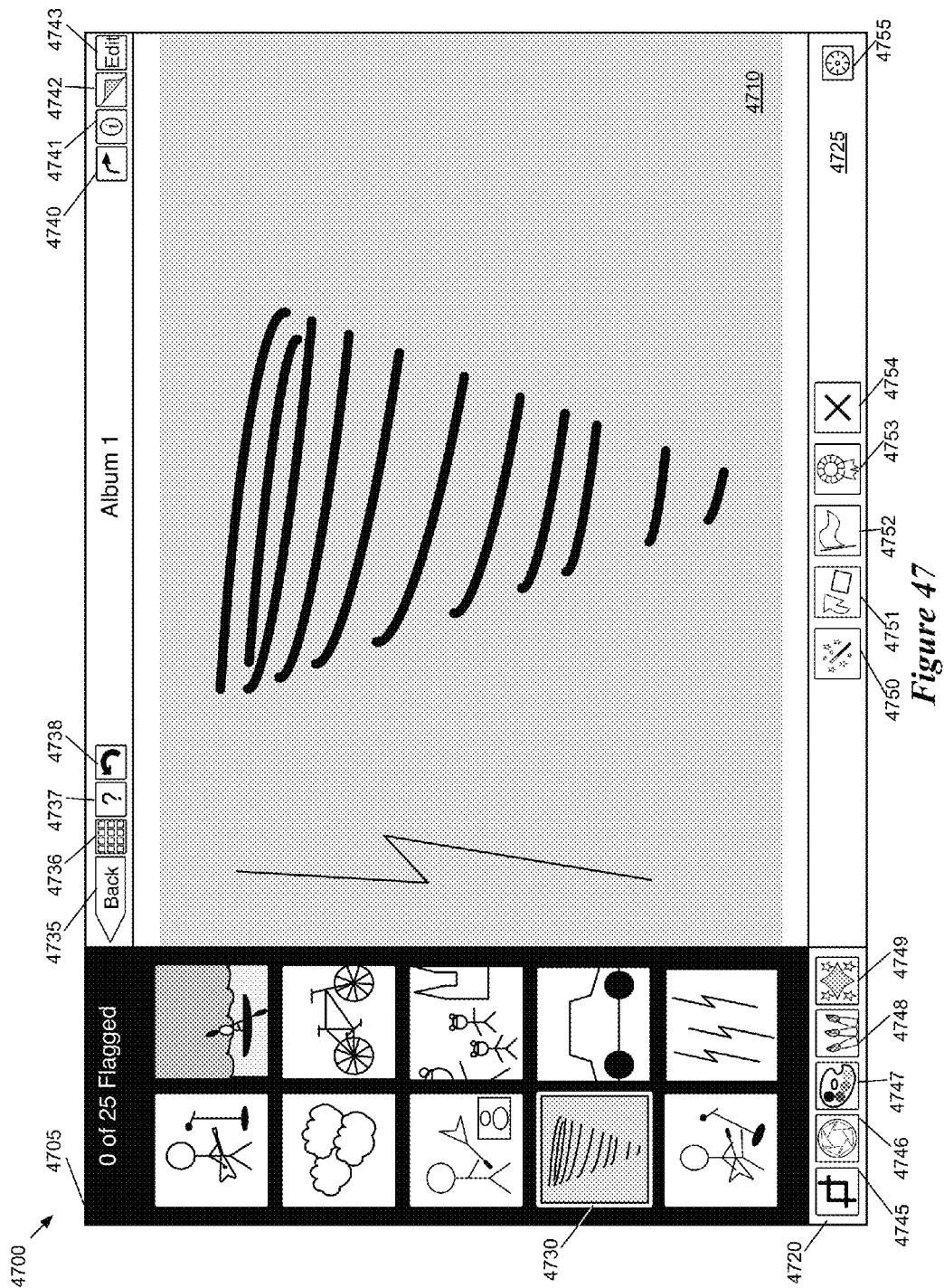
FIG. 47 illustrates an example GUI of an image editing application of some embodiments.
Figure 48:
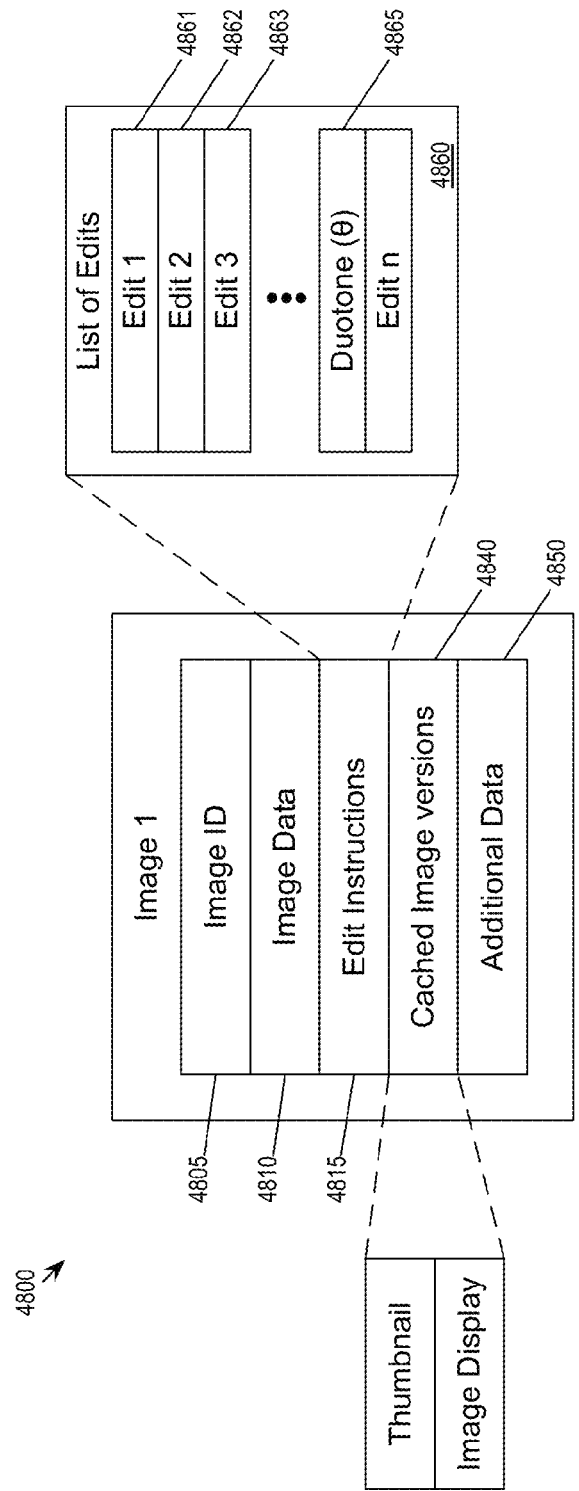
FIG. 48 conceptually illustrates an image data structure of some embodiments.

The above-described figures illustrated various examples of the GUI of an image viewing, editing, and organization application of some embodiments. FIG. 47 illustrates a detailed view of a GUI 4700 of some embodiments for viewing, editing, and organizing images. The GUI 4700 will be described in part by reference to FIG. 48, which conceptually illustrates a data structure 4800 for an image as stored by the application of some embodiments. The data structure 4800 includes an image ID 4805, image data 4810, edit instructions 4815, cached versions 4840 of the image, and any additional data 4850 for the image. The image ID 4805 is a unique identifier for the image, which in some embodiments is used by the collection data structures to refer to the images stored in the collection. The image data 4810 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 4815 include information regarding any edits the user has applied to the image. In this manner, the application stores the image in a non-destructive format, such that the application can easily revert from an edited version of the image to the original at any time. For instance, the user can apply a saturation effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

In some embodiments, the edit instructions 4815 are implemented as a list 4860 of edit operations. The list 4860 includes edit operations such as edits 4861, 4862, 4863, and 4865. Each edit operation in the list 4860 specifies the necessary parameters for carrying out the edit operation. For example, the edit operation 4865 in the list 4860 specifies an edit to the image that applies a saturation effect with color selection parameter θ.

In some embodiments, the list 4860 records the sequence of edit operations undertaken by the user in order to create the final edited image. In some embodiments, the list 4860 stores the edit instructions in the order that the image editing application applies the edits to the image in order to generate an output image for display, as some embodiments define a particular order for the different possible edits provided by the application. For example, some embodiments define saturation effect as one of the edit operations that are to be applied later than other edit operations such as crop and rotation, full-image exposure, and color adjustment. The list 4860 of some of these embodiments would store the edit instruction for the saturation effect in a position (i.e., edit 4865) that would be applied later than some of the other edit operations (e.g., edits 4861-1363).

The cached image versions 4840 store versions of the image that are commonly accessed and displayed, so that the application does not need to repeatedly generate these images from the full-size image data 4810. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image.

Finally, the image data structure 4800 includes additional data 4850 that the application might store with an image (e.g., locations and sizes of faces, etc.). In some embodiments, the additional data can include Exchangeable image file format (Exif) data, caption data, shared image data, tags on the image or any other types of data. Exif data includes various information stored by the camera that are captured the image such as camera settings, GPS data, timestamps, etc. Caption is a user-entered description of the image. Tags are information that the application enables the user to associate with an image such as marking the image as a favorite, flagged, hidden, etc.

One of ordinary skill in the art will recognize that the image data structure 4800 is only one possible data structure that the application might use to store the required information for an image. For example, different embodiments might store additional or less information, store the information in a different order, etc.

Returning to FIG. 47, the GUI 4700 includes a thumbnail display area 4705, an image display area 4710, a first toolbar 4715, a second toolbar 4720, and a third toolbar 4725. The thumbnail display area 4705 displays thumbnails of the images in a selected collection. Thumbnails are small representations of a full-size image, and represent only a portion of an image in some embodiments. For example, the thumbnails in thumbnail display area 4705 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 4700×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600× 1200 image were all located on the left side of the image, the application would use the leftmost 4700 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 4840 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above, or through other user input interactions). The selected thumbnails are displayed with a highlight or other indicator of selection. In thumbnail display area 4705, the thumbnail 4730 is selected. In addition, as shown, the thumbnail display area 4705 of some embodiments indicates a number of images in the collection that have been flagged (e.g., having a tag for the flag set to yes). In some embodiments, this text is selectable in order to display only the thumbnails of the flagged images.

The application displays selected images in the image display area 4710 at a larger resolution than the corresponding thumbnails. The images are not typically displayed at the full size of the image, as images often have a higher resolution than the display device. As such, the application of some embodiments stores a cached version 4840 of the image designed to fit into the image display area. Images in the image display area 4710 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 4715 displays title information (e.g., the name of the collection shown in the GUI, a caption that a user has added to the currently selected image, etc.). In addition, the toolbar 4715 includes a first set of GUI items 4735-1238 and a second set of GUI items 4740-1243.

The first set of GUI items includes a back button 4735, a grid button 4736, a help button 4737, and an undo button 4738. The back button 4735 enables the user to navigate back to a collection organization GUI, from which users can select between different collections of images (e.g., albums, events, journals, etc.). Selection of the grid button 4736 causes the application to move the thumbnail display area on or off of the GUI (e.g., via a slide animation). In some embodiments, users can also slide the thumbnail display area on or off of the GUI via a swipe gesture. The help button 4737 activates a context-sensitive help feature that identifies a current set of tools active for the user and provides help indicators for those tools that succinctly describe the tools to the user. In some embodiments, the help indicators are selectable to access additional information about the tools. Selection of the undo button 4738 causes the application to remove the most recent edit to the image, whether this edit is a crop, color adjustment, etc. In order to perform this undo, some embodiments remove the most recent instruction from the set of edit instructions 4815 stored with the image.

The second set of GUI items includes a sharing button 4740, an information button 4741, a show original button 4742, and an edit button 4743. The sharing button 4740 enables a user to share an image in a variety of different ways. In some embodiments, the user can send a selected image to another compatible device on the same network (e.g., WiFi or Bluetooth network), upload an image to an image hosting or social media website, and create a journal (i.e., a presentation of arranged images to which additional content can be added) from a set of selected images, among others.

The information button 4741 activates a display area that displays additional information about one or more selected images. The information displayed in the activated display area may include some or all of the Exif data stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data and sends this information to the website. The comment stream and, in some cases, additional information, are received from the website and displayed to the user.

The show original button 4742 enables the user to toggle between the original version of an image and the current edited version of the image. When a user selects the button, the application displays the original version of the image without any of the editing instructions 4815 applied. In some embodiments, the appropriate size image is stored as one of the cached versions 4840 of the image, making it quickly accessible. When the user selects the button again 4742 again, the application displays the edited version of the image, with the editing instructions 4815 applied.

The edit button 4743 allows the user to enter or exit edit mode. When a user has selected one of the sets of editing tools in the toolbar 4720, the edit button 4743 returns the user to the viewing and organization mode, as shown in FIG. 47. When the user selects the edit button 4743 while in the viewing mode, the application returns to the last used set of editing tools in the order shown in toolbar 4720. That is, the items in the toolbar 4720 are arranged in a particular order, and the edit button 4743 activates the rightmost of those items for which edits have been made to the selected image.

The toolbar 4720, as mentioned, includes five items 4745-1249, arranged in a particular order from left to right. The crop item 4745 activates a cropping and rotation tool that allows the user to align crooked images and remove unwanted portions of an image. The exposure item 4746 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 4747 activates a set of color tools that enable the user to modify the saturation and vibrancy, as well as color-specific saturations (e.g., blue pixels or green pixels) and white balance. In some embodiments, some of these tools are presented as a set of sliders. The brushes item 4748 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 4749 activates a set of special effects that the user can apply to the image. These effects include duotone effect, grainy effect, gradients, tilt shifts, non-photorealistic desaturation effects, grayscale effects, various filters, etc. In some embodiments, the application presents these effects as a set of items that fan out from the toolbar 4725.

As stated, the UI items 4745-1249 are arranged in a particular order. This order follows the order in which users most commonly apply the five different types of edits. Accordingly, the editing instructions 4815 are stored in this same order, in some embodiments. When a user selects one of the items 4745-1249, some embodiments apply only the edits from the tools to the left of the selected tool to the displayed image (though other edits remain stored within the instruction set 4815).

The toolbar 4725 includes a set of GUI items 4750-1254 as well as a settings item 4755. The auto-enhance item 4750 automatically performs enhancement edits to an image (e.g., removing apparent red-eye, balancing color, etc.). The rotation button 4751 rotates any selected images. In some embodiments, each time the rotation button is pressed, the image rotates 90 degrees in a particular direction. The auto-enhancement, in some embodiments, comprises a predetermined set of edit instructions that are placed in the instruction set 4815. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

The flag button 4752 tags any selected image as flagged. In some embodiments, the flagged images of a collection can be displayed without any of the unflagged images. The favorites button 4753 allows a user to mark any selected images as favorites. In some embodiments, this tags the image as a favorite and also adds the image to a collection of favorite images. The hide button 4754 enables a user to tag an image as hidden. In some embodiments, a hidden image will not be displayed in the thumbnail display area and/or will not be displayed when a user cycles through the images of a collection in the image display area. As discussed above by reference to FIG. 48, many of these features are stored as tags in the image data structure.

Finally, the settings button 4755 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the image viewing and editing GUI 4700 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

VII. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 49:
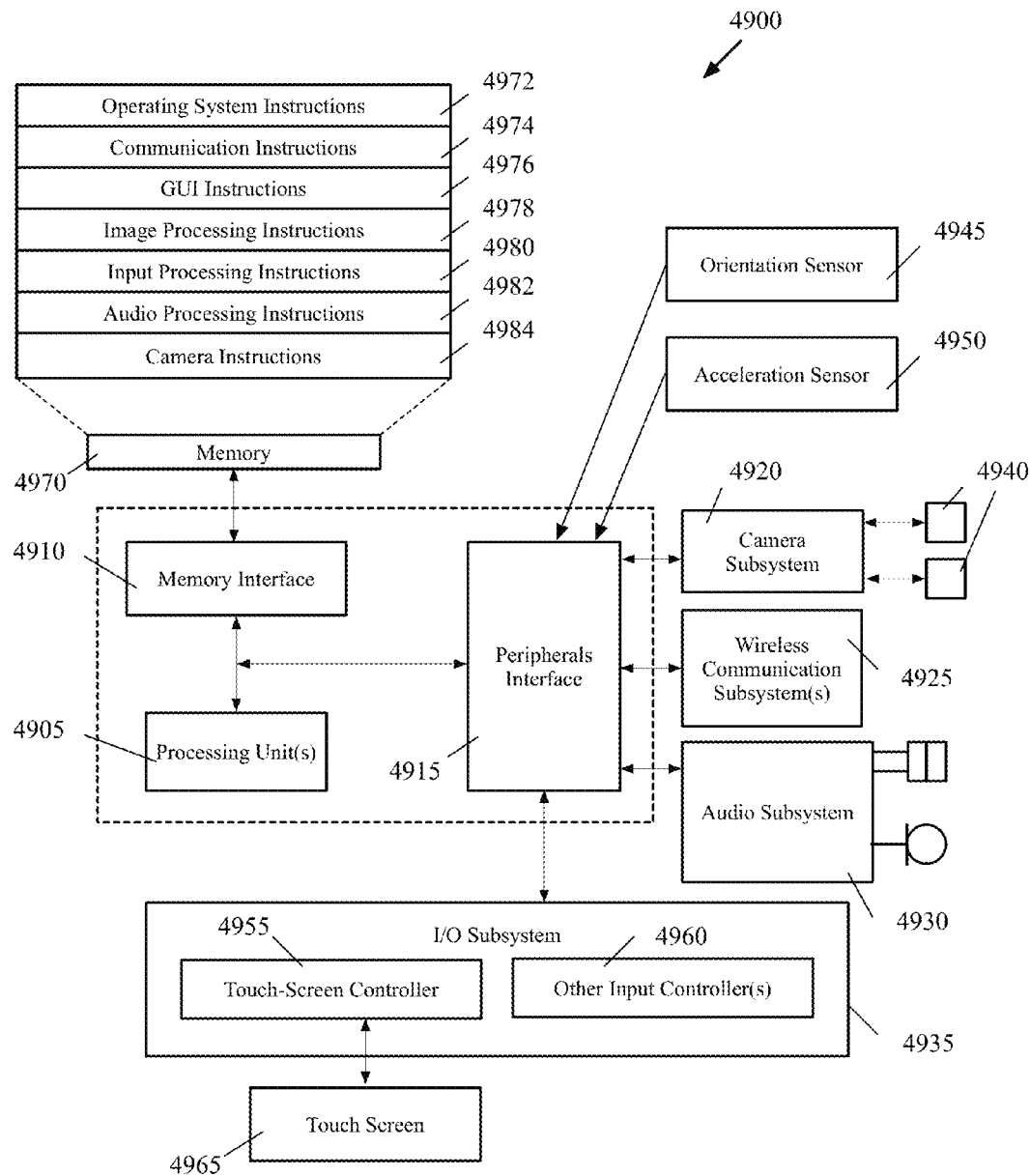
FIG. 49 is an example architecture of a mobile computing device on which some embodiments are implemented.

The image editing and viewing applications of some embodiments operate on mobile devices. FIG. 49 is an example of an architecture 4900 of such a mobile computing device. Examples of mobile computing devices include smartphones, tablets, laptops, etc. As shown, the mobile computing device 4900 includes one or more processing units 4905, a memory interface 4910 and a peripherals interface 4915.

The peripherals interface 4915 is coupled to various sensors and subsystems, including a camera subsystem 4920, a wireless communication subsystem(s) 4925, an audio subsystem 4930, an I/O subsystem 4935, etc. The peripherals interface 4915 enables communication between the processing units 4905 and various peripherals. For example, an orientation sensor 4945 (e.g., a gyroscope) and an acceleration sensor 4950 (e.g., an accelerometer) is coupled to the peripherals interface 4915 to facilitate orientation and acceleration functions.

The camera subsystem 4920 is coupled to one or more optical sensors 4940 (e.g., a charged coupled device (CCD) optical sensor, a complementary metal-oxide-semiconductor (CMOS) optical sensor, etc.). The camera subsystem 4920 coupled with the optical sensors 4940 facilitates camera functions, such as image and/or video data capturing. The wireless communication subsystem 4925 serves to facilitate communication functions. In some embodiments, the wireless communication subsystem 4925 includes radio frequency receivers and transmitters, and optical receivers and transmitters (not shown in FIG. 49). These receivers and transmitters of some embodiments are implemented to operate over one or more communication networks such as a GSM network, a Wi-Fi network, a Bluetooth network, etc. The audio subsystem 4930 is coupled to a speaker to output audio (e.g., to output different sound effects associated with different image operations). Additionally, the audio subsystem 4930 is coupled to a microphone to facilitate voice-enabled functions, such as voice recognition, digital recording, etc.

The I/O subsystem 4935 involves the transfer between input/output peripheral devices, such as a display, a touch screen, etc., and the data bus of the processing units 4905 through the peripherals interface 4915. The I/O subsystem 4935 includes a touch-screen controller 4955 and other input controllers 4960 to facilitate the transfer between input/output peripheral devices and the data bus of the processing units 4905. As shown, the touch-screen controller 4955 is coupled to a touch screen 4965. The touch-screen controller 4955 detects contact and movement on the touch screen 4965 using any of multiple touch sensitivity technologies. The other input controllers 4960 are coupled to other input/control devices, such as one or more buttons. Some embodiments include a near-touch sensitive screen and a corresponding controller that can detect near-touch interactions instead of or in addition to touch interactions.

The memory interface 4910 is coupled to memory 4970. In some embodiments, the memory 4970 includes volatile memory (e.g., high-speed random access memory), non-volatile memory (e.g., flash memory), a combination of volatile and non-volatile memory, and/or any other type of memory. As illustrated in FIG. 49, the memory 4970 stores an operating system (OS) 4972. The OS 4972 includes instructions for handling basic system services and for performing hardware dependent tasks.

The memory 4970 also includes communication instructions 4974 to facilitate communicating with one or more additional devices; graphical user interface instructions 4976 to facilitate graphic user interface processing; image processing instructions 4978 to facilitate image-related processing and functions; input processing instructions 4980 to facilitate input-related (e.g., touch input) processes and functions; audio processing instructions 4982 to facilitate audio-related processes and functions; and camera instructions 4984 to facilitate camera-related processes and functions. The instructions described above are merely exemplary and the memory 4970 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 49 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 49 may be split into two or more integrated circuits.

B. Computer System

Figure 50:
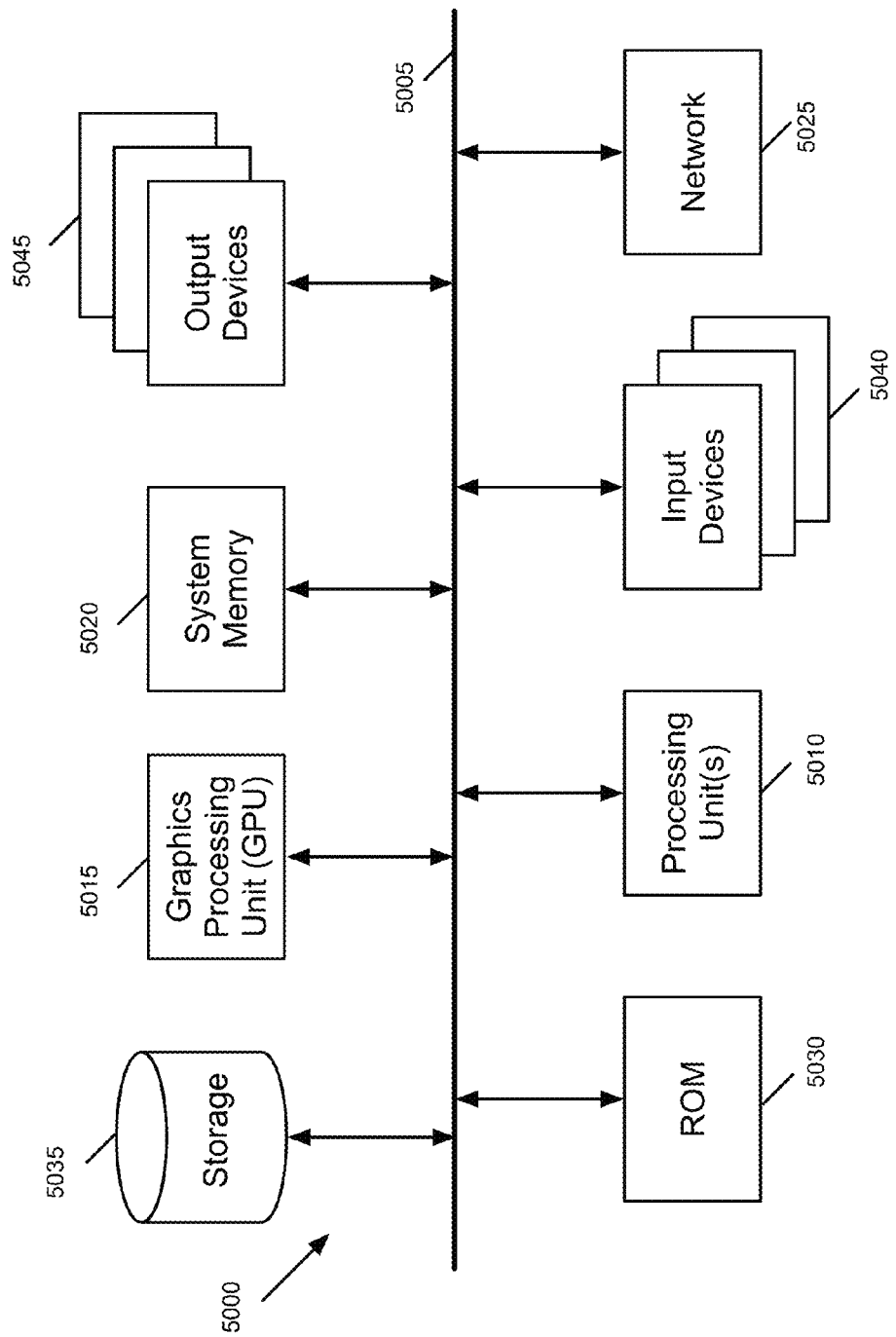
FIG. 50 conceptually illustrates an electronic system with which some embodiments are implemented.

FIG. 50 conceptually illustrates another example of an electronic system 5000 with which some embodiments of the invention are implemented. The electronic system 5000 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 5000 includes a bus 5005, processing unit(s) 5010, a graphics processing unit (GPU) 5015, a system memory 5020, a network 5025, a read-only memory 5030, a permanent storage device 5035, input devices 5040, and output devices 5045.

The bus 5005 collectively represents all system, peripheral, and chipset buses that communicatively connect the numerous internal devices of the electronic system 5000. For instance, the bus 5005 communicatively connects the processing unit(s) 5010 with the read-only memory 5030, the GPU 5015, the system memory 5020, and the permanent storage device 5035.

From these various memory units, the processing unit(s) 5010 retrieves instructions to execute and data to process in order to execute the processes of the invention. The processing unit(s) may be a single processor or a multi-core processor in different embodiments. Some instructions are passed to and executed by the GPU 5015. The GPU 5015 can offload various computations or complement the image processing provided by the processing unit(s) 5010. In some embodiments, such functionality can be provided using CoreImage's kernel shading language.

The read-only-memory (ROM) 5030 stores static data and instructions that are needed by the processing unit(s) 5010 and other modules of the electronic system. The permanent storage device 5035, on the other hand, is a read-and-write memory device. This device is a non-volatile memory unit that stores instructions and data even when the electronic system 5000 is off. Some embodiments of the invention use a mass-storage device (such as a magnetic or optical disk and its corresponding disk drive) as the permanent storage device 5035.

Other embodiments use a removable storage device (such as a floppy disk, flash memory device, etc., and its corresponding drive) as the permanent storage device Like the permanent storage device 5035, the system memory 5020 is a read-and-write memory device. However, unlike storage device 5035, the system memory 5020 is a volatile read-and-write memory, such a random access memory. The system memory 5020 stores some of the instructions and data that the processor needs at runtime. In some embodiments, the invention's processes are stored in the system memory 5020, the permanent storage device 5035, and/or the read-only memory 5030. For example, the various memory units include instructions for processing multimedia clips in accordance with some embodiments. From these various memory units, the processing unit(s) 5010 retrieves instructions to execute and data to process in order to execute the processes of some embodiments.

The bus 5005 also connects to the input and output devices 5040 and 5045. The input devices 5040 enable the user to communicate information and select commands to the electronic system. The input devices 5040 include alphanumeric keyboards and pointing devices (also called "cursor control devices"), cameras (e.g., webcams), microphones or similar devices for receiving voice commands, etc. The output devices 5045 display images generated by the electronic system or otherwise output data. The output devices 5045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 50, bus 5005 also couples electronic system 5000 to a network 5025 through a network adapter (not shown). In this manner, the computer can be a part of a network of computers (such as a local area network ("LAN"), a wide area network ("WAN"), or an Intranet, or a network of networks, such as the Internet. Any or all components of electronic system 5000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIGS. 5, 8, 11, 15, 17, 21, 25, 28, 30, 32, 34, 36, 40, and 42-44) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program which when executed by at least one processing unit provides a graphical user interface (GUI) for editing an image, the GUI comprising:
    a display area for displaying an image comprising a plurality of pixels;
    a tool for (i) receiving a touch input that moves across a set of pixels of an image as a plurality of successive movements, (ii) identifying a first subset of the set of pixels over which the touch input initially moves, (iii) determining a set of similarity criteria for identifying pixels similar to the first subset of pixels, and (iv) applying an image processing operation only to a second subset of the set of pixels over which the touch input moves that satisfy the similarity criteria, wherein the image processing operation is not applied to pixels in the set of pixels over which the touch input moves that do not meet the similarity criteria.

2. The non-transitory machine readable medium of claim 1, wherein the set of similarity criteria includes whether pixels have pixel values that fall within a range of pixel values of the first subset of pixels.

3. The non-transitory machine readable medium of claim 1, wherein the tool incrementally increases application of the image processing operation each time the touch input moves over pixels in the second subset of pixels.

4. The non-transitory machine readable medium of claim 3, wherein the tool applies a different amount of modification to a particular pixel in the second subset of pixels with each successive movement over the particular pixel.

5. The non-transitory machine readable medium of claim 1, wherein the touch input is a rubbing touch input.

6. A non-transitory machine readable medium storing a program for execution by at least one processing unit, the program comprising sets of instructions for:
    displaying an image in a display area, the image comprising a plurality of pixels;
    receiving a touch input that moves across a set of pixels in an area of the image as a plurality of successive swipe movements;
    determining, based on properties of a subset of pixels in the area of the image over which a first of the successive swipe movements of the touch input initially moves, a set of criteria for identifying pixels similar to the pixels in the subset of pixels; and
    applying an image processing operation only to the pixels over which the touch input moves that satisfy the identified criteria, wherein the image processing operation is not applied to pixels in the set of pixels over which the touch input moves that do not meet the identified criteria.

7. The non-transitory machine readable medium of claim 6, wherein the set of instructions for determining the set of criteria comprises a set of instructions for converting pixel values of the pixels in the subset of pixels from RGB color model values to LAB space values.

8. The non-transitory machine readable medium of claim 7, wherein the set of instructions for determining the set of criteria further comprises a set of instructions for determining whether a pixel in the area is within a predefined distance from the subset of pixels.

9. The non-transitory machine readable medium of claim 6, wherein the set of instructions for applying the image processing operation to the pixels over which the touch input moves that satisfy the identified criteria comprises a set of instructions for incrementally increasing the application of the image processing operation to a particular group of the pixels with each successive swipe movement over the particular group of pixels.

10. The non-transitory machine readable medium of claim 9, wherein an amount of modification to the particular group of pixels with a first of the successive swipe movements is different than an amount of modification with a second of the successive swipe movements.

11. The non-transitory machine readable medium of claim 9, wherein the set of instructions for incrementally increasing the application of the effect comprises a set of instructions for linearly increasing an amount of the image processing operation applied with each one of the successive swipe movements over the particular group of pixels.

12. An electronic device comprising:
a set of processing units; and
a non-transitory machine readable medium storing a program which when executed by at least one of the processing units provides a graphical user interface (GUI) for editing an image, the GUI comprising:
a display area for displaying an image comprising a plurality of pixels; and
a tool for (i) receiving a touch input that moves across a set of pixels of an image as a plurality of successive movements, (ii) identifying a first subset of the set of pixels over which the touch input initially moves, (iii) determining a set of similarity criteria for identifying pixels similar to the first subset of pixels, and (iv) applying an image processing operation only to a second subset of the set of pixels over which the touch input moves that satisfy the similarity criteria, wherein the image processing operation is not applied to pixels in the set of pixels over which the touch input moves that do not meet the similarity criteria.

13. The electronic device of claim 12, wherein the set of similarity criteria includes whether pixels have pixel values that fall within a range of pixel values of the first subset of pixels.

14. The electronic device of claim 12, wherein the tool incrementally increases application of the image processing operation each time the touch input moves over pixels in the second subset of pixels.

15. The electronic device of claim 14, wherein the tool applies a different amount of modification to a particular pixel in the second subset of pixels with each successive movement over the particular pixel.

16. The non-transitory machine readable medium of claim 12, wherein the touch input is a rubbing touch input.

17. A method comprising:
displaying an image in a display area, the image comprising a plurality of pixels;
receiving a touch input that moves across a set of pixels in an area of the image as a plurality of successive swipe movements;
determining, based on properties of a subset of pixels in the area of the image over which a first of the successive swipe movements of the touch input initially moves, a set of criteria for identifying pixels similar to the pixels in the subset of pixels; and
applying an image processing operation only to the pixels over which the touch input moves that satisfy the identified criteria, wherein the image processing operation is not applied to pixels in the set of pixels over which the touch input moves that do not meet the identified criteria
wherein the displaying, receiving, determining, and applying are performed by an electronic device.

18. The method of claim 17, wherein determining the set of criteria comprises converting pixel values of the pixels in the subset of pixels from RGB color model values to LAB space values.

19. The method of claim 18, wherein determining the set of criteria further comprises determining whether a pixel in the area is within a predefined distance from the subset of pixels.

20. The method of claim 17, wherein applying the image processing operation to the pixels over which the touch input moves that satisfy the identified criteria comprises incrementally increasing the application of the image processing operation to a particular group of the pixels with each successive swipe movement over the particular group of pixels.

21. The method of claim 20, wherein an amount of modification to the particular group of pixels with a first of the successive swipe movements is different than an amount of modification with a second of the successive swipe movements.

22. The method of claim 20, wherein incrementally increasing the application of the effect comprises linearly increasing an amount of the image processing operation applied with each one of the successive swipe movements over the particular group of pixels.

* * * * *